(12) United States Patent
Bradwell et al.

(10) Patent No.: US 11,211,641 B2
(45) Date of Patent: Dec. 28, 2021

(54) ELECTROCHEMICAL ENERGY STORAGE DEVICES

(71) Applicant: Ambri Inc., Marlborough, MA (US)

(72) Inventors: David J. Bradwell, Arlington, MA (US); Greg A. Thompson, Cambridge, MA (US); Donald R. Sadoway, Cambridge, MA (US); Michael J. McNeley, Boston, MA (US); David S. Deak, Los Gatos, CA (US)

(73) Assignee: Ambri Inc., Marlborough, MA (US)

( * ) Notice: Subject to any disclaimer, the term of this patent is extended or adjusted under 35 U.S.C. 154(b) by 0 days.

(21) Appl. No.: 16/858,189

(22) Filed: Apr. 24, 2020

(65) Prior Publication Data

US 2021/0043982 A1    Feb. 11, 2021

Related U.S. Application Data

(63) Continuation-in-part of application No. 16/718,020, filed on Dec. 17, 2019, which is a continuation of
(Continued)

(51) Int. Cl.
*H01M 10/39*    (2006.01)
*H01M 4/38*    (2006.01)
(Continued)

(52) U.S. Cl.
CPC ........... *H01M 10/399* (2013.01); *B60L 50/64* (2019.02); *B60L 53/00* (2019.02); *B60L 53/53* (2019.02); *H01M 4/134* (2013.01); *H01M 4/38* (2013.01); *H01M 4/381* (2013.01); *H01M 4/382* (2013.01); *H01M 10/425* (2013.01); *H01M 10/4207* (2013.01); *H01M 50/463* (2021.01);
(Continued)

(58) Field of Classification Search
None
See application file for complete search history.

(56) References Cited

U.S. PATENT DOCUMENTS

| 11,374 A | 7/1854 | Leue |
| 2,587,443 A | 2/1952 | Crabtree |

(Continued)

FOREIGN PATENT DOCUMENTS

| AU | 2014229643 A1 | 9/2015 |
| AU | 2016225020 A1 | 9/2017 |

(Continued)

OTHER PUBLICATIONS

Advisory Action Before Filing of Appeal Brief dated May 10, 2012 for U.S. Appl. No. 12/839,130.
(Continued)

*Primary Examiner* — Christopher P Domone
(74) *Attorney, Agent, or Firm* — Wilson Sonsini Goodrich & Rosati

(57) ABSTRACT

Provided herein are energy storage devices. In some cases, the energy storage devices are capable of being transported on a vehicle and storing a large amount of energy. An energy storage device is provided comprising at least one liquid metal electrode, an energy storage capacity of at least about 1 MWh and a response time less than or equal to about 100 milliseconds (ms).

18 Claims, 33 Drawing Sheets

Related U.S. Application Data application No. 15/647,468, filed on Jul. 12, 2017, now Pat. No. 10,541,451, which is a continuation-in-part of application No. 14/688,179, filed on Apr. 16, 2015, now Pat. No. 9,735,450, which is a continuation of application No. PCT/US2013/065092, filed on Oct. 15, 2013, which is a continuation-in-part of application No. 13/801,333, filed on Mar. 13, 2013, now Pat. No. 9,312,522, said application No. 15/647,468 is a continuation-in-part of application No. 14/536,563, filed on Nov. 7, 2014, now Pat. No. 9,728,814, which is a continuation of application No. 14/178,806, filed on Feb. 12, 2014, now Pat. No. 9,520,618, application No. 16/858,189, which is a continuation-in-part of application No. 15/130,292, filed on Apr. 15, 2016, now abandoned, which is a continuation of application No. PCT/US2014/060979, filed on Oct. 16, 2014.

(60) Provisional application No. 61/715,821, filed on Oct. 18, 2012, provisional application No. 61/763,925, filed on Feb. 12, 2013, provisional application No. 61/930,298, filed on Jan. 22, 2014, provisional application No. 61/891,784, filed on Oct. 16, 2013, provisional application No. 61/891,789, filed on Oct. 16, 2013.

(51) Int. Cl.
| | |
|---|---|
| *H01M 4/134* | (2010.01) |
| *H01M 2/18* | (2006.01) |
| *H01M 10/42* | (2006.01) |
| *B60L 53/00* | (2019.01) |
| *B60L 50/64* | (2019.01) |
| *B60L 53/53* | (2019.01) |
| *H01M 50/463* | (2021.01) |
| *H01M 50/138* | (2021.01) |

(52) U.S. Cl.
CPC .......... *H01M 4/387* (2013.01); *H01M 50/138* (2021.01); *H01M 2220/20* (2013.01); *Y02T 10/70* (2013.01); *Y02T 10/7072* (2013.01); *Y02T 90/14* (2013.01)

(56) References Cited

U.S. PATENT DOCUMENTS

| | | |
|---|---|---|
| 3,057,946 A | 10/1962 | Eidensohn |
| 3,238,437 A | 3/1966 | Foster et al. |
| 3,245,836 A | 4/1966 | Agruss |
| 3,404,035 A | 10/1968 | Kummer et al. |
| 3,419,432 A | 12/1968 | Hesson |
| 3,488,221 A | 1/1970 | Hiroshi et al. |
| 3,507,703 A | 4/1970 | Laszlo |
| 3,535,214 A | 10/1970 | Rene |
| 3,607,405 A | 9/1971 | Harold |
| 3,607,407 A | 9/1971 | Harry |
| 3,635,765 A | 1/1972 | Jacob |
| 3,663,295 A | 5/1972 | Bernard |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,315,974 A | 2/1982 | Athearn et al. |
| 4,338,380 A | 7/1982 | Erickson et al. |
| 4,360,574 A | 11/1982 | Park |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A | 10/1990 | McCullough et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,039,351 A | 8/1991 | Cooper et al. |
| 5,044,551 A | 9/1991 | Tanaka et al. |
| 5,139,895 A | 8/1992 | Roy et al. |
| 5,185,068 A | 2/1993 | Sadoway |
| 5,198,638 A | 3/1993 | Massacesi |
| 5,254,232 A | 10/1993 | Sadoway |
| 5,284,562 A | 2/1994 | Beck et al. |
| 5,286,359 A | 2/1994 | Richards et al. |

(56) References Cited

U.S. PATENT DOCUMENTS

| | | |
|---|---|---|
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | MacKenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |

(56) References Cited

U.S. PATENT DOCUMENTS

| | | |
|---|---|---|
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,035,617 B2 | 5/2015 | Parakulam et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,297,870 B2 | 5/2019 | Bradwell |
| 10,541,451 B2 | 1/2020 | Bradwell et al. |
| 10,566,662 B1 | 2/2020 | Nayar et al. |
| 10,608,212 B2 | 3/2020 | Bradwell et al. |
| 10,637,015 B2 | 4/2020 | Thompson et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1* | 4/2005 | Kairawicz ......... H01M 50/1243 429/175 |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2007/0067119 A1 | 3/2007 | Loewen et al. |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1* | 1/2011 | Bradwell ............ H01M 50/148 429/51 |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0091806 A1 | 4/2012 | Tsutsumi et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar et al. |
| 2012/0328910 A1 | 12/2012 | La et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |

(56) References Cited

U.S. PATENT DOCUMENTS

| | | |
|---|---|---|
| 2013/0130085 A1 | 5/2013 | Choi |
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0149567 A1 | 6/2013 | Schaefer |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2013/0315659 A1* | 11/2013 | Kumar .............. C22C 9/06 403/272 |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0280480 A1 | 10/2015 | Mitri et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0190607 A1 | 6/2016 | Wyser et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0259648 A1 | 9/2017 | Putcha et al. |
| 2017/0263951 A1 | 9/2017 | Kanno et al. |
| 2017/0309979 A1 | 10/2017 | Lee et al. |
| 2017/0338451 A9 | 11/2017 | Bradwell et al. |
| 2017/0358941 A1 | 12/2017 | Mitri et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0191162 A1 | 7/2018 | Hanada et al. |
| 2019/0089013 A1 | 3/2019 | Ouchi et al. |
| 2019/0115632 A1 | 4/2019 | Beuning et al. |
| 2019/0123369 A1 | 4/2019 | Ma et al. |
| 2020/0076006 A1 | 3/2020 | Bradwell et al. |
| 2020/0287247 A1 | 9/2020 | Bradwell et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 101436780 A | 5/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 102498589 A | 6/2012 |
| CN | 102646808 A | 8/2012 |
| CN | 103001239 A | 3/2013 |
| CN | 202797170 U | 3/2013 |
| CN | 105190984 A | 12/2015 |
| CN | 105659415 A | 6/2016 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| GB | 2062939 A | 5/1981 |
| JP | S4933815 B1 | 9/1974 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 A | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 3355377 B2 | 12/2002 |
| JP | 2003146771 A | 5/2003 |
| JP | 2007157373 A | 6/2007 |
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013537361 A | 9/2013 |
| JP | 2014154337 A | 8/2014 |
| JP | 2016510936 A | 4/2016 |
| JP | 2016535392 A | 11/2016 |
| KR | 20120059106 A | 6/2012 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |

(56) References Cited

FOREIGN PATENT DOCUMENTS

| | | |
|---|---|---|
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015066359 A1 | 5/2015 |
| WO | WO-2016138499 A1 | 9/2016 |
| WO | WO-2016141354 A2 | 9/2016 |
| WO | WO-2018/052797 | 3/2018 |
| WO | WO-2018/187777 | 11/2018 |

OTHER PUBLICATIONS

Advisory Action Before Filing of Appeal Brief dated Jun. 8, 2012 for U.S. Appl. No. 12/839,130.
Agruss. The Thermally Regenarative Liquid-Metal Cell, J. Electrochem. Soc. Nov. 1963; 110(11):1097-1103.
Allanore, A. Features and Challenges of Molten Oxide Electrolytes for Metal Extraction. Journal of the Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
ATI Technical Data Sheet, ATI 18CrCb Stainless Steel, Feb. 17, 2014.
Atthey. A Mathematical Model for Fluid Flow in a Weld Pool at High Currents. J. Fluid Mech. 1980; 98(4):787-801.
Biswas, et al. Towards Implementation of Smart Grid: An Updated Review on Electrical Energy Storage Systems. Smart Grid and Renewable Energy. 2013; 4:122-132. Published online Feb. 2013.
Bradwell, et al. Magnesium-antimony liquid metal battery for stationary energy storage. J Am Chern Soc. Feb. 1, 2012;134(4):1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886):1347-1355.
Cerablak™ technology. Atfi Surface Science Solutions. http://www.atfinet.com/index.php/technology. Accessed Feb. 24, 2016.
Chuang. Floating capacitor active charge balancing for PHEV application. Thesis. Ohio State University. 2010.
Co-pending U.S. Appl. No. 15/628,538, inventor Bradwell; David J., filed Jun. 20, 2017.
Co-pending U.S. Appl. No. 16/740,178, inventors Nayarhari et al., filed Jan. 10, 2020.
Co-pending U.S. Appl. No. 16/829,965, inventors Thompsongreg et al., filed Mar. 25, 2020.
Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.
Cubicciotti, et al. Metal-Salt Interactions at High Temperatures: The Solubilities of Some alkaline Earth Metals in their Halides. J. Am. Chem. Soc. 1949; 71(6):2149-2153.
Donald Sadoway: The Colbert Report video. http://thecolbertreport.cc.com/videos/8uddyg/donald-sadoway. The Colbert Report, Oct. 22, 2012. Accessed Jun. 29, 2015.
Donald Sadoway: The missing link to renewable energy Youtube Video. https://www.youtube.com/watch?v=Sddb0Khx0yA. TED, Mar. 2012. Accessed Jun. 29, 2015.
Dworkin, et al. The Electrical Conductivity of Solutions of Metals in their Molten Halides. VIII. alkaline Earth Metal Systems. J. Phys. Chem. Jul. 1966; 70(7):2384.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R5o. Alger, Oct. 7, 2014. Accessed Jun. 29, 2015.
EP17851347.9 Extended European Search Report dated Mar. 16, 2020.
EP18194103.0 Extended European Search Report dated Mar. 19, 2019.
"European Extended Search Report and opinion dated May 29, 2017 for EP Application No. 14857245.".
European search report and search opinion dated Feb. 12, 2014 for EP Application No. 13196841.4.
European search report and search opinion dated May 6, 2016 for EP Application No. 13847926.
European search report and search opinion dated May 13, 2016 for EP Application No. 13846301.
European supplemental search report and opinion dated Mar. 16, 2017 for EP Application No. 14853610.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.

(56) References Cited

OTHER PUBLICATIONS

GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International preliminary report on patentability dated Mar. 31, 2016 for PCT Application No. PCT/US2014/056367.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of the Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of the Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016.With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Liquid Metal Battery Research Company website, http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
McAlister, A. J. The Al—Li (Aluminum-Lithium) System. Bulletin of Alloy Phase Diagrams, vol. 3, No. 2, 1982, pp. 177-178. doi: 10.1007/BF02892377.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sourches 275 (2015) 370-376. Available online Oct. 29, 2014.
Notice of allowance dated Jan. 6, 2015 for U.S. Appl. No. 13/237,215.
Notice of allowance dated Jan. 11, 2018 for U.S. Appl. No. 15/136,337.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.

(56) References Cited

OTHER PUBLICATIONS

Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.
Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS a Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549.".
Office action dated Mar. 14, 2014 for U.S. Appl. No. 13/237,215.
Office action dated Mar. 16, 2012 for U.S. Appl. No. 12/839,130.
"Office action dated Mar. 27, 2018 for U.S. Appl. No. 15/140,434.".
"Office action dated Apr. 18, 2018 for U.S. Appl. No. 14/975,587.".
"Office action dated Apr. 20, 2018 for U.S. Appl. No. 15/057,732.".
"Office action dated May 1, 2017 for U.S. Appl. No. 14/678,602.".
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838.".
"Office action dated Jun. 15, 2017 for U.S. Appl. No. 14/687,838".
"Office action dated Jun. 25, 2018 for U.S. Appl. No. 15/063,842.".
Office action dated Jun. 30, 2016 for U.S. Appl. No. 14/536,563.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.
"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of the Electrochemical Society. 2014; 161(12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.
"Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 24, 2018.
PCT/US2018/026601 International Search Report dated Jul. 30, 2018.
PCT/US2019/066231 International Search Report and Written Opinion dated Mar. 2, 2020.
Pflanz, K. A Liquid Layer Solution for the Grid. http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Response After Final Rejection dated Apr. 27, 2012 for U.S. Appl. No. 12/839,130.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.

(56) References Cited

OTHER PUBLICATIONS

Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shimotake, et al. Bimetallic Galvanic Cells With Fused-Salt Electrolytes. Advances in Energy Conversion Engineering, pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. in Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.
U.S. Appl. No. 15/130,129 Office Action dated Jul. 3, 2019.
U.S. Appl. No. 15/130,129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 vol. 146, issue 1, 8-14.
Zhang; et al. Pyrite FeS2 as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.

* cited by examiner

A

B

C

A

B

ELECTROCHEMICAL ENERGY STORAGE DEVICES

CROSS-REFERENCE

This application is a continuation-in-part of U.S. patent application Ser. No. 16/718,020, filed Dec. 17, 2019, which is a continuation of U.S. patent application Ser. No. 15/647,468, filed Jul. 12, 2017, (now U.S. Pat. No. 10,541,451), which is a continuation-in-part application of U.S. patent application Ser. No. 14/688,179, filed Apr. 16, 2015, (now U.S. Pat. No. 9,735,450), which is a continuation of PCT Application No. PCT/US2013/065092, filed Oct. 15, 2013, which claims the benefit of U.S. Provisional Application No. 61/715,821, filed Oct. 18, 2012, and which is a continuation-in-part of U.S. patent application Ser. No. 13/801,333, filed Mar. 13, 2013, (now U.S. Pat. No. 9,312,522), which claims the benefit of U.S. Provisional Application No. 61/763,925, filed Feb. 12, 2013, and U.S. Provisional Application No. 61/715,821, filed Oct. 18, 2012, and a continuation-in-part of U.S. patent application Ser. No. 14/536,563, filed Nov. 7, 2014, (now U.S. Pat. No. 9,728,814), which is a continuation of U.S. patent application Ser. No. 14/178,806, filed Feb. 12, 2014, (now U.S. Pat. No. 9,520,618), which claims the benefit of U.S. Provisional Application No. 61/763,925, filed Feb. 12, 2013, each of which is entirely incorporated herein by reference. This application is a continuation-in-part of U.S. patent application Ser. No. 15/130,292, filed Apr. 15, 2016, which is a continuation of PCT Application No. PCT/US2014/060979, filed Oct. 16, 2014, which claims the benefit of U.S. Provisional Application No. 61/930,298, filed Jan. 22, 2014, U.S. Provisional Application No. 61/891,784, filed Oct. 16, 2013, and U.S. Provisional Application No. 61/891,789, filed Oct. 16, 2013.

BACKGROUND

Various devices are configured for use at elevated (or high) temperatures. Examples of such devices include elevated temperature batteries, which are devices capable of converting stored chemical energy into electrical energy. Batteries may be used in many household and industrial applications. Another example of a high temperature device is a chemical vapor deposition chamber such as those used in the fabrication of semiconductor devices. Another example of a high temperature device is a chemical process vessel, a transfer pipe, or storage vessel designed to process, transport, contain, and/or store reactive metals. These devices typically may operate at a temperature at or in excess of 300° C.

SUMMARY

Recognized herein are various limitations associated with elevated (or high) temperature devices. For instance, some batteries operate at high temperatures (e.g., at least about 100° C. or 300° C.) and have reactive material vapors (e.g., reactive metal vapors such as, for example, vapors of lithium, sodium, potassium, magnesium or calcium) that may need to be sufficiently contained within the devices. Other examples of high temperature reactive material devices include nuclear (e.g., fusion) reactors that use a molten salt or metal (e.g., molten sodium or lithium or molten sodium- or lithium-containing alloys) as a coolant, devices for manufacturing semiconductors, heterogeneous reactors, and devices for producing (e.g., processing) and/or handling (e.g., transporting or storing) reactive materials (e.g., reactive chemicals such as, for examples, a chemical with a strong chemical reducing capability, or reactive metals such as, for example, lithium or sodium). Such devices may need to be sufficiently sealed from an external environment during use, such as, for example, to prevent device failure, prolong device use, or avoid adverse health effects on users or operators of such devices.

The disclosure provides seals for energy storage devices and other devices having (e.g., containing or comprising) reactive materials (e.g., reactive metals) and operating at high temperatures (e.g., at least about 100° C. or 300° C.). The energy storage devices (e.g., batteries) may be used within an electrical power grid or as part of a standalone system. The batteries may be charged from an electricity production source, for later discharge when there is a demand for electrical energy consumption.

An aspect of the disclosure is directed to a high-temperature device, comprising: (a) a container comprising a reactive metal and/or molten salt; and (b) a seal that seals the container from an environment external to the container. The seal comprises (i) a ceramic material exposed to the reactive metal and/or molten salt, wherein the ceramic material is chemically resistant to the reactive metal and/or molten salt at a temperature of at least 100° C.; (ii) a metal collar adjacent to the ceramic material; and an active metal braze disposed between the ceramic material and at least one of the metal collar and the container, wherein the active metal braze comprises at least one metal that chemically reduces the ceramic material.

Another aspect of the disclosure relates to an electrochemical cell, comprising: (a) an electrically conductive housing comprising a liquid metal that is liquid at an operating temperature of at least about 200° C., wherein the liquid metal is configured to store/release charge during charge/discharge of the electrochemical cell; (b) a conductor in electrical contact with the liquid metal, wherein the conductor protrudes through the electrically conductive housing through an aperture in the electrically conductive housing; and (c) a seal that electrically isolates the conductor from the electrically conductive housing, wherein the seal comprises a ceramic material, a braze material, and a sleeve.

Another aspect of the disclosure relates to an electrochemical cell, comprising: (a) an electrically conductive housing comprising a liquid metal that is liquid at an operating temperature of at least about 200° C., wherein the liquid metal composition is configured to store/release charge during charge/discharge of the electrochemical cell; (b) a conductor in electrical contact with the liquid metal, wherein the conductor protrudes through the electrically conductive housing through an aperture in the electrically conductive housing; and (c) a seal that seals the conductor to the electrically conductive housing, wherein the seal provides a helium leak rate of no more than about $1\times10^{-6}$ atmosphere-cubic centimeters per second (atm-cc/s) at a temperature of at least about 25° C.

Another aspect of the disclosure is directed to an electrochemical cell, comprising: (a) an electrically conductive housing comprising a liquid metal that is liquid at an operating temperature of at least about 200° C., wherein the liquid metal composition is configured to store/release charge during charge/discharge of the electrochemical cell; (b) a conductor in electrical contact with the liquid metal, wherein the conductor protrudes through the electrically conductive housing through an aperture in the electrically conductive housing; and (c) a seal that electrically isolates the conductor from the electrically conductive housing, wherein the impedance across the seal is at least about 1 kilo-Ohm at the operating temperature.

Another aspect of the disclosure is directed to an electrochemical cell, comprising: (a) an electrically conductive housing comprising a liquid metal that is liquid at an operating temperature of at least about 200° C., wherein the liquid metal is configured to store/release charge during charge/discharge of the electrochemical cell; (b) a conductor in electrical contact with the liquid metal, wherein the conductor protrudes through the electrically conductive housing through an aperture in the electrically conductive housing; and (c) a seal comprising an electrically insulating ceramic bonded to a metal collar and connected to both the conductor and the electrically conductive housing, wherein the seal electrically isolates the conductor from the electrically conductive housing, wherein the electrically insulating ceramic has a coefficient of thermal expansion (CTE) of less than 6 μm/m/° C., and wherein the CTE of the metal collar is less than 60% different than the CTE of the electrically insulating ceramic.

Another aspect of the disclosure provides an electrochemical cell, comprising: (a) an electrically conductive housing comprising a liquid metal that is liquid at an operating temperature of at least about 200° C., wherein the liquid metal is configured to store/release charge during charge/discharge of the electrochemical cell; (b) a conductor in electrical contact with the liquid metal, wherein the conductor protrudes through the electrically conductive housing through an aperture in the electrically conductive housing; and (c) a seal that electrically isolates the conductor from the electrically conductive housing, wherein the seal comprises a material with a coefficient of thermal expansion (CTE) that is at least 10% different than the CTE of the electrically conductive housing and/or the conductor, and wherein the seal has a geometry such that the electrochemical cell is hermetically sealed.

In another aspect of the disclosure, a high-temperature device is provided. The device comprises (a) a container comprising a reactive metal and/or molten salt; and (b) a seal that seals the container from an environment external to the container. The seal comprises (i) a ceramic material exposed to the reactive metal and/or molten salt, wherein the ceramic material is chemically resistant to the reactive metal and/or molten salt at a temperature of at least 100° C.; and (ii) a first metal collar joined to the ceramic material, wherein the first metal collar has a coefficient of thermal expansion (CTE) of less than 8 ppm/° C.

Another aspect of the disclosure provides a method for selecting materials to form a seal for a high-temperature device containing a reactive material. The method comprises rank-ordering a set of materials based on increasing or decreasing Gibbs free energy of formation (ΔGr) of each of the materials; selecting a subset of the rank-ordered materials, wherein the selected materials remain rank-ordered; and selecting a set of seal materials based on the selected rank-ordered materials, thereby eliminating a driving force for the selected rank-ordered materials to degrade when provided in the seal.

Another aspect of the disclosure provides an electrochemical cell that comprises a container comprising a reactive material maintained at a temperature of at least about 200° C. The electrochemical cell further comprises a seal that passes through the container and seals the container from an environment external to the container. The seal comprises a ceramic component exposed to the reactive material and a metal collar joined to the ceramic component. The seal is arranged in a circumferential configuration that results in a radially compressive force of the metal collar onto the ceramic conductor, and configured with a conical angle of about 20 degrees relative to a vertical orientation.

Another aspect of the disclosure provides an electrochemical cell, comprising: (a) a container comprising a reactive material maintained at a temperature of at least about 200° C.; and (b) a seal in the container that seals the container from an environment external to the container. The seal comprises a ceramic component exposed to the reactive material and a metal collar joined to the ceramic component, wherein the seal is arranged in a stacked configuration with one or more sealing interfaces that are perpendicular to a direction parallel to a conductor that passes through the seal.

Another aspect of the disclosure provides an electrochemical cell, comprising: (a) a container comprising one or more materials comprising liquid components and gaseous components maintained at a temperature of at least about 100° C., wherein at least one of the materials is a reactive material; and (b) a seal in the container that seals the container from an environment external to the container. The seal is configured as a pressure relief component above a critical pressure or above a critical temperature. The seal is provided adjacent a head space inside the container, wherein the head space comprises the gaseous components, and wherein the head space is above the liquid components.

A further aspect of the disclosure is directed to an electrochemical cell, comprising: (a) a container comprising a reactive material maintained at a temperature of at least about 200° C.; and (b) a seal that seals the container from an environment external to the container. The seal comprises a ceramic material exposed to the reactive material and a metal collar joined to the ceramic material, wherein a coefficient of thermal expansion (CTE) of the metal collar is less than 30% different than the CTE of the ceramic material, and wherein the metal collar is a ferrous alloy.

A further another aspect of the disclosure relates to a seal for containing a reactive material in a high-temperature device. The seal comprises a ceramic material that is electrically isolating and has a normalized Gibbs free energy of formation ($\Delta G_{r,n}$) that is more negative than a $\Delta G_{r,n}$ of a first compound associated with the reactive material and a common element; and an active braze material that is chemically stable with the reactive material, wherein a $\Delta G_{r,n}$ of a second compound associated with the active braze material and the common element is more negative than the $\Delta G_{r,n}$ of the ceramic material.

Another aspect of the present disclosure provides a high-temperature device, comprising: a container comprising a reactive metal and/or molten salt; and a seal that seals the container from an environment external to the container, the seal comprising: a ceramic material exposed to the reactive metal and/or molten salt, wherein the ceramic material is chemically resistant to the reactive metal and/or molten salt at a temperature of at least 100° C.; a metal collar adjacent to the ceramic material; and an active metal braze disposed between the ceramic material and at least one of the metal collar and the container, wherein the active metal braze comprises at least one metal that chemically reduces the ceramic material.

In some embodiments, the ceramic material comprises aluminum nitride (AlN). In some embodiments, the metal collar is formed from stainless steel or zirconium. In some embodiments, the active metal braze is an alloy and the metal that chemically reduces the ceramic material is titanium (Ti) or zirconium (Zr). In some embodiments, the device is a liquid metal battery. In some embodiments, the device is a nuclear reactor. In some embodiments, the device is for the production and/or handling of a reactive metal or a reactive gas or for semiconductor manufacturing. In some embodiments, the reactive metal is an alkali metal or an alkaline earth metal. In some embodiments, the reactive metal is magnesium (Mg), calcium (Ca), sodium (Na), potassium (K), lithium (Li), or any combination thereof. In some embodiments, the reactive metal is a metal vapor or a liquid metal. In some embodiments, the molten salt is a vapor or a liquid. In some embodiments, the seal is capable of being resistant to lithium vapor at a temperature of at least about 350° C. for at least one year. In some embodiments, the seal surrounds an electrically conductive feed-through, a thermocouple or a voltage sensor coupled to the container. In some embodiments, the impedance across the seal is at least about 1 kilo-Ohm at the temperature. In some embodiments, the device further comprises an electrical conductor adjacent to the seal, wherein the seal electrically isolates the electrical conductor from the container. In some embodiments, a coefficient of thermal expansion (CTE) of the seal is less than 10% different than the CTE of the container and/or the electrical conductor.

Another aspect of the present disclosure provides an electrochemical cell, comprising: an electrically conductive housing comprising a liquid metal that is liquid at an operating temperature of at least about 200° C., wherein the liquid metal is configured to store/release charge during charge/discharge of the electrochemical cell; a conductor in electrical contact with the liquid metal, wherein the conductor protrudes through the electrically conductive housing through an aperture in the electrically conductive housing; and a seal that electrically isolates the conductor from the electrically conductive housing, wherein the seal comprises a ceramic material, a braze material, and a sleeve.

In some embodiments, the ceramic material comprises aluminum nitride (AlN), beryllium nitride ($Be_3N_2$), boron nitride (BN), calcium nitride ($Ca_3N_2$), silicon nitride ($Si_3N_4$), aluminum oxide ($Al_2O_3$), beryllium oxide (BeO), calcium oxide (CaO), cerium oxide ($Ce_2O_3$), erbium oxide ($Er_2O_3$), lanthanum oxide ($La_2O_3$), magnesium oxide (MgO), neodymium oxide ($Nd_2O_3$), samarium oxide ($Sm_2O_3$), scandium oxide ($Sc_2O_3$), ytterbium oxide ($Yb_2O_3$), yttrium oxide ($Y_2O_3$), zirconium oxide ($ZrO_2$), yttria partially stabilized zirconia (YPSZ), boron carbide ($B_4C$), silicon carbide (SiC), titanium carbide (TiC), zirconium carbide (ZrC), titanium diboride ($TiB_2$), chalcogenides, quartz, glass, or any combination thereof. In some embodiments, the braze material comprises iron (Fe), nickel (Ni), titanium (Ti), chromium (Cr), zirconium (Zr), phosphorus (P), boron (B), carbon (C), silicon (Si), calcium (Ca), beryllium (Be), magnesium (Mg), vanadium (V) or any combination thereof. In some embodiments, the sleeve is formed of 430SS stainless steel, 304SS stainless steel, tungsten (W), tungsten carbide (WC), zirconium (Zr), iron-nickel alloy, or any combination thereof. In some embodiments, the ceramic material comprises aluminum nitride (AlN) and the braze material comprises titanium (Ti). In some embodiments, the seal hermetically seals the electrochemical cell. In some embodiments, the seal is inert to an atmosphere in contact with the electrochemical cell. In some embodiments, the atmosphere in contact with the electrochemical cell comprises oxygen ($O_2$), water, nitrogen ($N_2$), argon (Ar), hydrogen ($H_2$), carbon dioxide ($CO_2$), neon (Ne), or a combination thereof. In some embodiments, the ceramic material and/or the braze material are coated with a coating that provides resistance to the atmosphere in contact with the electrochemical cell. In some embodiments, the coating comprises silicon dioxide ($SiO_2$), aluminum oxide ($Al_2O_3$) or yttrium oxide ($Y_2O_3$). In some embodiments, the seal is inert to metal vapors and metal salts. In some embodiments, the metal vapors comprise lithium, sodium, potassium, magnesium, calcium, or any combination thereof. In some embodiments, the ceramic material and/or the braze material are coated with a coating that provides resistance to the metal vapors and metal salts. In some embodiments, the coating is yttrium oxide ($Y_2O_3$) erbium oxide ($Er_2O_3$), boron nitride (BN), aluminum nitride (AlN), or any combination thereof. In some embodiments, the seal is joined to the electrically conductive housing and/or the conductor. In some embodiments, the coefficients of thermal expansion of the ceramic material and the braze material match the coefficients of thermal expansion of the electrically conductive housing and/or the conductor to within about 5%. In some embodiments, the electrically conductive housing and/or the conductor comprise 400-series steel, 300-series steel, nickel, titanium, zirconium, or any combination thereof. In some embodiments, the liquid metal comprises one or more Group 12 elements. In some embodiments, the Group 12 elements are zinc, cadmium, or mercury. In some embodiments, the liquid metal further comprises one or more of tin, lead, bismuth, antimony, tellurium, and selenium. In some embodiments, the liquid metal comprises one or more alkali metals. In some embodiments, the liquid metal comprises one or more alkaline earth metals. In some embodiments, the liquid metal comprises lithium, sodium, potassium, magnesium, or any combination thereof. In some embodiments, the operating temperature is at least 200° C. In some embodiments, the electrochemical cell is capable of storing at least about 50 watt-hours of energy.

Another aspect of the present disclosure provides an electrochemical cell, comprising: an electrically conductive housing comprising a liquid metal that is liquid at an operating temperature of at least about 200° C., wherein the liquid metal composition is configured to store/release charge during charge/discharge of the electrochemical cell; a conductor in electrical contact with the liquid metal, wherein the conductor protrudes through the electrically conductive housing through an aperture in the electrically conductive housing; and a seal that seals the conductor to the electrically conductive housing, wherein the seal provides a helium leak rate of no more than about $1 \times 10^{-6}$ atmosphere-cubic centimeters per second (atm-cc/s) at a temperature of at least about 25° C.

In some embodiments, the liquid metal comprises one or more Group 12 elements. In some embodiments, the Group 12 elements are zinc, cadmium or mercury. In some embodiments, the liquid metal further comprises one or more of tin, lead, bismuth, antimony, tellurium and selenium. In some embodiments, the liquid metal comprises one or more alkali metals. In some embodiments, the liquid metal comprises one or more alkaline earth metals. In some embodiments, the liquid metal comprises lithium, sodium, potassium, magnesium, or any combination thereof. In some embodiments, the operating temperature is at least about 200° C. In some embodiments, the electrochemical cell is capable of storing at least about 50 watt-hours of energy. In some embodiments, the seal provides a helium leak rate of no more than about $1 \times 10^{-6}$ atm-cc when the electrochemical cell has been operated for a period of at least about 1 year. In some embodiments, the seal provides a helium leak rate of no more than about $1 \times 10^{-6}$ atm-cc/s when the electrochemical cell has been operated for about 350 charge/discharge cycles. In some embodiments, the seal provides a helium leak rate of no more than about $1 \times 10^{-6}$ atm-cc/s at a temperature of about 50° C. In some embodiments, the seal provides a helium leak rate of no more than about $1\times10^{-6}$ atm-cc/s at a temperature of about 200° C. In some embodiments, the seal provides a helium leak rate of no more than about $1\times10^{-6}$ atm-cc/s at a temperature of about 350° C. In some embodiments, the seal provides a helium leak rate of no more than about $1\times10^{-6}$ atm-cc/s at a temperature of about 450° C. In some embodiments, the seal provides a helium leak rate of no more than about $1\times10^{-6}$ atm-cc/s at a temperature of about 550° C. In some embodiments, the seal provides a helium leak rate of no more than about $1\times10^{-6}$ atm-cc/s at a temperature of about 750° C.

Another aspect of the present disclosure provides an electrochemical cell, comprising: an electrically conductive housing comprising a liquid metal that is liquid at an operating temperature of at least about 200° C., wherein the liquid metal composition is configured to store/release charge during charge/discharge of the electrochemical cell; a conductor in electrical contact with the liquid metal, wherein the conductor protrudes through the electrically conductive housing through an aperture in the electrically conductive housing; and a seal that electrically isolates the conductor from the electrically conductive housing, wherein the impedance across the seal is at least about 1 kilo-Ohm at the operating temperature.

In some embodiments, the impedance across the seal is at least 100 kilo-Ohms. In some embodiments, the liquid metal comprises one or more Group 12 elements. In some embodiments, the Group 12 elements are zinc, cadmium or mercury. In some embodiments, the liquid metal further comprises one or more of tin, lead, bismuth, antimony, tellurium and selenium. In some embodiments, the liquid metal comprises one or more alkali metals. In some embodiments, the liquid metal comprises one or more alkaline earth metals. In some embodiments, the liquid metal comprises lithium, sodium, potassium, magnesium, or any combination thereof. In some embodiments, the operating temperature is at least 200° C. In some embodiments, the electrochemical cell is capable of storing at least about 50 Watt-hours of energy. In some embodiments, the impedance across the seal is at least 1 kilo-Ohm after the electrochemical cell has been operated for a period of at least 1 year.

Another aspect of the present disclosure provides an electrochemical cell, comprising: an electrically conductive housing comprising a liquid metal that is liquid at an operating temperature of at least about 200° C., wherein the liquid metal is configured to store/release charge during charge/discharge of the electrochemical cell; a conductor in electrical contact with the liquid metal, wherein the conductor protrudes through the electrically conductive housing through an aperture in the electrically conductive housing; and a seal comprising an electrically insulating ceramic bonded to a metal collar and connected to both the conductor and the electrically conductive housing, wherein the seal electrically isolates the conductor from the electrically conductive housing, wherein the electrically insulating ceramic has a coefficient of thermal expansion (CTE) of less than 6 µm/m/° C., and wherein the CTE of the metal collar is less than 60% different than the CTE of the electrically insulating ceramic.

In some embodiments, the coefficient of thermal expansion (CTE) of the metal collar is less than 50% different than the CTE of the electrically conductive housing and/or the conductor at the temperature at which the electrochemical cell is operated. In some embodiments, the operating temperature is at least about 200° C. In some embodiments, the coefficient of thermal expansion (CTE) of the ceramic is less than 50% different than the CTE of the metal collar, the conductor and/or the electrically conductive housing at all temperatures between −10° C. and the operating temperature. In some embodiments, the operating temperature is at least about 350° C. In some embodiments, the coefficient of thermal expansion (CTE) of the electrically insulating ceramic is less than 30% different than the CTE of the metal collar. In some embodiments, the liquid metal comprises one or more Group 12 elements. In some embodiments, the Group 12 elements are zinc, cadmium or mercury. In some embodiments, the liquid metal further comprises one or more of tin, lead, bismuth, antimony, tellurium and selenium. In some embodiments, the liquid metal comprises one or more alkali metals. In some embodiments, the liquid metal comprises one or more alkaline earth metals. In some embodiments, the liquid metal comprises lithium, sodium, potassium, magnesium, or any combination thereof. In some embodiments, the electrochemical cell is capable of storing at least about 50 watt-hours of energy.

Another aspect of the present disclosure provides an electrochemical cell, comprising: an electrically conductive housing comprising a liquid metal that is liquid at an operating temperature of at least about 200° C., wherein the liquid metal is configured to store/release charge during charge/discharge of the electrochemical cell; a conductor in electrical contact with the liquid metal, wherein the conductor protrudes through the electrically conductive housing through an aperture in the electrically conductive housing; and a seal that electrically isolates the conductor from the electrically conductive housing, wherein the seal comprises a material with a coefficient of thermal expansion (CTE) that is at least 10% different than the CTE of the electrically conductive housing and/or the conductor, and wherein the seal has a geometry such that the electrochemical cell is hermetically sealed.

In some embodiments, the coefficient of thermal expansion (CTE) of the material comprising the seal is at least 30% different than the CTE of the electrically conductive housing and/or the conductor. In some embodiments, the coefficient of thermal expansion (CTE) of the material comprising the seal is at least 40% different than the CTE of the electrically conductive housing and/or the conductor. In some embodiments, the coefficient of thermal expansion (CTE) of the material comprising the seal is at least 60% different than the CTE of the electrically conductive housing and/or the conductor. In some embodiments, the seal provides a helium leak rate of no more than about $1\times10^{-6}$ atm-cc when the electrochemical cell has been operated for a period of at least about 1 year. In some embodiments, the seal provides a helium leak rate of no more than about $1\times10^{-6}$ atm-cc/s when the electrochemical cell has been operated for about 1,000 charge/discharge cycles. In some embodiments, the seal hermetically seals the electrochemical cell at the operating temperature. In some embodiments, the operating temperature is at least about 200° C. In some embodiments, the seal is configured to hermetically seal the electrochemical cell after the electrochemical cell has been heated to a temperature of at least about 200° C. and cooled to a temperature below about 30° C. at least 40 times. In some embodiments, the geometry of the seal comprises a ceramic material bonded to a flexible metal component. In some embodiments, the flexible metal component is welded to the electrically conductive housing and/or the conductor. In some embodiments, the liquid metal comprises one or more Group 12 elements. In some embodiments, the Group 12 elements are zinc, cadmium or mercury. In some embodiments, the liquid metal further comprises one or more of tin, lead, bismuth, antimony, zinc, tellurium and selenium. In some embodiments, the liquid metal comprises one or more alkali metals. In some embodiments, the liquid metal comprises one or more alkaline earth metals. In some embodiments, the liquid metal comprises lithium, sodium, potassium, magnesium, or any combination thereof. In some embodiments, the electrochemical cell is capable of storing at least about 50 watt-hours of energy.

Another aspect of the present disclosure provides a high-temperature device, comprising: a container comprising a reactive metal and/or molten salt; and a seal that seals the container from an environment external to the container, the seal comprising: a ceramic material exposed to the reactive metal and/or molten salt, wherein the ceramic material is chemically resistant to the reactive metal and/or molten salt at a temperature of at least 100° C.; and a first metal collar joined to the ceramic material, wherein the first metal collar has a coefficient of thermal expansion (CTE) of less than 8 ppm/° C.

In some embodiments, the first metal collar has a Young's Modulus of less than 100 GPa. In some embodiments, the ceramic material has a CTE of less than 5 µm/m/° C. In some embodiments, the ceramic material comprises aluminum nitride (AlN). In some embodiments, the first metal collar comprises zirconium (Zr) or tungsten (W). In some embodiments, the device further comprises a second metal collar joined to the first metal collar. In some embodiments, the second metal collar is joined to a lid of the container via a weld or braze. In some embodiments, the second metal collar is a ferrous alloy. In some embodiments, the first metal collar is less than about 1,000 microns thick. In some embodiments, the device further comprises a third metal collar joined to the ceramic material. In some embodiments, the third metal collar is joined to a conductor, thereby forming a hermetic and electrically isolated seal between the conductor and the container. In some embodiments, the first metal collar or the second metal collar comprises a structural feature that relieves strain due to CTE mismatch in joined materials. In some embodiments, the structural feature comprises a bend. In some embodiments, the first metal collar is joined to the ceramic via a braze. In some embodiments, the braze material comprises titanium, zirconium, and/or nickel.

Another aspect of the present disclosure provides a method for selecting materials to form a seal for a high-temperature device containing a reactive material, the method comprising: rank-ordering a set of materials based on increasing or decreasing Gibbs free energy of formation ($\Delta G_r$) of each of the materials; selecting a subset of the rank-ordered materials, wherein the selected materials remain rank-ordered; and selecting a set of seal materials based on the selected rank-ordered materials, thereby eliminating a driving force for the selected rank-ordered materials to degrade when provided in the seal.

In some embodiments, the set of materials comprises compounds associated with the set of seal materials and/or the reactive material. In some embodiments, the compounds comprise a common element. In some embodiments, the common element forms a compound with the reactive material. In some embodiments, the common element is nitrogen, oxygen or sulfur. In some embodiments, the rank-ordering is based on increasing or decreasing normalized Gibbs free energy of formation ($\Delta G_{r,n}$) of each of the materials. In some embodiments, one or more reactions involving the common element aid in bonding between the selected rank-ordered materials. In some embodiments, the selected set of seal materials comprises a ceramic material and an active braze material. In some embodiments, the selected rank-ordered materials are, in order, lithium nitride ($Li_3N$), aluminum nitride (AlN) and titanium nitride (TiN). In some embodiments, the reactive material contained in the high-temperature device comprises lithium (Li), the selected ceramic material comprises aluminum nitride (AlN) and the selected active braze material comprises titanium (Ti). In some embodiments, selecting the set of seal materials comprises selecting a seal material with an associated compound that has a $\Delta G_{r,n}$ that is more negative than a compound associated with the reactive material. In some embodiments, selecting the set of seal materials comprises selecting a ceramic material that is electrically insulating and that has a $\Delta G_{r,n}$ that is more negative than a compound associated with the reactive material. In some embodiments, selecting the set of seal materials further comprises selecting an active braze material with an associated compound that has a $\Delta G_{r,n}$ that is more negative than the ceramic material. In some embodiments, the method further comprises selecting a sleeve or collar to join to the seal, wherein the sleeve or collar comprises a material that is chemically compatible with the seal. In some embodiments, the method further comprises selecting a container of the device to join to the sleeve or collar, wherein the container comprises a material that is chemically compatible with the sleeve or collar. In some embodiments, the high-temperature device is a battery. In some embodiments, at least a pair of the selected rank-ordered materials is CTE-matched.

Another aspect of the present disclosure provides an electrochemical cell, comprising: a container comprising a reactive material maintained at a temperature of at least about 200° C.; and a seal that passes through the container and seals the container from an environment external to the container, the seal comprising a ceramic component exposed to the reactive material and a metal collar joined to the ceramic component, wherein the seal is arranged in a circumferential configuration that results in a radially compressive force of the metal collar onto the ceramic conductor, and wherein the seal is configured with a conical angle of about 20 degrees relative to a vertical orientation.

In some embodiments, the seal is hermetic. In some embodiments, the seal has a lifetime of at least about 20 years with less than about 1% failure. In some embodiments, the seal has a cycle life of at least about 300 cycles. In some embodiments, the ceramic component comprises silicon nitride ($Si_3N_4$) or aluminum nitride (AlN). In some embodiments, the metal collar comprises stainless steel.

Another aspect of the present disclosure provides an electrochemical cell, comprising: a container comprising a reactive material maintained at a temperature of at least about 200° C.; and a seal in the container that seals the container from an environment external to the container, the seal comprising a ceramic component exposed to the reactive material and a metal collar joined to the ceramic component, wherein the seal is arranged in a stacked configuration with one or more sealing interfaces that are perpendicular to a direction parallel to a conductor that passes through the seal. In some embodiments, the seal is hermetic.

In some embodiments, the seal has a lifetime of at least about 20 years with less than about 1% failure. In some embodiments, the seal has a cycle life of at least about 300 cycles. In some embodiments, the seal further comprises a ceramic material, and a metal collar adjacent to the ceramic material. In some embodiments, the ceramic material comprises aluminum nitride (AlN). In some embodiments, the metal collar comprises zirconium (Zr). In some embodiments, the temperature of the seal is at least about 200° C. In some embodiments, a height of the seal is less than about 2 inches above a top plate of the container. In some embodiments, the height of the seal is less than about 0.5 inch above a top plate of the container.

Another aspect of the present disclosure provides an electrochemical cell, comprising: a container comprising one or more materials comprising liquid components and gaseous components maintained at a temperature of at least about 100° C., wherein at least one of the materials is a reactive material; and a seal in the container that seals the container from an environment external to the container, wherein the seal is configured as a pressure relief component above a critical pressure or above a critical temperature, wherein the seal is provided adjacent a head space inside the container, wherein the head space comprises the gaseous components, and wherein the head space is above the liquid components.

In some embodiments, the electrochemical cell further comprises a conductor that protrudes through the container, wherein the seal further seals the conductor to the container. In some embodiments, the critical pressure inside the container is at least about 2 atmospheres. In some embodiments, the critical temperature in the container or of the seal is at least about 300° C. In some embodiments, the seal comprises a ceramic material. In some embodiments, the ceramic material comprises aluminum nitride (AlN). In some embodiments, the seal is brazed to the container.

Another aspect of the present disclosure provides an electrochemical cell, comprising: a container comprising a reactive material maintained at a temperature of at least about 200° C.; and a seal that seals the container from an environment external to the container, the seal comprising a ceramic material exposed to the reactive material and a metal collar joined to the ceramic material, wherein a coefficient of thermal expansion (CTE) of the metal collar is less than 30% different than the CTE of the ceramic material, and wherein the metal collar is a ferrous alloy.

In some embodiments, the ceramic material is stable in air. In some embodiments, the ceramic material is stable with lithium. In some embodiments, the ceramic material has a CTE of at least about 10 microns/m/° C. In some embodiments, the ceramic material comprises yttrium oxide ($Y_2O_3$) or lanthanum oxide ($La_2O_3$). In some embodiments, the ceramic material further comprises magnesium oxide (MgO). In some embodiments, the ceramic material comprises about 12.5% MgO. In some embodiments, the ferrous alloy is capable of being joined to the container.

Another aspect of the present disclosure provides a seal for containing a reactive material in a high-temperature device, the seal comprising: a ceramic material that is electrically isolating and has a normalized Gibbs free energy of formation ($\Delta G_{r,n}$) that is more negative than a $\Delta G_{r,n}$ of a first compound associated with the reactive material and a common element; and an active braze material that is chemically stable with the reactive material, wherein a $\Delta G_{r,n}$ of a second compound associated with the active braze material and the common element is more negative than the $\Delta G_{r,n}$ of the ceramic material.

In some embodiments, the active braze material reduces the ceramic material.

Another aspect of the present disclosure provides an electrochemical energy storage device comprising a container including a negative electrode, a positive electrode and an electrolyte disposed between the negative electrode and positive electrode, wherein the electrochemical energy storage device has a first potential difference between the negative electrode and positive electrode at a first temperature that is less than about 50° C. and a second potential difference between the negative electrode and positive electrode at a second temperature of at least about 250° C., wherein the second potential difference is greater than the first potential difference, wherein at least two of the positive electrode, electrolyte and negative electrode are liquid at the second temperature, wherein the container has a surface area-to-volume ratio of less than or equal to about 100 $m^{-1}$, and wherein the electrochemical energy storage device maintains at least about 90% of its energy storage capacity after 500 charge/discharge cycles.

In some embodiments, the container contains one or more electrochemical cells, and wherein an individual electrochemical cell of the one or more electrochemical cells includes the negative electrode, the positive electrode and the electrolyte. In some embodiments, over the charge/discharge cycle, a rate of heat generation in the individual electrochemical cell is greater than or equal to about 50% of a rate of heat loss from the individual electrochemical cell. In some embodiments, the electrochemical energy storage device maintains at least about 90% of its energy storage capacity after 1,000 charge/discharge cycles.

Another aspect of the present disclosure provides an energy storage system, comprising: a container comprising one or more energy storage cells, wherein an individual energy storage cell of the one or more energy storage cells comprises at least one liquid electrode; and a control system comprising a computer processor that is programmed to monitor at least one operating temperature of the one or more energy storage cells and/or the container, wherein the computer processor regulates a flow of electrical energy into at least a subset of the one or more energy storage cells such that the subset undergoes sustained self-heating over a charge/discharge cycle.

In some embodiments, over the charge/discharge cycle, a rate of heat generation in the individual energy storage cell is greater than or about equal to a rate of heat loss from the individual energy storage cell. In some embodiments, over the charge/discharge cycle, a rate of heat generation in the individual energy storage cell is less than or equal to about 150% of a rate of heat loss from the individual energy storage cell. In some embodiments, the computer processor monitors the at least one operating temperature and regulates the flow of electrical energy such that the at least one operating temperature is greater than or equal to about 250° C. and the at least one liquid electrode is maintained as a liquid. In some embodiments, the computer processor monitors the at least one operating temperature and regulates the flow of electrical energy such that over the charge/discharge cycle, the at least one operating temperature is greater than or equal to about 250° C. In some embodiments, the at least one liquid electrode comprises (i) lithium, sodium, potassium, magnesium, calcium, or any combination thereof, or (ii) antimony, lead, tin, tellurium, bismuth, or any combination thereof. In some embodiments, the individual energy storage cell further comprises an electrolyte adjacent to the at least one liquid electrode. In some embodiments, the electrolyte is liquid, solid or a paste. In some embodiments, the one or more energy storage cells maintain at least about 90% of their energy storage capacity after 100 charge/discharge cycles. In some embodiments, the one or more energy storage cells maintain at least about 90% of their energy storage capacity after 500 charge/discharge cycles. In some embodiments, the individual energy storage cell has an efficiency of at least about 80%. In some embodiments, the individual energy storage cell has an efficiency of at least about 80% at a current density of at least about 100 mA/$cm^2$. In some embodiments, the individual energy storage cell has an efficiency of at least about 90%. In some embodiments, the individual energy storage cell has an efficiency of at least about 90% at a current density of at least about 100 mA/cm$^2$.

Another aspect of the present disclosure provides an energy storage device comprising a negative electrode, a positive electrode and an electrolyte disposed between the negative electrode and positive electrode, wherein at least one of the positive electrode and negative electrode is liquid at an operating temperature of the energy storage device that is greater than a non-operating temperature of the energy storage device, wherein the energy storage device maintains at least about 90% of its energy storage capacity after 500 charge/discharge cycles, and wherein the energy storage device has an efficiency of at least about 80% at a current density of at least about 100 mA/cm$^2$.

In some embodiments, the energy storage device maintains at least about 95% of its energy storage capacity after 500 charge/discharge cycles.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" or "FIG." herein), of which:

DETAILED DESCRIPTION

Figure 1:
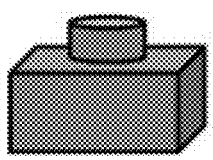
FIG. 1 is an illustration of an electrochemical cell (A) and a compilation (e.g., battery) of electrochemical cells (B and C)
Figure 1:
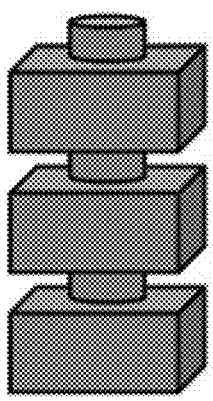
Figure 1:
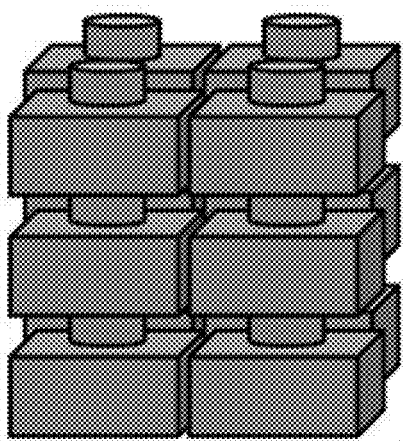

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "cell," as used herein, generally refers to an electrochemical cell. A cell can include a negative electrode of material 'A' and a positive electrode of material 'B', denoted as A||B. The positive and negative electrodes can be separated by an electrolyte. A cell can also include a housing, one or more current collectors, and a high temperature electrically isolating seal. In some cases, a cell can be about 4 inches wide, about 4 inches deep and about 2.5 inches tall. In some cases, a cell can be about 8 inches wide, about 8 inches deep and about 2.5 inches tall. In some examples, any given dimension (e.g., height, width or depth) of an electrochemical cell can be at least about 1, 2, 2.5, 3, 3.5, 4, 4.5, 5, 5.5, 6, 6.5, 7, 7.5, 8, 8.5, 9, 9.5, 10, 12, 14, 16, 18 or 20 inches. In an example, a cell (e.g., each cell) can have dimensions of about 4 inches×4 inches×2.5 inches. In another example, a cell (e.g., each cell) can have dimensions of about 8 inches×8 inches×2.5 inches. In some cases, a cell may have about at least about 70 Watt-hours of energy storage capacity. In some cases, a cell may have at least about 300 Watt-hours of energy storage capacity.

The term "module," as used herein, generally refers to cells that are attached together in parallel by, for example, mechanically connecting the cell housing of one cell with the cell housing of an adjacent cell (e.g., cells that are connected together in an approximately horizontal packing plane). In some cases, the cells are connected to each other by joining features that are part of and/or connected to the cell body (e.g., tabs protruding from the main portion of the cell body). A module can include a plurality of cells in parallel. A module can comprise any number of cells, e.g., at least about 2, 3, 4, 5, 6, 7, 8, 9, 10, 11, 12, 13, 14, 15, 16, 17, 18, 19, 20, or more cells. In some cases, a module comprises at least about 4, 9, 12, or 16 cells. In some cases, a module is capable of storing about 700 Watt-hours of energy and/or delivering at least about 175 Watts of power. In some cases, a module is capable of storing at least about 1080 Watt-hours of energy and/or delivering at least about 500 Watts of power. In some cases, a module is capable of storing at least about 1080 Watt-hours of energy and/or delivering at least about 200 Watts (e.g., about 500 Watts) of power. In some cases, a module can include a single cell.

The term "pack," as used herein, generally refers to modules that are attached through different electrical connections (e.g., vertically). A pack can comprise any number of modules, e.g., at least about 1, 2, 3, 4, 5, 6, 7, 8, 9, 10, 11, 12, 13, 14, 15, 16, 17, 18, 19, 20, or more modules. In some cases, a pack comprises at least about 3 modules. In some cases, a pack is capable of storing at least about 2 kilo-Watt-hours of energy and/or delivering at least about 0.4 kilo-Watts (e.g., at least about 0.5 kilo-Watts or 1.0 kilo-Watts) of power. In some cases, a pack is capable of storing at least about 3 kilo-Watt-hours of energy and/or delivering at least about 0.75 kilo-Watts (e.g., at least about 1.5 kilo-Watts) of power. In some cases, a pack comprises at least about 6 modules. In some cases, a pack is capable of storing about 6 kilo-Watt-hours of energy and/or delivering at least about 1.5 kilo-Watts (e.g., about 3 kilo-Watts) of power.

The term "core," as used herein generally refers to a plurality of modules or packs that are attached through different electrical connections (e.g., in series and/or parallel). A core can comprise any number of modules or packs, e.g., at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, or more packs. In some cases, the core also comprises mechanical, electrical, and thermal systems that allow the core to efficiently store and return electrical energy in a controlled manner. In some cases, a core comprises at least about 12 packs. In some cases, a core is capable of storing at least about 25 kilo-Watt-hours of energy and/or delivering at least about 6.25 kilo-Watts of power. In some cases, a core comprises at least about 36 packs. In some cases, a core is capable of storing at least about 200 kilo-Watt-hours of energy and/or delivering at least about 40, 50, 60, 70, 80, 90 or 100 kilo-Watts or more of power.

The term "core enclosure", or "CE," as used herein, generally refers to a plurality of cores that are attached through different electrical connections (e.g., in series and/or parallel). A CE can comprise any number of cores, e.g., at least about 1, 2, 3, 4, 5, 6, 7, 8, 9, 10, 11, 12, 13, 14, 15, 16, 17, 18, 19, 20, or more cores. In some cases, the CE contains cores that are connected in parallel with appropriate by-pass electronic circuitry, thus enabling a core to be disconnected while continuing to allow the other cores to store and return energy. In some cases, a CE comprises at least 4 cores. In some cases, a CE is capable of storing at least about 100 kilo-Watt-hours of energy and/or delivering about 25 kilo-Watts of power. In some cases, a CE comprises 4 cores. In some cases, a CE is capable of storing about 100 kilo-Watt-hours of energy and/or delivering about 25 kilo-Watts of power. In some cases, a CE is capable of storing about 400 kilo-Watt-hours of energy and/or delivering at least about 80 kilo-Watts, e.g., at least or about 80, 100, 120, 140, 160, 180 or 200 kilo-Watts or more of power.

The term "system," as used herein, generally refers to a plurality of cores or CEs that are attached through different electrical connections (e.g., in series and/or parallel). A system can comprise any number of cores or CEs, e.g., at least about 2, 3, 4, 5, 6, 7, 8, 9, 10, 11, 12, 13, 14, 15, 16, 17, 18, 19, 20, or more cores. In some cases, a system comprises 20 CEs. In some cases, a system is capable of storing about 2 mega-Watt-hours of energy and/or delivering at least about 400 kilo-Watts (e.g., about 500 kilo-Watts or about 1000 kilo-Watts) of power. In some cases, a system comprises 5 CEs. In some cases, a system is capable of storing about 2 mega-Watt-hours of energy and/or delivering at least about 400 kilo-Watts, e.g., at least about 400, 500, 600, 700, 800, 900, 1000 kilo-Watts or more of power.

A group of cells (e.g., a core, a CE, a system, etc.) with a given energy capacity and power capacity (e.g., a CE or a system capable of storing a given amount of energy) may be configured to deliver at least about 10%, at least about 20%, at least about 30%, at least about 40%, at least about 50%, at least about 60%, at least about 70%, at least about 80%, at least about 90%, at least about 95%, or about 100% of a given (e.g., rated) power level. For example, a 1000 kW system may be capable of also operating at 500 kW, but a 500 kW system may not be able to operate at 1000 kW. In some cases, a system with a given energy capacity and power capacity (e.g., a CE or a system capable of storing a given amount of energy) may be configured to deliver less than about 100%, less than about 110%, less than about 125%, less than about 150%, less than about 175%, or less than about 200% of a given (e.g., rated) power level, and the like. For example, the system may be configured to provide more than its rated power capacity for a period of time that is less than the time it may take to consume its energy capacity at the power level that is being provided (e.g., provide power that is greater than the rated power of the system for a period of time corresponding to less than about 1%, less than about 10% or less than about 50% of its rated energy capacity).

The term "battery," as used herein, generally refers to one or more electrochemical cells connected in series and/or parallel. A battery can comprise any number of electrochemical cells, modules, packs, cores, CEs or systems. A battery may undergo at least one charge/discharge or discharge/charge cycle ("cycle").

The term "direct metal-to-metal joining" or "direct metal-to-metal joint," as used herein, generally refers to an electrical connection where two metal surfaces are brought into contact (e.g., by forming a braze or a weld). In some examples, direct metal-to-metal joints do not include wires.

The term "interconnect," as used herein, generally refers to any electrical connection other than a direct metal-to-metal joint. Interconnects can include wires or bent sheet metal components designed to pass current. Interconnects may be compliant (e.g., flexible).

The term "wire," as used herein, generally refers to any cord, strip, or elongated electrical conduit. Wires can be flexible. As used herein, a braided metal strip is a wire. In some cases, a busbar is a wire.

The term "electronically," as used herein, generally refers to a situation in which electrons can readily flow between two or more components with little resistance. Components that are in electronic communication with one another can be in electrical communication with one another.

The term "vertical," as used herein, generally refers to a direction that is parallel to the force of gravity.

The term "charge cutoff voltage" or "CCV," as used herein, generally refers to the voltage at which a cell is fully or substantially fully charged, such as a voltage cutoff limit used in a battery when cycled in a constant current mode.

The term "open circuit voltage" or "OCV," as used herein, generally refers to the voltage of a cell (e.g., fully or partially charged) when it is disconnected from any circuit or external load (i.e., when no current is flowing through the cell).

The term "voltage" or "cell voltage," as used herein, generally refers to the voltage of a cell (e.g., at any state of charge or charging/discharging condition). In some cases, voltage or cell voltage may be the open circuit voltage. In some cases, the voltage or cell voltage can be the voltage during charging or during discharging.

Voltages of the present disclosure may be taken or represented with respect to reference voltages, such as ground (0 volt (V)), or the voltage of the opposite electrode in an electrochemical cell.

The term "stable," as used herein to describe a material, generally refers to a material that is thermodynamically stable, chemically stable, thermochemically stable, electrochemically stable, or any combination thereof. A stable material may not be chemically or electrochemically reduced or attacked or corroded. Any aspects of the disclosure described in relation to stable, thermodynamically stable or chemically stable materials may equally apply to thermodynamically stable, chemically stable, thermochemically stable and/or electrochemically stable materials at least in some configurations.

Seals for High-Temperature Devices

An aspect of the present disclosure provides a seal for a high-temperature device. The device can be a high temperature reactive material device that contains/comprises one or more reactive materials. For example, the high-temperature device can contain a reactive material. In some cases, the device can be a high-temperature reactive metal device. The device can be, without limitation, for the production and/or handling of a reactive material, such as, for example, a reactive metal (e.g., lithium or sodium) and/or a chemical with a strong chemical reducing capability (e.g., reactive chemical), for semiconductor manufacturing, for a nuclear reactor (e.g., nuclear fusion reactor, nuclear reactor that uses a molten salt or metal, such as, for example, molten sodium or lithium or molten sodium- or lithium-containing alloys, as a coolant), for a heterogeneous reactor, for a chemical processing device, for a chemical transportation device, for a chemical storage device, or for a battery (e.g., a liquid metal battery). For instance, some batteries operate at high temperatures (e.g., at least about 100° C. or 300° C.) and have reactive metal vapors (e.g., lithium, sodium, potassium, magnesium, or calcium) that may need to be sufficiently contained within the battery. In some examples, such high-temperature devices operate, are heated to and/or maintained at a temperature of at least about 100° C., 150° C., 200° C., 250° C., 300° C., 350° C., 400° C., 450° C., 500° C., 550° C., 600° C., 650° C., 700° C., 750° C., 800° C., 850° C., 900° C., or more. At such temperatures, one or more components of the device can be in a liquid (or molten) or vaporized state.

The seal can comprise a ceramic material (e.g., aluminum nitride (AlN)) that is in contact with the reactive material (e.g., a reactive metal or molten salt) contained in the device. The ceramic material can be capable of being chemically resistant to a reactive material (e.g., a reactive material contained in the device, such as, for example, reactive metal or molten salt). The ceramic material can be capable of being chemically resistant to the reactive material when the device operates at a high temperature (e.g., at least about 100° C., at least about 150° C., at least about 200° C., at least about 250° C., at least about 300° C., at least about 350° C., at least about 400° C., at least about 500° C., at least about 600° C., at least about 700° C., at least about 800° C., or at least about 900° C.).

The seal can comprise a metal collar or sleeve (e.g., made from stainless steel (SS) or zirconium). A sleeve and/or the collar design can be coefficient of thermal expansion (CTE)-accommodating (e.g., can accommodate differences in CTE (also "CTE mismatch" herein)). In some cases, a sleeve can be a collar. In some cases, a collar can be conical. For example, a collar can be a conical metal (e.g., zirconium) collar. Any aspects of the disclosure described in relation to collars may equally apply to sleeves at least in some configurations, and vice versa.

The seal can comprise an active metal braze disposed between the ceramic material and at least one of the metal collar/sleeve and the device. The active metal braze can comprise a metal species that chemically reduces the ceramic material (e.g., titanium (Ti) or zirconium (Zr)).

In some cases, the seal can surround an electrically conductive feed-through (and can electrically isolate the feed-through from the housing of the device), a thermocouple or a voltage sensor. For example, the ceramic material can be an insulator.

In some examples, the seal may be capable of being chemically resistant to reactive materials in the device at a temperature of at least about 100° C., at least about 150° C., at least about 200° C., at least about 250° C., at least about 300° C., at least about 350° C., at least about 400° C., at least about 500° C., at least about 600° C., at least about 700° C., at least about 800° C., or at least about 900° C. In some examples the seal may be capable of being chemically resistant to reactive materials at such temperatures for at least about 6 months, 1 year, 2 years, 5 years, 10 years, or more. In some examples, the device can be a high-temperature reactive metal device, and the seal can be capable of being chemically resistant to materials in the device that comprise the reactive metal. In an example, the seal is capable of being resistant to lithium vapor at a temperature of at least about 350° C. for at least about one year. The seal can retain the reactive material (e.g., vapors of the reactive material) in the device. For example, the seal can retain reactive metal vapors and/or molten salt vapors in the device.

Electrochemical Cells, Devices and Systems

The present disclosure provides electrochemical energy storage devices (e.g., batteries) and systems. An electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge.

In some examples, an electrochemical cell is a liquid metal battery cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkaline earth metal (e.g., magnesium, calcium) or alkali metal (e.g., lithium, sodium, potassium) negative electrode, an electrolyte, and a molten metal positive electrode. The molten metal positive electrode can include, for example, one or more of tin, lead, bismuth, antimony, tellurium and selenium. For example, the positive electrode can include Pb or a Pb—Sb alloy. The positive electrode can also include one or more transition metals or d-block elements (e.g., Zn, Cd, Hg) alone or in combination with other metals, metalloids or non-metals, such as, for example, a Zn—Sn alloy or Cd—Sn alloy. In some examples, the positive electrode can comprise a metal or metalloid that has only one stable oxidation state (e.g., a metal with a single or singular oxidation state). Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali or alkaline earth metal alloyed in the positive electrode.

In some examples, an electrochemical energy storage device includes a liquid metal negative electrode, a liquid metal positive electrode, and a liquid salt electrolyte separating the liquid metal negative electrode and the liquid metal positive electrode. The negative electrode can include an alkali or alkaline earth metal, such as lithium, sodium, potassium, rubidium, cesium, magnesium, barium, calcium, sodium, or combinations thereof. The positive electrode can include elements selected from transition metals or d-block elements (e.g., Group 12), Group IIIA, IVA, VA and VIA of the periodic table of the elements, such as zinc, cadmium, mercury, aluminum, gallium, indium, silicon, germanium, tin, lead, pnicogens (e.g., arsenic, bismuth and antimony), chalcogens (e.g., sulfur, tellurium and selenium), or combinations thereof. In some examples, the positive electrode comprises a Group 12 element of the periodic table of the elements, such as one or more of zinc (Zn), cadmium (Cd) and mercury (Hg). In some cases, the positive electrode may form a eutectic or off-eutectic mixture (e.g., enabling lower operating temperature of the cell in some cases). In some examples, the positive electrode comprises a first positive electrode species and a second positive electrode species at a ratio (mol-%) of about 20:80, 40:60, 50:50, or 80:20 of the first positive electrode species to the second electrode species. In some examples, the positive electrode comprises Sb and Pb at a ratio (mol-%) of about 20:80, 40:60, 50:50, or 80:20 Sb to Pb. In some examples, the positive electrode comprises between about 20 mol % and 80 mol-% of a first positive electrode species mixed with a second positive electrode species. In some cases, the positive electrode comprises between about 20 mol-% and 80 mol-% Sb (e.g., mixed with Pb). In some cases, the positive electrode comprises between about 20 mol-% and 80 mol-% Pb (e.g., mixed with Sb). In some examples, the positive electrode comprises one or more of Zn, Cd, Hg, or such material(s) in combination with other metals, metalloids or non-metals, such as, for example, a Zn—Sn alloy, Zn—Sn alloy, Cd—Sn alloy, Zn—Pb alloy, Zn—Sb alloy, or Bi. In an example, the positive electrode can comprise 15:85, 50:50, 75:25 or 85:15 mol-% Zn:Sn.

The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte (e.g., in Type 1 or Type 2 chemistries) includes lithium chloride. In some examples, the electrolyte can comprise sodium fluoride (NaF), sodium chloride (NaCl), sodium bromide (NaBr), sodium iodide (NaI), lithium fluoride (LiF), lithium chloride (LiCl), lithium bromide (LiBr), lithium iodide (LiI), potassium fluoride (KF), potassium chloride (KCl), potassium bromide (KBr), potassium iodide (KI), calcium fluoride ($CaF_2$), calcium chloride ($CaCl_2$), calcium bromide ($CaBr_2$), calcium iodide ($CaI_2$), or any combination thereof. In another example, the electrolyte includes magnesium chloride ($MgCl_2$). As an alternative, the salt of the active alkali metal can be, for example, a non-chloride halide, bistriflimide, fluorosulfano-amine, perchlorate, hexaflourophosphate, tetrafluoroborate, carbonate, hydroxide, nitrate, nitrite, sulfate, sulfite, or combinations thereof. In some cases, the electrolyte can comprise a mixture of salts (e.g., 25:55:20 mol-% LiF:LiCl:LiBr, 50:37:14 mol-% LiCl:LiF:LiBr, etc.). The electrolyte may exhibit low (e.g., minimal) electronic conductance (e.g., electronic shorting may occur through the electrolyte via valence reactions of $PbCl_2 \leftrightarrow PbCl_3$ which increases electronic conductance). For example, the electrolyte can have an electronic transference number (i.e., percentage of electrical (electronic and ionic) charge that is due to the transfer of electrons) of less than or equal to about 0.03% or 0.3%.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., about 150° C., about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., at least about 700° C., at least about 800° C., or at least about 900° C. In such a case, the negative electrode, electrolyte and positive electrode can be in a liquid (or molten) state. In some situations, the battery cell is heated to between about 200° C. and about 600° C., between about 500° C. and about 550° C., or between about 450° C. and about 575° C.

In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells are maintained at a given operating temperature (e.g., a cell operating temperature above the freezing point of at least one of the liquid components) without the need for additional energy to be supplied to the system to maintain the operating temperature.

Electrochemical cells of the disclosure may be adapted to cycle between charged (or energy storage) modes and discharged modes. In some examples, an electrochemical cell can be fully charged, partially charged or partially discharged, or fully discharged.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode). A cell can comprise materials that are configured for use in Type 2 mode of operation. A cell can comprise materials that are configured for use in Type 1 mode of operation. In some cases, a cell can be operated in both a high voltage (Type 2) operating mode and the low voltage (Type 1) operating mode. For example, a cell with positive and negative electrode materials that are ordinarily configured for use in a Type 1 mode can be operated in a Type 2 mode of operation. A cell can be cycled between Type 1 and Type 2 modes of operation. A cell can be initially charged (or discharged) under Type 1 mode to a given voltage (e.g., 0.5 V to 1 V), and subsequently charged (then discharged) under Type 2 mode to a higher voltage (e.g., 1.5 V to 2.5 V, or 1.5 V to 3 V). In some cases, cells operated under Type 2 mode can operate at a voltage between electrodes that can exceed those of cells operated under Type 1 mode. In some cases, Type 2 cell chemistries can operate at a voltage between electrodes that can exceed those of Type 1 cell chemistries operated under Type 1 mode. Type 2 cells can be operated in Type 2 mode.

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Li, Na, K, Mg, Ca). During charging, the alloy at the positive electrode can disassociate to yield cations of the negative electrode material (e.g., $Li^+$, $Na^+$, $K^+$, $Mg^+$, $Ca^+$), which migrates into the electrolyte. The electrolyte can then provide cations (e.g., the cation of the negative electrode material) to the negative electrode, where the cations accept one or more electrons from an external circuit and are converted back to a neutral metal species, which replenishes the negative electrode to provide a cell in a charged state. A Type 1 cell can operate in a push-pop fashion, in which the entry of a cation into the electrolyte results in the discharge of the same cation from the electrolyte.

In an example Type 2 cell, in a discharged state the electrolyte comprises cations of the negative electrode material (e.g., $Li^+$, $Na^+$, $K^+$, $Mg^+$, $Ca^{2+}$), and the positive electrode comprises positive electrode material (e.g., Sb, Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten (e.g., to avoid corrosion from Zn), tungsten carbide or molybdenum negative collector not comprising Fe—Ni foam. Concurrently, positive electrode material from the positive electrode sheds electrons (e.g., to a positive current collector) and dissolves into the electrolyte as cations of the positive electrode material (e.g., $Sb^{3+}$, $Pb^{2+}$, $Sn^{2+}$, $Zn^{2+}$, $Hg^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

In some implementations, negative electrode material may not need to be provided at the time of assembly of a cell that can be operated in a Type 2 mode. For example, a Li∥Pb cell or an energy storage device comprising such cell(s) can be assembled in a discharged state having only a Li salt electrolyte and a Pb or Pb alloy (e.g., Pb—Sb) positive electrode (i.e., Li metal may not be required during assembly).

Although electrochemical cells of the present disclosure have been described, in some examples, as operating in a Type 1 mode or Type 2 mode, other modes of operation are possible. Type 1 mode and Type 2 mode are provided as examples and are not intended to limit the various modes of operation of electrochemical cells disclosed herein.

In some cases, an electrochemical cell is a high temperature battery that utilizes a liquid metal negative electrode (e.g., Na, Li), and a solid ion-conducting (e.g., β"-alumina ceramic) electrolyte. In some instances, the solid ion-conducting electrolyte operates above about 100° C., above about 150° C., above about 200° C., above about 250° C., above about 300° C., or above about 350° C. The electrolyte may comprise molten chalcogenide (e.g., S, Se, Te) and/or a molten salt comprising a transition metal halide (e.g., $NiCl_3$, $FeCl_3$). The electrolyte may include other supporting electrolyte compounds (e.g., NaCl, NaF, NaBr, NaI).

Batteries and Housings

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell (e.g., positive electrode) can contact and be electrically coupled with an endwall of the container. A second one of the electrodes of the cell (e.g., negative electrode) can contact and be electrically coupled with a conductive feedthrough or conductor (e.g., negative current lead) on the container lid (collectively referred to herein as "cell lid assembly," "lid assembly" or "cap assembly" herein). An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g., graphite sheath or crucible). In some cases, a housing and/or container may be a battery housing and/or container.

A cell can have any cell and seal configuration disclosed herein. For instance, the active cell materials can be held within a sealed steel/stainless steel container with a high temperature seal on the cell lid. A negative current lead can pass through the cell lid (and be sealed to the cell lid by the dielectric high temperature seal), and connect with a porous negative current collector (e.g., metal foam) suspended in an electrolyte. In some cases, the cell can use a graphite sheath, coating, crucible, surface treatment or lining (or any combination thereof) on the inner wall of the cell crucible. In other cases, the cell may not use a graphite sheath, coating, crucible, surface treatment or lining on an inner wall of the cell crucible.

During cell operation, material (e.g., Fe) from a wall of the cell can react under the higher voltage potential (e.g., Type 2 mode), and ionize as a soluble species in the electrolyte. Hence, the wall material can dissolve into the electrolyte and subsequently interfere with the cell's electrochemistry. For example, the dissolved material can deposit on the negative electrode, which, in some cases, can grow as dendrites and stretch across the electrolyte to one or more walls of the cell, or toward the positive electrode, which can result in a short failure. The present disclosure provides various approaches for suppressing or otherwise helping minimize the dissolution of solid (passive) cell material such as Fe and its potentially negative effects on cell performance by, for example, formation of dendrites and cell shorting. In some cases, a cell can be designed such that increased spacing between the negative electrode and a wall of the cell suppresses or otherwise helps minimize the ability of dendrites from forming and shorting the wall to the inner wall. A cell can include an electrically insulating, and chemically stable sheath or coating between one or more walls of the cell and the negative electrode, electrolyte and/or positive electrode to minimize or prevent shorting to the one or more walls of the cell. In some cases, the cell can be formed of a non-ferrous container or container lining, such as a carbon-containing material (e.g., graphite), or a carbide (e.g., SiC, TiC), or a nitride (e.g., TiN, BN), or a chemically stable metal (e.g., Ti, Ni, B). The container or container lining material may be electrically conductive. Such non-limiting approaches can be used separately or in combination, for suppressing or otherwise helping minimize chemical interactions with Fe or other cell wall materials, and any subsequent negative effects on cell performance.

A battery, as used herein, can comprise a plurality of electrochemical cells. The cell(s) can include housings. Individual cells can be electrically coupled to one another in series and/or in parallel. In series connectivity, the positive terminal of a first cell is connected to a negative terminal of a second cell. In parallel connectivity, the positive terminal of a first cell can be connected to a positive terminal of a second, and/or additional, cell(s). Similarly, cell modules, packs, cores, CEs and systems can be connected in series and/or in parallel in the same manner as described for cells.

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of one or more electrochemical cells). The cells can be arranged in parallel, in series, or both in parallel and in series (C).

Further, as described in greater detail elsewhere herein, the cells can be arranged in groups (e.g., modules, packs, cores, CEs, systems, or any other group comprising one or more electrochemical cells). In some cases, such groups of electrochemical cells may allow a given number of cells to be controlled or regulated together at the group level (e.g., in concert with or instead of regulation/control of individual cells).

Electrochemical cells of the disclosure (e.g., Type 1 cell operated in Type 2 mode, Type 1 cell operated in Type 1 mode, or Type 2 cell) may be capable of storing and/or receiving input of ("taking in") a suitably large amount of energy (e.g., substantially large amounts of energy). In some instances, a cell is capable of storing and/or taking in and/or discharging about 1 watt-hour (Wh), about 5 Wh, 25 Wh, about 50 Wh, about 100 Wh, about 250 Wh, about 500 Wh, about 1 kilo-Watt-hour (kWh), about 1.5 kWh, about 2 kWh, about 3 kWh, about 5 kWh, about 10 kWh, about 15 kWh, about 20 kWh, about 30 kWh, about 40 kWh, or about 50 kWh. In some instances, the battery is capable of storing and/or taking in and/or discharging at least about 1 Wh, at least about 5 Wh, at least about 25 Wh, at least about 50 Wh, at least about 100 Wh, at least about 250 Wh, at least about 500 Wh, at least about 1 kWh, at least about 1.5 kWh, at least about 2 kWh, at least about 3 kWh, at least about 5 kWh, at least about 10 kWh, at least about 15 kWh, at least about 20 kWh, at least about 30 kWh, at least about 40 kWh, or at least about 50 kWh. It is recognized that the amount of energy stored in an electrochemical cell and/or battery may be less than the amount of energy taken into the electrochemical cell and/or battery (e.g., due to inefficiencies and losses). A cell can have such energy storage capacities upon operating at any of the current densities herein.

A cell can be capable of providing a current at a current density of at least about 10 milli-amperes per square centimeter ($mA/cm^2$), 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95% and the like. In some instances, a cell can be capable of operating at a charge efficiency (e.g., Coulombic charge efficiency) of at least about 10%, 20%, 30%, 40%, 50%, 60%, 70%, 80%, 85%, 90%, 95%, 98%, 99%, 99.5%, 99.9%, 99.95%, 99.99%, and the like.

In a charged state, electrochemical cells of the disclosure (e.g., Type 1 cell operated in Type 2 mode, Type 1 cell operated in Type 1 mode, or Type 2 cell) can have (or can operate at) a voltage of at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In some cases, a cell can have an open circuit voltage (OCV) of at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In an example, a cell has an open circuit voltage greater than about 0.5 V, greater than about 1 V, greater than about 2 V, or greater than about 3 V. In some cases, a charge cutoff voltage (CCV) of a cell is from about 0.5 V to 1.5 V, 1 V to 3 V, 1.5 V to 2.5 V, 1.5 V to 3 V, or 2 V to 3 V in a charged state. In some cases, a charge cutoff voltage (CCV) of a cell is at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some cases, a voltage of a cell (e.g., operating voltage) is between about 0.5 V and 1.5 V, 1 V and 2 V, 1 V and 2.5 V, 1.5 V and 2.0 V, 1 V and 3 V, 1.5 V and 2.5 V, 1.5 V and 3 V, or 2 V and 3 V in a charged state. A cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1,000 cycles, 2,000 cycles, 3,000 cycles, 4,000 cycles, 5,000 cycles, 10,000 cycles, 20,000 cycles, 50,000 cycles, 100,000 cycles, or 1,000,000 or more cycles (also "charge/discharge cycles" herein).

In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container or seal. A cell can be operated without a substantial decrease in capacity. The operating lifetime of a cell can be limited, in some cases, by the life of the container, seal and/or cap of the cell. During operation at an operating temperature of the cell, the cell can have a negative electrode, electrolyte and positive electrode in a liquid (or molten) state.

An electrochemical cell of the present disclosure can have a response time of any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

A compilation or array of cells (e.g., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

In some implementations, one or more types of cells can be included in energy storage systems of the present disclosure. For example, an energy storage device can comprise Type 2 cells or a combination of Type 1 cells and Type 2 cells (e.g., 50% Type 1 cells and 50% Type 2 cells). Such cells can be operated under Type 2 mode. In some cases, a first portion of the cells may be operated in Type 1 mode, and a second portion of the cells may be operated in Type 2 mode.

Batteries of the disclosure may be capable of storing and/or taking in a suitably large amount of energy (e.g., a substantially large amount of energy) for use with a power grid (i.e., a grid-scale battery) or other loads or uses. In some instances, a battery is capable of storing and/or taking in and/or discharging about 5 kilo-Watt-hour (kWh), about 25 kWh, about 50 kWh, about 100 kWh, about 500 kWh, about 1 mega-Watt-hour (MWh), about 1.5 MWh, about 2 MWh, about 3 MWh, about 5 MWh, about 10 MWh, about 25 MWh, about 50 MWh, or about 100 MWh. In some instances, the battery is capable of storing and/or taking in at least about 1 kWh, at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, at least about 4 MWh, at least about 5 MWh, at least about 10 MWh, at least about 25 MWh, at least about 50 MWh, or at least about 100 MWh.

In some instances, the cells and cell housings are stackable. Any suitable number of cells can be stacked. Cells can be stacked side-by-side, on top of each other, or both. In some instances, at least about 3, 6, 10, 50, 100, or 500 cells are stacked. In some cases, a stack of 100 cells is capable of storing and/or taking in at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

An electrochemical energy storage device can include one or more individual electrochemical cells. An electrochemical cell can be housed in a container, which can include a container lid (e.g., cell cap) and seal component. The device can include at least 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the container from the container lid. Such a component may be constructed from an electrically insulating material, such as, for example, glass, oxide ceramics, nitride ceramics, chalcogenides, or a combination thereof (e.g., ceramic, silicon oxide, aluminum oxide, nitrides comprising boron nitride, aluminum nitride, zirconium nitride, titanium nitride, carbides comprising silicon carbide, titanium carbide, or other oxides comprising of lithium oxide, calcium oxide, barium oxide, yttrium oxide, silicon oxide, aluminum oxide, or lithium nitride, lanthanum oxide, or any combinations thereof). The seal may be made hermetic by one or more methods. For example, the seal may be subject to relatively high compressive forces (e.g., greater than about 1,000 psi or greater than about 10,000 psi) between the container lid and the container in order to provide a seal in addition to electrical isolation. Alternatively, the seal may be bonded through a weld, a braze, or other chemically adhesive material that joins relevant cell components to the insulating sealant material.

Figure 2:
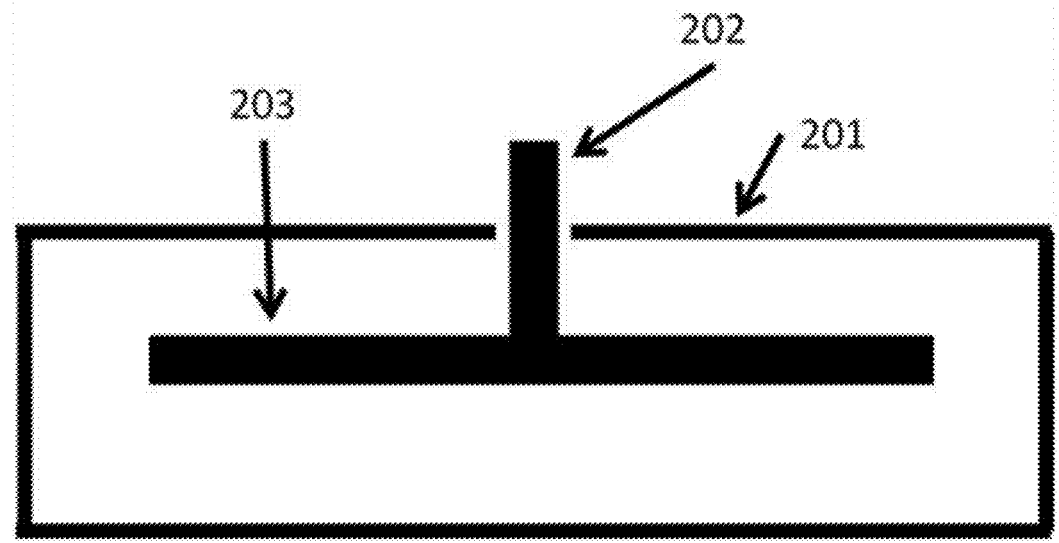
FIG. 2 is a schematic cross-sectional illustration of a housing having a conductor in electrical communication with a current collector pass through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, about 0.005, about 0.01, about 0.05, about 0.1, about 0.15, about 0.2, about 0.3, about 0.4, or about 0.5. In some cases, the ratio of the area of the aperture to the area of the housing is less than or equal to about 0.001, less than or equal to about 0.005, less than or equal to about 0.01, less than or equal to about 0.05, less than or equal to about 0.1, less than or equal to about 0.15, less than or equal to about 0.2, or less than or equal to about 0.3, less than or equal to about 0.4, or less than or equal to about 0.5.

A cell can comprise an electrically conductive housing and a conductor in electrical communication with a current collector. The conductor protrudes through the housing through an aperture in the housing and may be electrically isolated from the housing. The ratio of the area of the aperture to the area of the housing may be less than about 0.3, 0.2, 0.15, 0.1, 0.05, 0.01, 0.005, or 0.001 (e.g., less than about 0.1).

A cell housing can comprise an electrically conductive container and a conductor in electrical communication with a current collector. The conductor can protrude through the container through an aperture in the container and is electrically isolated from the container. The ratio of the area of the aperture to the area of the container may be less than about 0.3, 0.2, 0.15, 0.1, 0.05, 0.01, 0.005, or 0.001 (e.g., less than about 0.1). The housing can be capable of enclosing a cell that is capable of storing and/or taking in less than about 100 Wh of energy, about 100 Wh of energy, or more than about 100 Wh of energy. The housing can be capable of enclosing a cell that is capable of storing and or taking in at least about 25 Wh of energy. The cell can be capable of storing and/or taking in at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh of energy.

Figure 3:
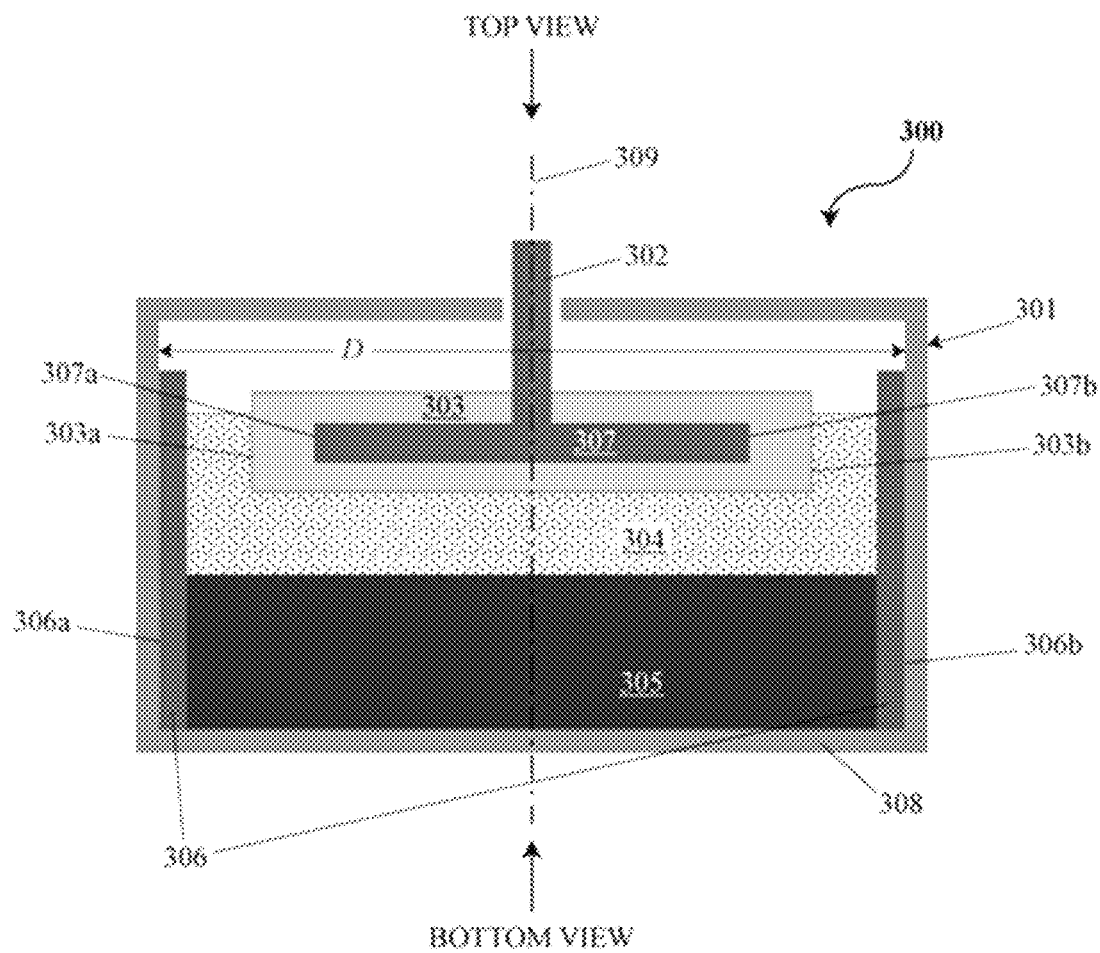
FIG. 3 is a cross-sectional side view of an electrochemical cell or battery.

FIG. 3 is a cross-sectional side view of an electrochemical cell or battery 300 comprising a housing 301, an electrically conductive feed-through (i.e., conductor, such as a conductor rod) 302 that passes through an aperture in the housing and is in electrical communication with a liquid metal negative electrode 303, a liquid metal positive electrode 305, and a liquid salt electrolyte 304 between the liquid metal electrodes 303, 305. The cell or battery 300 can be configured for use with cell chemistries operated under a low voltage mode ("Type 1 mode") or high voltage mode ("Type 2 mode"), as disclosed elsewhere herein. The conductor 302 may be electrically isolated from the housing 301 (e.g., using electrically insulating seals). The negative current collector 307 may comprise foam material 303 that behaves like a sponge, and the negative electrode liquid metal soaks into the foam. The liquid metal negative electrode 303 is in contact with the molten salt electrolyte 304. The liquid salt electrolyte is also in contact with the positive liquid metal electrode 305. The positive liquid metal electrode 305 can be in electrical communication with the housing 301 along the side walls and/or along the bottom end wall of the housing.

The housing may include a container and a container lid (e.g., cell cap). The container and container lid may be connected mechanically (e.g., welded). In some cases, the mechanical connection may comprise a chemical connection. In some instances, the container lid is electrically isolated from the container. The cell lid may or may not be electrically isolated from the negative current lead in such instances. In some instances, the container lid is electrically connected to the container (e.g., cell body). The cell lid may then be electrically isolated from the negative current lead. During operation (e.g., when in a molten state), the container lid and the container can be connected electronically (e.g., through a direct electrical connection, such as, for example, via a welded lid-to-cell body joint, or ionically through the electrolyte and the electrodes). The negative current lead may be electrically isolated from the container and/or container lid (e.g., cell cap), via, for example, the use of an electrically insulating hermetic seal. In some examples, an electrically insulating barrier (e.g., seal) may be provided between the negative current lead and the container lid. As an alternative, the seal can be in the form of a gasket, for example, and placed between the container lid, and the container. In some examples, the electrochemical cell or battery 300 may comprise two or more conductors passing through one or more apertures and in electrical communication with the liquid metal negative electrode 303. In some instances, a separator structure (not shown) may be arranged within the electrolyte 304 between the liquid negative electrode 303 and the (liquid) positive electrode 305.

The housing 301 can be constructed from an electrically conductive material such as, for example, steel, iron, stainless steel, low carbon steel, graphite, nickel, nickel based alloys, titanium, aluminum, molybdenum, tungsten, or conductive compounds such as nitrides (e.g., silicon carbide or titanium carbide), or a combination thereof (e.g., alloy).

The housing 301 can comprise a housing interior 306. The housing interior 306 may include, but is not limited to, a sheath (e.g., a graphite sheath), a coating, a crucible (e.g., a graphite crucible), a surface treatment, a lining, or any combination thereof). In one example, the housing interior 306 is a sheath. In another example, the housing interior 306 is a crucible. In yet another example, examples, the housing interior 306 is a coating or surface treatment. The housing interior 306 may be thermally conductive, thermally insulating, electrically conductive, electrically insulating, or any combination thereof. In some cases, the housing interior 306 may be provided for protection of the housing (e.g., for protecting the stainless steel material of the housing from corrosion). In some cases, the housing interior can be anti-wetting to the liquid metal positive electrode. In some cases, the housing interior can be anti-wetting to the liquid electrolyte.

The housing may comprise a lining component (e.g., a lining component that is thinner than the cell body) of a separate metal or compound, or a coating (e.g., an electrically insulating coating), such as, for example, a steel housing with a graphite lining, or a steel housing with a nitride coating or lining (e.g., boron nitride, aluminum nitride), a titanium coating or lining, or a carbide coating or lining (e.g., silicon carbide, titanium carbide). The coating can exhibit favorable properties and functions, including surfaces that are anti-wetting to the positive electrode liquid metal. In some cases, the lining (e.g., graphite lining) can be dried by heating above room temperature in air or dried in a vacuum oven before or after being placed inside the cell housing. Drying or heating the lining can remove moisture from the lining prior to adding the electrolyte, positive electrode, or negative electrode to the cell housing.

The housing 301 may include a thermally and/or electrically insulating sheath or crucible 306. In this configuration, the negative electrode 303 may extend laterally between the side walls of the housing 301 defined by the sheath or crucible without being electrically connected (i.e., shorted) to the positive electrode 305. Alternatively, the negative electrode 303 may extend laterally between a first negative electrode end 303a and a second negative electrode end 303b. When the sheath or crucible 306 is not provided, the negative electrode 303 may have a diameter (or other characteristic dimension, illustrated in FIG. 3 as the distance from 303a to 303b) that is less than the diameter (or other characteristic dimension such as width for a cuboid container, illustrated in FIG. 3 as the distance D) of the cavity defined by the housing 301.

The crucible can be made to be in electronic contact with the cell housing by means of a thin layer of a conductive liquid metal or semi-solid metal alloy located between the crucible and the cell housing, such as the elements Pb, Sn, Sb, Bi, Ga, In, Te, or a combination thereof.

The housing interior (e.g., sheath, crucible and/or coating) 306 can be constructed from a thermally insulating, thermally conductive, and/or electrically insulating or electrically conductive material such as, for example, graphite, carbide (e.g., SiC, TiC), nitride (e.g., BN), alumina, titania, silica, magnesia, boron nitride, or a mixed oxide, such as, for example, calcium oxide, aluminum oxide, silicon oxide, lithium oxide, magnesium oxide, etc. For example, as shown in FIG. 3, the sheath (or other) housing interior 306 has an annular cross-sectional geometry that can extend laterally between a first sheath end 306a and a second sheath end 306b. The sheath may be dimensioned (illustrated in FIG. 3 as the distance from 306a to 306b) such that the sheath is in contact and pressed up against the side walls of the cavity defined by the housing cavity 301. As an alternative, the housing interior 306 can be used to prevent corrosion of the container and/or prevent wetting of the cathode material up the side wall, and may be constructed out of an electronically conductive material, such as steel, stainless steel, tungsten, molybdenum, nickel, nickel based alloys, graphite, titanium, or titanium nitride. For example, the sheath may be very thin and may be a coating. The coating can cover just the inside of the walls, and/or, can also cover the bottom of the inside of the container. In some cases, the sheath (e.g., graphite sheath) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

Instead of a sheath, the cell may comprise an electrically conductive crucible or coating that lines the side walls and bottom inner surface of the cell housing, referred to as a cell housing liner, preventing direct contact of the positive electrode with the cell housing. The cell housing liner may prevent wetting of the positive electrode between the cell housing and the cell housing liner or sheath and may prevent direct contact of the positive electrode on the bottom surface of the cell housing. The sheath may be very thin and can be a coating. The coating can cover just the inside of the walls, and/or, can also cover the bottom of the inside of the container. The sheath may not fit perfectly with the housing 301 which may hinder the flow of current between the cell lining and the cell housing. To ensure adequate electronic conduction between the cell housing and the cell lining, a liquid of metal that has a low melting point (e.g., Pb, Sn, Bi), can be used to provide a strong electrical connection between the sheath/coating and the cell housing. This layer can allow for easier fabrication and assembly of the cell.

The housing 301 can also include a first (e.g., negative) current collector or lead 307 and a second (e.g., positive) current collector 308. The negative current collector 307 may be constructed from an electrically conductive material such as, for example, nickel-iron (Ni—Fe) foam, perforated steel disk, sheets of corrugated steel, sheets of expanded metal mesh, etc. The negative current collector 307 may be configured as a plate or foam that can extend laterally between a first collector end 307a and a second collector end 307b. The negative current collector 307 may have a collector diameter that is less than or similar to the diameter of the cavity defined by the housing 301. In some cases, the negative current collector 307 may have a collector diameter (or other characteristic dimension, illustrated in FIG. 3 as the distance from 307a to 307b) that is less than or similar to the diameter (or other characteristic dimension, illustrated in FIG. 3 as the distance from 303a to 303b) of the negative electrode 303. The positive current collector 308 may be configured as part of the housing 301; for example, the bottom end wall of the housing may be configured as the positive current collector 308, as illustrated in FIG. 3. Alternatively, the current collector may be discrete from the housing and may be electrically connected to the housing. In some cases, the positive current collector may not be electrically connected to the housing. The present disclosure is not limited to any particular configurations of the negative and/or positive current collector configurations.

The negative electrode 303 can be contained within the negative current collector (e.g., foam) 307. In this configuration, the electrolyte layer comes up in contact with the bottom, sides, and/or the top of the foam 307. The metal contained in the foam (i.e., the negative electrode material) can be held away from the sidewalls of the housing 301, such as, for example, by the absorption and retention of the liquid metal negative electrode into the foam, thus allowing the cell to run without the insulating sheath 306. In some cases, a graphite sheath or graphite cell housing liner (e.g., graphite crucible) may be used to prevent the positive electrode from wetting up along the side walls, which can prevent shorting of the cell.

Current may be distributed substantially evenly across a positive and/or negative liquid metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than about 105%, or less than or equal to about 115%, less than or equal to about 125%, less than or equal to about 150%, less than or equal to about 175%, less than or equal to about 200%, less than or equal to about 250%, or less than or equal to about 300% of the average density of current flowing across the surface. In some examples, the minimum density of current flowing across an area of the surface is greater than or equal to about 50%, greater than or equal to about 60%, greater than or equal to about 70%, greater than or equal to about 80%, greater than or equal to about 90%, or greater than or equal to about 95% of the average density of current flowing across the surface.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

The combined volume of positive and negative electrode material may be at least about 5%, 10%, 20%, 30%, 40%, 50%, 60%, 70%, 80%, 90%, or 95% of the volume of the battery (e.g., as defined by the outer-most housing of the battery, such as a shipping container). In some cases, the combined volume of anode and cathode material is at least about 5%, at least about 10%, at least about 20%, at least about 30%, at least about 40%, at least about 60%, at least about 75%, of the volume of the cell. The combined volume of the positive and negative electrodes material may increase or decrease (e.g., in height) during operation due to growth or expansion, or shrinkage or contraction, respectively, of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid mutual reaction compound (also "mutual reaction product" herein), which may have a density that is the same, lower, or higher than the densities of the positive and/or negative electrode materials. Although the mass of material in the electrochemical cell or battery 300 may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a mutual reaction product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

In some cases, a cell can include one or more alloyed products that are liquid, semi-liquid (or semi-solid), or solid. The alloyed products can be immiscible (or, in some cases, soluble) with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode or electrolyte, or at a location (e.g., interface) between the negative electrode and the electrolyte or between the positive electrode and the electrolyte, or any combination thereof. In an example, an alloyed product is an intermetallic between the positive electrode and the electrolyte (see, for example, FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
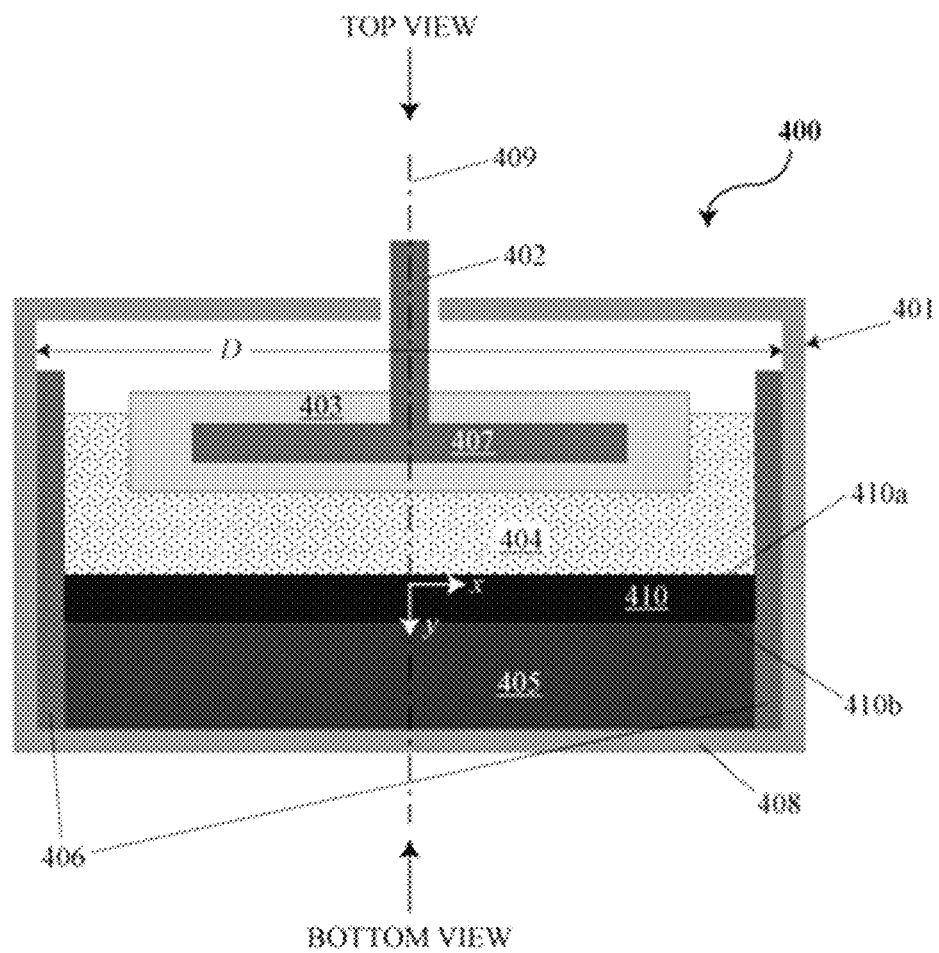
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound of a material originating from the negative electrode 403 and positive electrode material 405. For example, a negative liquid metal electrode 403 can comprise an alkali or alkaline earth metal (e.g., Na, Li, K, Mg, or Ca), the positive liquid metal electrode 405 can comprise one or more of transition metal, d-block (e.g., Group 12), Group IIIA, IVA, VA or VIA elements (e.g., lead and/or antimony and/or bismuth), and the intermetallic layer 410 can comprise a mutual reaction compound or product thereof (e.g., alkali plumbide, antimonide or bismuthide, e.g., $Na_3Pb$, $Li_3Sb$, $K_3Sb$, $Mg_3Sb_2$, $Ca_3Sb_2$, or $Ca_3Bi_2$). An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid salt electrolyte 404. The mutual reaction compound (or product) can be solid or semi-solid. In an example, the intermetallic layer 410 can form at the interface between the liquid metal cathode 405 and the liquid salt electrolyte 404. In some cases, the intermetallic layer 410 may exhibit liquid properties (e.g., the intermetallic may be semi-solid, or it may be of a higher viscosity or density than one or more adjacent phases/materials).

The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can include a thermally and/or electrically insulating sheath 406. In an example, the negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg||Sb chemistry may contain magnesium ions within the electrolyte as well as other salts (e.g., $MgCl_2$, NaCl, KCl, or a combination thereof). In some cases, in a discharged state, the cell is deficient in Mg in the negative electrode and the positive electrode comprises and alloy of Mg—Sb. In such cases, during charging, Mg is supplied from the positive electrode, passes through the electrolyte as a positive ion, and deposits onto the negative current collector as Mg. In some examples, the cell has an operating temperature of at least about 550° C., 600° C., 650° C., 700° C., or 750° C., and in some cases between about 650° C. and about 750° C. In a charged state, all or substantially all the components of the cell can be in a liquid state. Alternative chemistries exist, including Ca-Mg||Bi comprising a calcium halide constituent in the electrolyte (e.g., $CaF_2$, KF, LiF, $CaCl_2$, KCl, LiCl, $CaBr_2$, KBr, LiBr, or combinations thereof) and operating above about 500° C., Ca-Mg||Sb-Pb comprising a calcium halide constituent in the electrolyte (e.g., $CaF_2$, KF, LiF, $CaCl_2$, KCl, LiCl, $CaBr_2$, KBr, LiBr, or combinations thereof) and operating above about 500° C., Li||Pb-Sb cells comprising a lithium-ion containing halide electrolyte (e.g., LiF, LiCl, LiBr, or combinations thereof) and operating between about 350° C. and about 550° C., and Na||Pb cells comprising a sodium halide as part of the electrolyte (e.g., NaCl, NaBr, NaI, NaF, LiCl, LiF, LiBr, LiI, KCl, KBr, KF, KI, $CaCl_2$, $CaF_2$, $CaBr_2$, $CaI_2$, or combinations thereof) and operating above about 300° C. In some cases, the product of the discharge reaction may be an intermetallic compound (e.g., $Mg_3Sb_2$ for the Mg||Sb cell chemistry, $Li_3Sb$ for the Li||Pb-Sb chemistry, $Ca_3Bi_2$ for the Ca-Mg||Bi chemistry, or $Ca_3Sb_2$ for the Ca-Mg||Pb-Sb chemistry), where the intermetallic layer may develop as a distinct solid phase by, for example, growing and expanding horizontally along a direction x and/or growing or expanding vertically along a direction y at the interface between the positive electrode and the electrolyte. The growth may be axially symmetrical or asymmetrical with respect to an axis of symmetry 409 located at the center of the cell or battery 400. In some cases, the intermetallic layer is observed under Type 1 mode of operation but not Type 2 mode of operation. For example, the intermetallic layer (e.g., the intermetallic layer in FIG. 4) may not form during operation of a Type 2 cell.

Cell Lid Assemblies and Adhesive Seals

Figure 5:
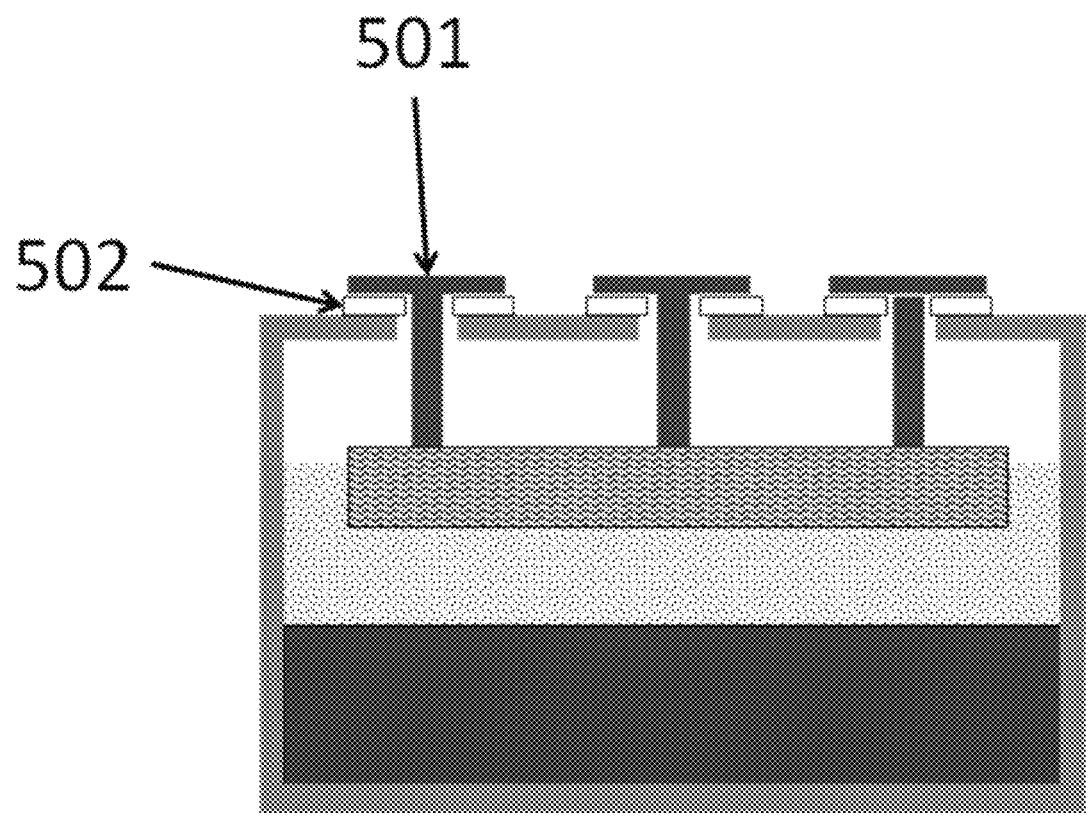
FIG. 5 is a schematic cross-sectional illustration of an electrochemical cell having feed-throughs that are electrically insulated from a housing with dielectric seal components.

Cell lid assemblies can use adhesive seals to achieve a gas tight and electrically insulating seal. As seen in FIG. 5, a conductive feed-through 501 can be electrically isolated from the housing and the housing can be sealed by an adhesive sealing material 502 disposed between the feed-through and the housing. The adhesive sealing material can include any sealant material capable of adhering to the components of the cell lid assembly that are to be sealed.

In some cases, for cells that are sealed with adhesive dielectric seals, a pressure of less than 1 psi may be sufficient to maintain a gas tight seal. In some cases, at least a part of the pressure can be supplied by the weight of one or more electrochemical cells stacked upon each other in a battery. The adhesive seal material can comprise a glass seal or a brazed ceramic, such as, for example, alumina with Cu—Ag braze alloy, or other ceramic-braze combination.

In a stacked battery configuration, it may be desirable to reduce head space (e.g., inside a cell chamber or cavity) so that relatively more of the volume of the cell can comprise anode and cathode material (e.g., such that the cell can have a higher energy storage capacity per unit volume). In some instances, the height of the head space (e.g., as measured from the top of the feed-through to the top surface of the anode) is a small fraction of the height of the battery (e.g., as measured from the top of the feed-through to the bottom surface of the housing). In some examples, the head space is about 5%, about 10%, about 15%, about 20%, or about 25% of the height of the battery. In some examples, the head space is at most about 5%, at most about 10%, at most about 15%, at most about 20%, or at most about 25% of the height of the battery.

In some examples, the combined volume of anode and cathode material is about 20%, about 30%, about 40%, about 50%, about 60%, or about 70% of the volume of the battery (e.g., as defined by the outer-most housing of the battery, such as a shipping container). In some examples, the combined volume of anode and cathode material is at least about 50%, at least about 60%, at least about 70%, at least about 80%, at least about 90%, or at least about 95% of the volume of the battery.

In some examples, the electrolyte can have a thickness (measured as the distance between negative electrode/electrolyte and positive electrode/electrolyte interfaces) of at least about 0.01 cm, 0.05 cm, 0.1 cm, 0.5 cm, 0.8 cm, 1.0 cm, 1.3 cm, 1.5 cm, 2 cm, 3 cm, 4 cm, 5 cm, 6 cm, 7 cm, 8 cm, 9 cm, 10 cm for a cell having a thickness of at least about 1 cm, 2 cm, 3 cm, 4 cm, 5 cm, 6 cm, 7 cm, 8 cm, 9 cm, 10 cm or more. In some examples, a cell has a thickness of at most about 3 cm or 4 cm, and an electrolyte with a thickness of at most about 1 cm or 2 cm.

In some situations, the use of a few or only a single conductive feed-through can result in uneven current distribution in an electrode (e.g., in the negative electrode). A plurality of conductive feed-throughs (also "conductors" herein) can more evenly distribute the current in the electrode. In some implementations, an electrochemical energy storage device comprises a housing, a liquid metal electrode, a current collector in contact with the liquid metal electrode, and a plurality of conductors that are in electrical communication with the current collector and protrude through the housing through apertures in the housing. In some examples, current is distributed substantially evenly across the liquid metal electrode.

In some examples, the liquid metal electrode is in contact with an electrolyte along a surface (and/or interface) and the current flowing across the surface (and/or interface) is uniform. The current flowing through any portion of the surface (and/or interface) may not deviate substantially from the average current through the surface. In some examples, the maximum density of current flowing across an area of the surface (and/or interface) is less than about 105%, less than about 115%, less than about 125%, less than about 150%, less than about 175%, less than about 200%, less than about 250%, or less than about 300% of the average density of current flowing across the surface (and/or interface). In some examples, the minimum density of current flowing across an area of the surface (and/or interface) is greater than about 50%, greater than about 60%, greater than about 70%, greater than about 80%, greater than about 90%, or greater than about 95% of the average density of current flowing across the surface (and/or interface).

Figure 6:
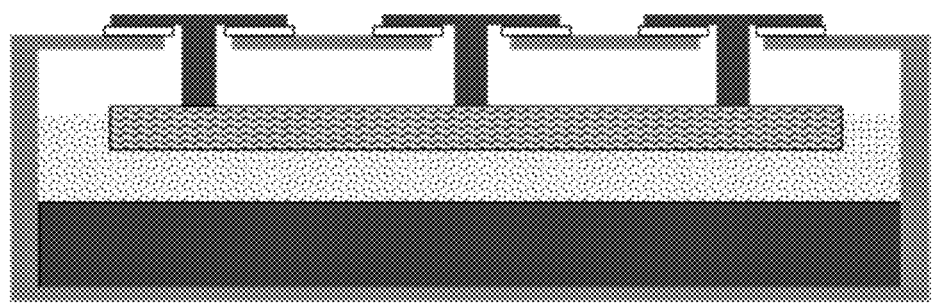
FIG. 6 shows examples of current collectors combined into a shared lid assembly (A and B)
Figure 6:
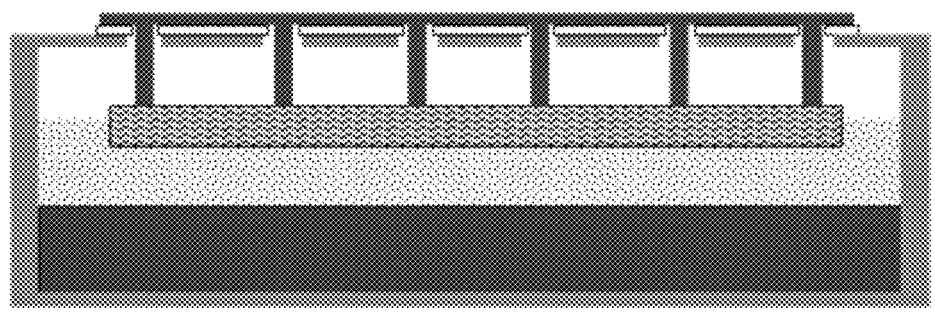

FIG. 6 shows examples of cells with multiple conductive feed-throughs. In these configurations, current collectors can be combined into a shared lid assembly for each cell. Such cell lid assemblies may be used with cells of any size. The electrochemical storage device and/or housings can comprise any number of conductive feed-throughs (e.g., 1, 2, 3, 4, 5, 6, 7, 8, 9, 10, 11, 12, 13, 14, 15, 16, 17, 18, 19, 20, or more). In some cases, the conductive feed-throughs are separate (A). In some cases, the conductive feed-throughs share a common upper portion (B).

Features and Properties of Seals

The seal can be an important part of a high temperature system containing reactive metals (e.g., a liquid metal battery). Provided herein is a method for choosing materials suitable for forming a seal and methods for designing a suitable seal for a system containing reactive liquid metals or liquid metal vapors and/or reactive molten salt(s) or reactive molten salt vapors such as, for example, a liquid metal battery (e.g., based on the selection of these materials, and considerations of thermal, mechanical, and electrical properties). The seal can also be used as part of an electrically isolated feed-through connected to a vessel comprising reactive liquid metals or reactive metal vapors for applications other than energy storage, such as fusion reactors comprising molten or high pressure Li vapor, or other applications that involve liquid sodium, potassium, and/or lithium. The use of stable ceramic and electronically conductive materials can also be appropriate for applications with reactive gases such as those used in semiconductor material processing or device fabrication.

The seal can be electrically insulating and gas-tight (e.g., hermetic). The seals can be made of materials that are not attacked by the liquid and vapor phases of system/vessel components (e.g., cell components), such as, for example, molten sodium (Na), molten potassium (K), molten magnesium (Mg), molten calcium (Ca), molten lithium (Li), Na vapor, K vapor, Mg vapor, Ca vapor, Li vapor, or any combination thereof. The method identifies a seal comprising an aluminum nitride (AlN) or silicon nitride ($Si_3N_4$) ceramic and an active alloy braze (e.g., Ti, Fe, Ni, B, Si or Zr alloy-based) as being thermodynamically stable with most reactive metal vapors, thus allowing for the design of a seal that is not appreciably attacked by metal or metal vapors.

In some implementations, the seal can physically separate the negative current lead (e.g., a metal rod that extends into the cell cavity) from the positively charged cell body (e.g., the cell can (also "container" herein) and lid). The seal can act as an electrical insulator between these cell components, and hermetically isolate the active cell components (e.g., the liquid metal electrodes, the liquid electrolyte, and vapors of these liquids). In some cases, the seal prevents external elements from entering the cell (e.g., moisture, oxygen, nitrogen, and other contaminants that may negatively affect the performance of the cell). Some examples of general seal specifications are listed in TABLE 1. Such specifications (e.g., properties and/or metrics) can include, but are not limited to, hermeticity, electrical insulation, durability, Coulombic efficiency (e.g., charge efficiency or round-trip efficiency), DC-DC efficiency, discharge time, and capacity fade rate.

TABLE 1

EXAMPLES OF GENERAL SEAL SPECIFICATIONS

| Specification | Example Value |
|---|---|
| The seal can have these properties under operating conditions: | |
| Hermetic | <1 × $10^{-8}$ atm cc/s He total leak rate |
| Electrically insulating | >1 kOhm impedance across seal |
| Durable | maintain integrity for >20 years |
| Battery metrics: | |
| Coulombic efficiency | >98% (@ ~200 mA/cm$^2$) |
| DC-DC efficiency | >70% (@ ~200 mA/cm$^2$) |
| Discharge time | 4-6 hours (@ ~200 mA/cm$^2$) |
| Capacity fade rate | <0.02%/cycle |

The seal can be hermetic, for example, to a degree quantified by a leak rate of helium (He) (e.g., leak rate from a device at operating conditions (e.g., at operating temperature, operating pressure, etc.) filled with He). In some examples, the leak rate of helium (He) can be less than about $1 \times 10^{-6}$ atmospheric cubic centimeters per second (atm cc/s), less than about $5 \times 10^{-7}$ atm cc/s, less than about $1 \times 10^{-7}$ atm cc/s, less than about $5 \times 10^{-8}$ atm cc/s, or less than about $1 \times 10^{-8}$ atm cc/s. In some cases, the leak rate of He is equivalent to the total leak rate of He leaving the system (e.g., cell, seal). In other cases, the leak rate of He is the equivalent total He leak rate if one atmosphere of He pressure was placed across the sealed interface, as determined from the actual pressure/concentration differential of He across the sealed interface and the measured He leak rate. The seal can be electrically insulating. For example, an impedance across the seal can be at least about 50 Ohm, at least about 100 Ohm, at least about 500 Ohm, at least about 1 kOhm, at least about 1.5 kOhm, at least about 2 kOhm, at least about 3 kOhm, at least about 5 kOhm, at least about 10 kOhm, at least about 100 kOhm, at least about 1 mega-Ohm (MOhm), at least about 10 MOhm, at least about 100 MOhm, or at least about 1,000 MOhm. The seal can be durable. In some examples, the seal can maintain integrity for at least about 1 month, at least about 2 months, at least about 6 months, at least about 1 year, at least about 2 years, at least about 5 years, at least about 10 years, at least about 15 years, at least about 20 years, or more. The seal can have such properties and/or metrics under operating conditions.

In some examples, a battery or device comprising the seal can have a Coulombic efficiency (e.g., measured at a current density of about 200 mA/cm$^2$ or about 220 mA/cm$^2$) of at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, at least about 99.5%, at least about 99.8%, at least about 99.9%, or more. In some examples, a battery or device comprising the seal can have a DC-DC efficiency (e.g., measured at a current density of about 200 mA/cm$^2$ or about 220 mA/cm$^2$) of at least about 50%, at least about 55%, at least about 60%, at least about 65%, at least about 70%, at least about 75%, at least about 80%, at least about 85%, at least about 90%, at least about 95%, or more. In some examples, a battery or device comprising the seal can have a discharge time (e.g., measured at a current density of about 200 mA/cm$^2$ or about 220 mA/cm$^2$) of at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, or more. In some examples, a battery or device comprising the seal can have a discharge time (e.g., measured at a current density of about 200 mA/cm$^2$ or about 220 mA/cm$^2$) between about 4 hours and about 6 hours, between about 2 hours and about 6 hours, between about 4 hours and about 8 hours, or between about 1 hour and about 10 hours. In some examples, a battery or device comprising the seal can have a capacity fade rate (e.g., discharge capacity fade rate) of less than about 10%/cycle, less than about 5%/cycle, less than about 1%/cycle, less than about 0.5%/cycle, less than about 0.1%/cycle, less than about 0.08%/cycle, less than about 0.06%/cycle, less than about 0.04%/cycle, less than about 0.02%/cycle, less than about 0.01%/cycle, less than about 0.005%/cycle, less than about 0.001%/cycle, less than about 0.0005%/cycle, less than about 0.0002%/cycle, less than about 0.0001%/cycle, less than about 0.00001%/cycle, or less. The capacity fade rate can provide a measure of the change (decrease) in discharge capacity in '% per cycle' (e.g., in % per charge/discharge cycle).

In some cases, the seal allows the electrochemical cell to achieve on one or more given operating conditions (e.g., operating temperature, temperature cycling, voltage, current, internal atmosphere, internal pressure, vibration, etc.). Some examples of operating conditions are described in TABLE 2. Such operating conditions can include, but are not limited to, metrics such as, for example, operating temperature, idle temperature, temperature cycling, voltage, current, internal atmosphere, external atmosphere, internal pressure, vibration, and lifetime.

TABLE 2

EXAMPLES OF OPERATING CONDITIONS FOR CELLS

| Item | Example description | Example metrics |
|---|---|---|
| Operating temperature | The normal temperature experienced by the seal during operation. | 440° C. to 550° C. |
| Idle temperature | The temperature experienced by the seal while battery is idle (e.g., in manufacturing, during transport, battery in off-mode). | −25° C. to 50° C. |
| Temperature cycling | The seal can experience infrequent but large amplitude thermal cycles over the course of battery operating lifetime. | −25° C. to 700° C. with at least about 10 thermal cycles |
| Voltage | The voltage drop across the seal. | 0 V to 3 V |
| Current | The electric current flowing through materials that interface with the seal. | 0 A to 500 A |
| Internal atmosphere | The seal is exposed to vapors of reactive alkali metals or reactive alkaline earth metals and halide salts from within the battery. | 0.133 Pa or 0.001 torr vapor pressure of alkali metals or alkaline earth metals and halide salts |
| External atmosphere | The atmosphere that the seal is exposed to from the externals of the battery, e.g., ambient air, high moisture. | Air at 0° C. to 550° C. accompanied by 100% relative humidity |
| Internal pressure | Vacuum gradient or positive pressure across the seal. | 0.5 atm to 4.0 atm |
| Vibration | The seal can be exposed to vibrations caused during manufacturing, transportation, installation, operation, and rare events (e.g., drops, shock impact). | Capable of handling vibrational loading analogous to transportation when used in cell or system application. |
| Lifetime | The expected lifetime of a seal in full operation. | 20 year life with <1% failure |

In some examples, an operating temperature (e.g., temperature experienced by the seal during operation) is at least about 100° C., 200° C., 300° C., 400° C., 500° C., 600° C., 700° C., 800° C., 900° C., or more. In some examples, the temperature experienced by the seal during operation is between about 440° C. and about 550° C., between about 475° C. and about 550° C., between about 350° C. and about 600° C., or between about 250° C. and about 650° C. In an example, an operating temperature of about 400° C. to about 500° C., about 450° C. to about 550° C., about 450° C. to about 500° C., or about 500° C. to about 600° C., or an operating temperature of about 200° C. or more (e.g., suitable for cell chemistries that can operate as low as 200° C.) can be achieved. In some cases, the temperature experienced by the seal may be about equal to the operating temperature of the electrochemical cell or high temperature device (e.g., energy storage device). In some cases, the temperature experienced by the seal may differ from the operating temperature of the electrochemical cell or high temperature device (e.g., by at least about, or less than about, 1° C., 5° C., 10° C., 20° C., 50° C., 100° C., 150° C., 200° C., and the like). In an example, an electrochemical cell comprises a reactive material maintained at a temperature (e.g., operating temperature of the cell) of at least about 200° C., and the temperature of the seal is at least about 200° C. (e.g., the same as the operating temperature of the cell, or different than the operating temperature of the cell). In some cases, the operating temperature of the seal can be lower or higher than the operating temperature of the electrochemical cell or high temperature device.

In some examples, an idle temperature (e.g., temperature experienced by the seal while device (e.g., battery) is idle, such as, for example, in manufacturing, during transport, device (e.g., battery) in off-mode, etc.) is greater than about −25° C., greater than about −10° C., greater than about 0° C., greater than about 15° C., greater than about 20° C., or greater than about 30° C. In some examples, the idle temperature is less than about 30° C., less than about 20° C., less than about 15° C., less than about 0° C., less than about −10° C., less than about −25° C., or less. In some examples, the temperature experienced by the seal while the device is idle is between about −25° C. and about 50° C.

In some examples, temperature cycling (e.g., infrequent but large amplitude thermal cycles over the course of device (e.g., battery) operating lifetime that the seal can experience) is over a range of at least about 100° C., at least about 200° C., at least about 300° C., at least about 400° C., at least about 500° C., at least about 600° C., at least about 700° C., at least about 800° C., or at least about 900° C. In some examples, the temperature cycling is over a range of less than about 100° C., less than about 200° C., less than about 300° C., less than about 400° C., less than about 500° C., less than about 600° C., less than about 700° C., less than about 800° C., or less than about 900° C. In an example, the temperature cycling is between about −25° C. and about 700° C. The seal may withstand (e.g., continue to meet all required specifications) such temperature cycling after at least about 1 thermal cycle, at least about 5 thermal cycles, at least about 10 thermal cycles, at least about 20 thermal cycles, at least about 40 thermal cycles, at least about 80 thermal cycles, at least about 100 thermal cycles, or at least about 1000 thermal cycles. In some cases, the cell and seal can be thermally cycled at least about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, or more times per year (e.g., going from room temperature up to operating temperature). The seal may be capable of withstanding brief temperature excursions above or below typical operating temperature range limits. For example, the seal may be capable of withstanding temperature excursions for about 1 hour, 2 hours, 3 hours, 4 hours, 5 hours, 6 hours, 7 hours, 8 hours, 9 hours, 10 hours, 12 hours, 14 hours, 16 hours, 18 hours, 20 hours, 22 hours, 24 hours, or more. In some cases, such temperature excursions may not exceed 700° C.

In some examples, voltage (e.g., voltage drop across the seal) is at least about 0.1 V, at least about 0.5 volt (V), at least about 1 V, at least about 1.5 V, at least about 2 V, at least about 2.5 V, at least about 3 V, at least about 4 V, at least about 5 V, at least about 6 V at least about 7 V, at least about 8 V, at least about 9 V, or at least about 10 V. In some examples, the voltage is less than about 0.1 V, less than about 0.5 V, less than about 1 V, less than about 1.5 V, less than about 2 V, less than about 2.5 V, less than about 3 V, less than about 4 V, less than about 5 V, less than about 6 V less than about 7 V, less than about 8 V, less than about 9 V, or less than about 10 V. In some examples, the voltage drop across the seal is between about 0 V and about 3 V, or between about 0 V and about 10 V.

In some examples, current (e.g., electric current flowing through materials that interface with the seal) is at least about 0 ampere (A), at least about 5 A, at least about 10 A, at least about 25 A, at least about 50 A, at least about 100 A, at least about 150 A, at least about 200 A, at least about 250 A, at least about 300 A, at least about 350 A, at least about 400 A, at least about 450 A, or at least about 500 A. In some examples, the current is less than about 0 A, less than about 5 A, less than about 10 A, less than about 25 A, less than about 50 A, less than about 100 A, less than about 150 A, less than about 200 A, less than about 250 A, less than about 300 A, less than about 350 A, less than about 400 A, less than about 450 A, or less than about 500 A. In some examples, the electric current flowing through materials that interface with the seal is between about 0 A and about 500 A.

In some examples, internal atmosphere (e.g., vapors of reactive materials, such as, for example, alkali metals or reactive alkaline earth metals and halide salts from within the device (e.g., battery) that the seal is exposed to), comprises at least about $1 \times 10^{-5}$ torr, at least about $5 \times 10^{-5}$ torr, at least about $1 \times 10^{-4}$ torr, at least about $5 \times 10^{-4}$ torr, at least about $1 \times 10^{-3}$ torr, at least about $5 \times 10^{-3}$ torr, at least about $1 \times 10^{-6}$ torr, at least about $5 \times 10^{-6}$ torr, at least about $1 \times 10^{-1}$ torr, at least about $5 \times 10^{-1}$ torr, or at least about 1 torr vapor pressure of alkali metals or alkaline earth metals and halide salts. In some examples, the internal atmosphere comprises less than about $1 \times 10^{-5}$ torr, less than about $5 \times 10^{-5}$ torr, less than about $1 \times 10^{-4}$ torr, less than about $5 \times 10^{-4}$ torr, less than about $1 \times 10^{-3}$ torr, less than about $5 \times 10^{-3}$ torr, less than about $1 \times 10^{-2}$ torr, less than about $5 \times 10^{-6}$ torr, less than about $1 \times 10^{4}$ torr, less than about $5 \times 10^{-1}$ torr, or less than about 1 torr vapor pressure of alkali metals or alkaline earth metals and halide salts. In some examples, the internal atmosphere that the seal is exposed to comprises at least about 0.001 torr (about 0.133 Pa) or at least about 0.01 torr (about 1.33 Pa) vapor pressure of alkali metals or alkaline earth metals and halide salts. In some examples, the internal atmosphere that the seal is exposed to comprises less than about 0.001 torr (about 0.133 Pa) or less than about 0.01 torr (about 1.33 Pa) vapor pressure of alkali metals or alkaline earth metals and halide salts.

The external surface of the cell and seal can be exposed to the atmosphere (e.g., ambient environment comprising $O_2$, $N_2$, Ar, $CO_2$, $H_2O$). In some examples, external atmosphere (e.g., atmosphere that the seal is exposed to from the externals of the device (e.g., battery) such as, for example, ambient air, high moisture, etc.) is at a temperature of at least about 0° C., at least about 50° C., at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 700° C., at least about 750° C., at least about 800° C., at least about 850° C., or at least about 900° C. In some examples, the external atmosphere is at a temperature of less than about 0° C., less than about 50° C., less than about 100° C., less than about 150° C., less than about 200° C., less than about 250° C., less than about 300° C., less than about 350° C., less than about 400° C., less than about 450° C., less than about 500° C., less than about 550° C., less than about 600° C., less than about 700° C., less than about 750° C., less than about 800° C., less than about 850° C., or less than about 900° C. In some examples, the atmosphere that the seal is exposed to from the externals of the device is at a temperature of between about 0° C. and 550° C., between about 350° C. and about 600° C., or between about 250° C. and about 650° C. (e.g., accompanied by 100% relative humidity). Such temperatures can be accompanied by at least about 10%, at least about 20%, at least about 30%, at least about 40%, at least about 50%, at least about 60%, at least about 70%, at least about 80%, at least about 90%, or 100% relative humidity. For example, such temperatures are accompanied by 100% relative humidity.

In some examples, internal pressure (e.g., vacuum gradient or positive pressure across the seal) can be at least about 0 atm, at least about 0.1 atm, at least about 0.2 atm, at least about 0.4 atm, at least about 0.6 atm, at least about 0.8 atm, at least about 1 atm, at least about 1.5 atm, at least about 2 atm, at least about 2.5 atm, at least about 3 atm, at least about 3.5 atm, at least about 4 atm, or at least about 5 atm. In some examples, the internal pressure can be less than about 0 atm, less than about 0.1 atm, less than about 0.2 atm, less than about 0.4 atm, less than about 0.6 atm, less than about 0.8 atm, less than about 1 atm, less than about 1.5 atm, less than about 2 atm, less than about 2.5 atm, less than about 3 atm, less than about 3.5 atm, less than about 4 atm, or less than about 5 atm. In some examples, the vacuum gradient or positive pressure across the seal is between about 0.5 atm and about 4.0 atm.

The seal may be capable of handling vibration (e.g., vibrations caused during manufacturing, transportation, installation, operation, and rare events such as, for example, drops or shock impact that the seal can be exposed to). In an example, the seal is capable of handling vibrational loading analogous to transportation (e.g., when used in a cell or system application).

The seal may have a given lifetime (e.g., expected lifetime of the seal in full operation). In some examples, the lifetime of seal is at least about 1 month, at least about 2 months, at least about 6 months, at least about 1 year, at least about 2 years, at least about 5 years, at least about 10 years, at least about 15 years, at least about 20 years, or more. The seal can have such lifetimes at operation (e.g., utilization) of at least about 20%, at least about 40%, at least about 60%, at last about 80%, at least about 90%, or full operation. The seal can have such lifetimes at a failure rate of less than about 75%, less than about 50%, less than about 40%, less than about 40%, less than about 30%, less than about 20%, less than about 15%, less than about 10%, less than about 5%, or less than about 1%. In an example, the seal has a 20 year life with less than about 1% failure, or a 20 year life with less than about 10% failure.

The seal may have a cycle life (e.g., number of complete charge/discharge cycles of the cell that the seal is able to support before its performance degrades and/or before the capacity of the electrochemical cell/battery/energy storage device falls below, for example, 80% of its original capacity) of at least about 10, 50, 100, 150, 200, 250, 300, 350, 400, 450, 500, 600, 700, 800, 900, 1,000, 1,500, or 2,000 cycles.

External cell dimensions may impact system design and performance. For example, a seal height may be limited to a given distance above a cell top plate (e.g., top surface of the cell container lid). In some cases, seal height can be less than about 2 inches above the cell top plate, less than about 1 inch above the cell top plate, be less than about ½ inch above the cell top plate (e.g., since spacing between cells can change the thermal environment within a stack cell chamber), less than about ¼ inch above the cell top plate, or to less than about ⅛ inch above the cell top plate. In some cases, the resistance of the conductor (e.g., negative current lead) that conducts electric current from outside the cell through the aperture in the cell lid is sufficiently low. For example, the resistance of the conductor is sufficiently low to achieve a given system efficiency (e.g., about 40%, about 50%, about 60%, about 75%, about 80%, about 90%, about 95%, or about 99% energy efficiency). In some instances, a decreasing diameter or radial circumference of the conductor may allow for a more robust seal to be formed around the conductor, but lead to an increase in resistance of the conductor. In such instances, the resistance of the conductor can be decreased or minimized to a value sufficient for a robust seal to be formed (e.g., the resistance of the conductor in the seal can be as low as possible as long as a robust seal can be made, and the conductor can be large enough to achieve low resistance but small enough to achieve a robust seal around it). The resistance may be less than about 200 milliohms (mOhm), less than about 100 mOhm, less than about 80 mOhm, less than about 50 mOhm, less than about 30 mOhm, less than about 10 mOhm, less than about 3 mOhm, less than about 1 mOhm, less than about 0.75 mOhm, less than about 0.5 mOhm, less than about 0.3 mOhm, less than about 0.1 mOhm, less than about 0.075 mOhm, less than about 0.05 mOhm, less than about 0.03 mOhm, or less than about 0.01 mOhm.

The chemical stability of the materials (e.g., cell lid assembly materials, adhesive seal material(s), etc.) can be considered (e.g., to ensure the durability of the seal during all possible temperatures that the system may reach). The seal may be exposed to one or more different atmospheres, including the cell internals (internal atmosphere) and open air (external atmosphere). For example, the seal can be exposed to typical air constituents including moisture, as well as to potentially corrosive active materials in the cell. In some implementations, a hermitic seal is provided. A hermetically sealed battery or battery housing can prevent an unsuitable amount of air, oxygen and/or water into the battery. In some cases, a hermetically sealed cell or cell housing can prevent gas or metal/salt vapors (e.g., helium, argon, negative electrode vapors, electrolyte vapors) from leaking from the cell.

The seal can meet one or more specifications, including, but not limited to: electrically insulating and hermetic, ability to function at operating temperature for duration of lifespan, thermal cycle-ability, sufficiently high electrical conductivity of the conductor (e.g., negative current lead), configuration that does not excessively protrude from cell body, inner surface chemically stable with liquids and vapors of active components, outer surface stable in air, ability to avoid arcing under high potentials, etc.

In some implementations, an electrochemical cell comprises an electrically conductive housing comprising a liquid metal (including liquid metal alloys) that is liquid at an operating temperature of at least about 200° C. In some cases, the operating temperature is at least about 350° C. In some instances, the electrochemical cell is capable of storing at least about 50 watt-hours (Wh) of energy. In other instances, the electrochemical cell is capable of storing at least about 270 watt-hours (Wh) of energy. The liquid metal can be configured as part of an electrochemical cell that can store/release charge during charge and/or discharge of the electrochemical cell. The electrochemical cell can comprise a conductor in electrical contact with the liquid metal, where the conductor protrudes through the electrically conductive housing through an aperture in the electrically conductive housing. The electrochemical cell can comprise a seal that seals the conductor to the electrically conductive housing.

The seal can provide any suitably low helium leak rate. In some cases, the seal provides a helium leak rate of about $1 \times 10^{-10}$, about $1 \times 10^{-9}$, about $1 \times 10^{-8}$, about $1 \times 10^{-7}$, about $5 \times 10^{-7}$, about $1 \times 10^{-6}$, about $5 \times 10^{-6}$, about $1 \times 10^{-5}$, or about $5 \times 10^{-5}$ atmosphere-cubic centimeters per second (atm-cc/s) at about 25° C. In some instances, the seal provides a helium leak rate of no more than about $1 \times 10^{-10}$, no more than about $1 \times 10^{-9}$, no more than about $1 \times 10^{-8}$, no more than about $1 \times 10^{-7}$, no more than about $5 \times 10^{-7}$, no more than about $1 \times 10^{-6}$, no more than about $5 \times 10^{-6}$, no more than about $1 \times 10^{-5}$, or no more than about $5 \times 10^{-5}$ atmosphere-cubic centimeters per second (atm-cc/s) at a temperature (e.g., an operating temperature of the cell or a temperature of the seal) of at least about −25° C., at least about 0° C., at least about 25° C., at least about 50° C., at least about 200° C., at least about 350° C., at least about 450° C., at least about 550° C. or at least about 750° C. The seal can provide such helium leak rates when the electrochemical cell has been operated (e.g., at rated capacity) for a period of, for example, at least about 1 month, at least about 6 months, at least about 1 year, at least about 5 years, at least about 10 years, at least about 20 years, or more. In some cases, the seal can provides such helium leak rates when the electrochemical cell has been operated for at least about 350 charge/discharge cycles, at least about 500 cycles, at least about 1,000 cycles, at least about 3,000 cycles, at least about 10,000 cycles, at least about 50,000 cycles, at least about 75,000 cycles, or at least about 150,000 cycles.

The seal can electrically isolate the conductor from the electrically conductive housing. The degree of electrical isolation can be quantified by measuring the impedance across the seal. In some cases, the impedance across the seal is about 0.1 kilo-Ohms (kOhm), about 1 kOhm, about 5 kOhm, about 10 kOhm, about 50 kOhm, about 100 kOhm, about 500 kOhm, about 1,000 kOhm, about 5,000 kOhm, about 10,000 kOhm, about 50,000 kOhm, about 100,000 kOhm, or about 1,000,000 kOhm at any operating, resting, or storing temperature. In some cases, the impedance across the seal is at least about 0.1 kOhm, at least about 1 kOhm, at least about 5 kOhm, at least about 10 kOhm, at least about 50 kOhm, at least about 100 kOhm, at least about 500 kOhm, at least about 1,000 kOhm, at least about 5,000 kOhm, at least about 10,000 kOhm, at least about 50,000 kOhm, at least about 100,000 kOhm, or at least about 1,000,000 kOhm at any operating, resting, or storing temperature. In some cases, the impedance across the seal is less than about 0.1 kOhm, less than about 1 kOhm, less than about 5 kOhm, less than about 10 kOhm, less than about 50 kOhm, less than about 100 kOhm, less than about 500 kOhm, less than about 1,000 kOhm, less than about 5,000 kOhm, less than about 10,000 kOhm, less than about 50,000 kOhm, less than about 100,000 kOhm, or less than about 1,000,000 kOhm at any operating, resting, or storing temperature. The seal can provide electrical isolation when the electrochemical cell has been operated (e.g., at rated capacity) for a period of, for example, at least about 1 month, at least about 6 months, at least about 1 year, or more. In some cases, the seal provides the electrical isolation when the electrochemical cell has been operated for at least about 350 charge/discharge cycles, at least about 500 cycles, at least about 1,000 cycles, at least about 3,000 cycles, at least about 10,000 cycles, at least about 50,000 cycles, at least about 75,000 cycles, at least about 150,000 cycles.

The seal can provide electrical isolation when the electrochemical cell has been operated for a period of at least about 1 year, at least about 5 years, at least about 10 years, at least about 20 years, at least about 50 years, or at least about 100 years. In some cases, the seal provides the electrical isolation when the electrochemical cell has been operated for about 350 charge/discharge cycles.

A hermetically sealed battery or battery housing may prevent an unsuitable amount of air, oxygen, nitrogen, and/or water into the battery (e.g., an amount such that the battery maintains at least about 80% of its energy storage capacity and/or maintains a round-trip Coulombic efficiency of at least about 90% per cycle when charged and discharged at at least about 100 mA/cm$^2$ for at least about one year, at least about 2 years, at least about 5 years, at least about 10 years or at least about 20 years). In some instances, the rate of oxygen, nitrogen, and/or water vapor transfer into the battery is less than about 0.25 milli-liter (mL) per hour, less than about 0.21 mL per hour, or less than about 0.02 mL per hour when the battery is contacted with air at a pressure that is at least about (or less than about) 0 atmospheres (atm), 0.1 atm, 0.2 atm, 0.3 atm, 0.4 atm, 0.5 atm, 0.6 atm, 0.7 atm, 0.8 atm, 0.9 atm or 0.99 atm higher than, or at least about (or less than about) 0.1 atm, 0.2 atm, 0.5 atm, 1 atm or lower than the pressure inside the battery and a temperature of about 400° C. to about 700° C. In some instances, the rate of metal vapor, molten salt vapor, or inert gas transfer out of the battery is less than about 0.25 mL per hour, less than about 0.21 mL per hour, or less than about 0.02 mL per hour when the battery is contacted with air at a pressure of about 0.5 atm, 1 atm, 1.5 atm, 2 atm, 2.5 atm, 3 atm, 3.5 atm, or 4 atm less than the pressure inside the battery and a temperature of about 400° C. to about 700° C. In some examples, the number of moles of oxygen, nitrogen, or water vapor that leaks into the cell over a given period (e.g., 1 month period, 6 month period, 1 year period, 2 year period, 5 year period, 10 year period, or more) is less than about 10%, less than about 5%, less than about 3%, less than about 1%, less than about 0.5%, less than about 0.1%, less than about 0.05%, or less than about 0.5% of the number of moles of active material (e.g., active metal material) in the cell.

A sealed high temperature device containing reactive materials may in some cases experience an increase in internal pressure (e.g., if the temperature of the device is increased above the boiling point of one or more of the materials within the device). The device may comprise a metal housing (e.g., stainless steel cell body) and a metal housing lid (e.g., stainless steel cell lid) that are joined (e.g., brazed or welded) together. The cell lid may comprise a high temperature seal. In the event of a pressure build-up inside the device, the device may rupture. In some cases, the device may rupture, eject material, and result in a hazardous event. It may be desirable for the device to comprise a component that relieves pressure before it reaches a hazardous level. It may also be desirable that the pressure relief component is in a gaseous head space of the device such that the pressure is released via the escape of gaseous components rather than liquid components.

In some implementations, the seal may be designed to serve as the pressure relief component (e.g., to be the weakest portion of the device that will allow the pressure that may build inside the device to be released through the seal) above a critical pressure and/or above a critical temperature. One or more seals may be provided on the device (e.g., a seal around a conductor, a dedicated pressure relief seal, a seal around a conductor that also provides pressure relief, etc.). In some cases, the seal releases pressure when the device and/or seal is heated above the melting point of the braze material that is used to create the metal-to-ceramic sealed interfaces. In some cases, the strength and/or geometry of the ceramic-to-metal joints in the seal are designed to fail (e.g., leak) before the metal-to-metal joints of the device housing and/or lid (and/or before the metal-to-metal joints of the seal). For example, one or more of the ceramic-to-metal brazes in the seal may be weaker than the metal-to-metal welds of the device housing and/or lid. In some examples, the critical pressure inside the device can be greater than about 1 atm, 2 atm, 3 atm, 4 atm, 5 atm, 10 atm, 20 atm, 50 atm, or 100 atm. In some examples, the critical temperature (e.g., of the device and/or of the seal) can be greater than about 300° C., 400° C., 500° C., 600° C., 700° C., 800° C., 900° C., 1000° C., 1100° C., 1200° C., 1300° C., or 1400° C.

In some implementations, a cell comprises an anode and a cathode. The cell can be capable of storing at least about 10 Wh of energy and can be hermetically or non-hermetically sealed. At least one of the anode and the cathode can be a liquid metal.

In some implementations, a group of cells is capable of storing at least about 10 kWh of energy and each of the cells is hermetically or non-hermetically sealed. If the cells are not hermetically sealed, the battery (e.g., several cells in series or parallel) can be hermetically sealed.

In some implementations, a cell housing comprises an electrically conductive container, a container aperture and a conductor in electrical communication with a current collector. The conductor may pass through the container aperture and can be electrically isolated from the electrically conductive container. The housing may be capable of hermetically sealing a cell which is capable of storing at least 10 Wh of energy.

Seal Materials, Chemical Compatibility and Coefficients of Thermal Expansion

The seal can be made of any suitable material (e.g., such that the seal forms a hermetic seal and an electrical isolation). In some cases, the seal is made from a ceramic material and a braze material. The ceramic material and the braze material can have coefficients of thermal expansion (CTEs) that are matched to each other and/or to the housing material such that the electrochemical cell maintains a suitable seal during operation and/or start-up of the battery. The ceramic material can have a coefficient of thermal expansion that matches a coefficient of thermal expansion of the braze material and the cell top (e.g., lid or cap, or any component of a cell lid assembly) or body, or combination thereof.

In some cases, the coefficients of thermal expansion of the ceramic material, braze material and cell top or body are not identically matched, but are sufficiently close to minimize stresses during the braze operation and subsequent thermal cycles in operation. In some cases, the CTE of the ceramic is at least about 3 microns per meter per degree Celsius ($\mu m/m/°$ C.), at least about 4 $\mu m/m/°$ C., at least about 5 $\mu m/m/°$ C., at least about 6 $\mu m/m/°$ C., at least about 7 $\mu m/m/°$ C., at least about 8 $\mu m/m/°$ C., at least about 9 $\mu m/m/°$ C., at least about 10 $\mu m/m/°$ C., at least about 11 $\mu m/m/°$ C., at least about 12 $\mu m/m/°$ C., at least about 13 $\mu m/m/°$ C., or at least about 14 $\mu m/m/°$ C. In some cases, the CTE of the ceramic is less than about 3 $\mu m/m/°$ C., less than about 4 $\mu m/m/°$ C., less than about 5 $\mu m/m/°$ C., less than about 6 $\mu m/m/°$ C., less than about 7 $\mu m/m/°$ C., less than about 8 $\mu m/m/°$ C., less than about 9 $\mu m/m/°$ C., less than about 10 $\mu m/m/°$ C., less than about 11 $\mu m/m/°$ C., less than about 12 $\mu m/m/°$ C., less than about 13 $\mu m/m/°$ C., or less than about 14 $\mu m/m/°$ C. In some cases, the CTE of the metal collar or sleeve is at least about 5 $\mu m/m/°$ C., at least about 6 $\mu m/m/°$ C., at least about 7 $\mu m/m/°$ C., at least about 8 $\mu m/m/°$ C., at least about 9 $\mu m/m/°$ C., at least about 10 $\mu m/m/°$ C., at least about 11 $\mu m/m/°$ C., at least about 12 $\mu m/m/°$ C., at least about 13 $\mu m/m/°$ C., or at least about 14 $\mu m/m/°$ C. In some cases, the CTE of the metal collar or sleeve is less than about 5 $\mu m/m/°$ C., less than about 6 $\mu m/m/°$ C., less than about 7 $\mu m/m/°$ C., less than about 8 $\mu m/m/°$ C., less than about 9 $\mu m/m/°$ C., less than about 10 $\mu m/m/°$ C., less than about 11 $\mu m/m/°$ C., less than about 12 $\mu m/m/°$ C., less than about 13 $\mu m/m/°$ C., or less than about 14 $\mu m/m/°$ C. In some cases, the ceramic material comprises at least about 50% AlN and has a CTE of less than about 5 $\mu m/m/°$ C. In some cases, the metal collar or sleeve comprises Zr and has a CTE of about, or less than about, 7 $\mu m/m/°$ C. In some cases, the maximum difference in coefficients of thermal expansion (e.g., between any two of the ceramic material, braze material and cell top or body) can be less than about 0.1 microns per meter per degree Celsius ($\mu m/m/°$ C.), less than about 0.5 $\mu m/m/°$ C., less than about 1 $\mu m/m/°$ C., less than about 2 $\mu m/m/°$ C., less than about 3 $\mu m/m/°$ C., less than about 5 $\mu m/m/°$ C., less than about 7 $\mu m/m/°$ C., less than about 10 $\mu m/m/°$ C., or less than about 15 $\mu m/m/°$ C.

In some cases, the seal comprises a metal collar (e.g., a thin metal collar) or sleeve. The collar or sleeve can be brazed to the ceramic (e.g., via a braze material) and joined to the cell lid and/or the negative current lead that protrudes through the cell lid and into the cell cavity. The seal can comprise features that alleviate CTE mismatches between the ceramic and the cell lid and/or the negative current lead.

In some implementations, an electrochemical cell comprises an electrically conductive housing comprising a liquid metal that is liquid at an operating temperature of at least about 200° C. In some cases, the operating temperature is at least about 350° C. In some instances, the electrochemical cell is capable of storing at least about 50 Watt-hours of energy. The liquid metal (including liquid metal alloys) can be configured to store/release charge during charge/discharge of the electrochemical cell. The electrochemical cell can comprise a conductor in electrical contact with the liquid metal, where the conductor protrudes through the electrically conductive housing through an aperture in the electrically conductive housing. The electrochemical cell can comprise a seal that seals the conductor to the electrically conductive housing.

In some cases, the seal comprises a ceramic material and a braze material. In some cases, the ceramic material is thermodynamically stable (e.g., does not chemically react) with reactive materials (e.g., reactive liquid metals or reactive liquid metal vapors). In some cases, the ceramic material is thermodynamically stable with, is not attacked by and does not dissolve into the molten salt. Examples of ceramic materials include, but are not limited to, aluminum nitride (AlN), beryllium nitride ($Be_3N_2$), boron nitride (BN), calcium nitride ($Ca_3N_2$), silicon nitride ($Si_3N_4$), aluminum oxide ($Al_2O_3$), beryllium oxide (BeO), calcium oxide (CaO), cerium oxide ($Ce_2O_3$), erbium oxide ($Er_2O_3$), lanthanum oxide ($La_2O_3$), magnesium oxide (MgO), neodymium oxide ($Nd_2O_3$), samarium oxide ($Sm_2O_3$), scandium oxide ($Sc_2O_3$), ytterbium oxide ($Yb_2O_3$), yttrium oxide ($Y_2O_3$), zirconium oxide ($ZrO_2$), yttria partially stabilized zirconia (YPSZ), boron carbide ($B_4C$), silicon carbide (SiC), titanium carbide (TiC), zirconium carbide (ZrC), titanium diboride ($TiB_2$), chalcogenides, quartz, glass, or any combination thereof.

In some cases, the braze material comprises at least one braze constituent that has low solubility in the reactive material, in which the reactive material has low solubility, that does not react (e.g., form intermetallic alloys with) the reactive material at the operating temperature of the device, and/or that melts above the operating temperature of the device. The reactive material can be a reactive metal. In some examples, the braze material comprises at least one braze constituent that has low solubility in the reactive metal. In some examples, the reactive metal has low solubility in the braze constituent. In some examples, the braze constituent does not form intermetallic alloys with the reactive metal at the operating temperature of the device. In some examples, the braze constituent melts above the operating temperature of the device. Examples of braze constituent materials include, but are not limited to, aluminum (Al), beryllium (Be), copper (Cu), chromium (Cr), iron (Fe), manganese (Mn), molybdenum (Mo), nickel (Ni), niobium (Nb), rubidium (Rb), scandium (Sc), silver (Ag), tantalum (Ta), titanium (Ti), vanadium (V), yttrium (Y), zirconium (Zr), phosphorus (P), boron (B), carbon (C), silicon (Si), or any combination thereof. In some instances, the ceramic material comprises aluminum nitride (AlN) and the braze material comprises titanium (Ti). In some cases, the braze material comprises a mixture of two or more materials (e.g., 3 materials). The materials may be provided in any proportion. For example, the braze can comprise 3 materials at a ratio (e.g., in weight-%, atomic-%, mol-% or volume-%) of about 30:30:40 or 40:40:20. In some cases, the braze material comprises a mixture of Ti—Ni—Zr. In some instances, the braze comprises at least about 20, 30 or 40 weight-% titanium, at least about 20, 30% or 40 weight-% nickel, and at least about 20, 30 or 40 weight-% zirconium. In some instances, the braze comprises less than about 20, 30 or 40 weight-% titanium, less than about 20, 30% or 40 weight-% nickel, and less than about 20, 30 or 40 weight-% zirconium. In some instances, the braze comprises about 18% Ti, about 60% Zr, about 22% Ni (e.g., on a weight-%, atomic-%, mol-% or volume-% basis). In some instances, the braze comprises about 7% Ti, about 67% Zr, and about 26% Ni (e.g., on a weight-%, atomic-%, mol-% or volume-% basis). In some instances, the braze can comprise at least about, or less than about, 5, 10, 15, 20, 25, 30, 35, 40, 45, 50, 55, 60, 65, 70, 75, 80, 85, 90, 95 or more weight-%, atomic-%, mol-% or volume-% of titanium, nickel or zirconium (or any other braze material herein). In some cases, other suitable brazing material(s) can be added to the braze to improve chemical stability, change the melting temperature, or change mechanical properties (e.g., change the CTE of the braze, change the ductility of the braze, etc.).

In some instances, the ceramic material comprises a main ceramic material (e.g., AlN) and a secondary ceramic material that is also thermodynamically stable, such as, for example, $Y_2O_3$, $La_2O_3$ and/or any other ceramic material described herein (e.g., AlN, $Be_3N_2$, BN, $Ca_3N_2$, $Si_3N_4$, $Al_2O_3$, BeO, CaO, $Ce_2O_3$, $Er_2O_3$, MgO, $Nd_2O_3$, $Sm_2O_3$, $Sc_2O_3$, $Yb_2O_3$, $ZrO_2$, YPSZ, $B_4C$, SiC, TiC, ZrC, $TiB_2$, chalcogenides, quartz, glass, or any combination thereof). In some examples, the main ceramic material (e.g., AlN ceramic) comprises at least about 0.1%, at least about 0.5%, at least about 1%, at least about 2%, at least about 3%, at least about 4%, at least about 5%, at least about 6%, at least about 7%, at least about 8%, at least about 9%, at least about 10%, at least about 15%, or at least about 20% of the secondary ceramic material (or a combination of secondary materials) by weight. In some instances, the secondary ceramic material serves to increase the strength of the ceramic by lowering the sintering temperature of the ceramic, thereby reducing the grain size, by forming a glassy phase between the grains of the main ceramic material to promote tortuous crack growth path, or by other strengthening mechanism(s) for ceramic toughening. In some instances, the ceramic comprises a main ceramic material (e.g., greater than about 50, 60, 70, 80, 90, 95 or more weight-%) that is thermodynamically stable with the contents of the cell (e.g., the reactive metal and molten salt), and a secondary ceramic material (e.g., MgO) that is not thermodynamically stable (e.g., not stable with the contents of the cell, and/or not stable with the atmosphere outside the cell) at sufficiently low quantities (e.g., less than about 20%, or less than about 15% on a weight, atomic, molar or volumetric basis). The secondary ceramic material may exist as particles dispersed throughout the bulk of the main ceramic material (e.g., in such as a way that most of the secondary ceramic particles are not in direct contact with other secondary ceramic particles). In some cases, the secondary ceramic material particles strengthen the overall ceramic material by establishing local regions of stress concentration to promote crack tip deflection and crack tip pinning. In some cases, the secondary ceramic material may be added to the main ceramic material to tune the CTE of the overall ceramic material to more closely match the CTE of the metal collar or sleeve or cell lid. When exposed to reactive metal(s) and/or molten salt(s) and/or air, the secondary ceramic particle on the surface may be attacked, but the secondary ceramic particles dispersed throughout the bulk of the main ceramic material may not be attacked, thus enabling the ceramic material to be chemically stable when exposed to the reactive metal(s) and/or molten salt(s).

In some examples, such a ceramic comprises the main ceramic material (e.g., $Y_2O_3$) and at least about 2%, at least about 4%, at least about 6%, at least about 8%, at least about 10%, at least about 12%, or at least about 15% by weight of a secondary ceramic material (e.g., AlN, $Be_3N_2$, BN, $Ca_3N_2$, $Si_3N_4$, $Al_2O_3$, BeO, CaO, $Ce_2O_3$, $Er_2O_3$, $La_2O_3$, MgO, $Nd_2O_3$, $Sm_2O_3$, $Sc_2O_3$, $Yb_2O_3$, $ZrO_2$, YPSZ, $B_4C$, SiC, TiC, ZrC, $TiB_2$, chalcogenides, quartz, glass, or any combination thereof). In some examples, the ceramic comprises primarily the main ceramic material (e.g., $Y_2O_3$) with less than about 2%, less than about 4%, less than about 6%, less than about 8%, less than about 10%, less than about 12%, or less than about 15% by weight of a secondary ceramic material (or a combination of secondary ceramic materials). In some examples, the main ceramic material is $Y_2O_3$. In some examples, the secondary ceramic material is MgO. In an example, the ceramic comprises primarily $Y_2O_3$ with about 12.5 weight-% MgO particles. In some cases, a ceramic comprising $Y_2O_3$ and, for example, about 12.5 weight-% MgO may have a CTE that closely matches (e.g., within about 10% or less) the CTE of steel or stainless steel alloys (e.g., 430 stainless steel) at the operating temperature of the cell and/or system.

Examples of main ceramic materials and secondary materials thus include any ceramic material of the disclosure, such as, for example, aluminum nitride (AlN), beryllium nitride ($Be_3N_2$), boron nitride (BN), calcium nitride ($Ca_3N_2$), silicon nitride ($Si_3N_4$), aluminum oxide ($Al_2O_3$), beryllium oxide (BeO), calcium oxide (CaO), cerium oxide ($Ce_2O_3$), erbium oxide ($Er_2O_3$), lanthanum oxide ($La_2O_3$), magnesium oxide (MgO), neodymium oxide ($Nd_2O_3$), samarium oxide ($Sm_2O_3$), scandium oxide ($Sc_2O_3$), ytterbium oxide ($Yb_2O_3$), yttrium oxide ($Y_2O_3$), zirconium oxide ($ZrO_2$), yttria partially stabilized zirconia (YPSZ), boron carbide ($B_4C$), silicon carbide (SiC), titanium carbide (TiC), zirconium carbide (ZrC), titanium diboride ($TiB_2$), chalcogenides, quartz, glass, or any combination thereof.

The braze can be a passive braze or an active braze. Passive brazes can melt and wet a ceramic material or wet a ceramic material that has a metallization layer deposited onto it. Copper and silver are examples of passive brazes. Active brazes can react with the ceramic (e.g., chemically reduce the metal component of the ceramic (e.g., Al is reduced from AlN)). In some cases, active brazes can comprise a metal alloy having an active metal species such as titanium (Ti) or zirconium (Zr) that reacts with the ceramic material (e.g., AlN+Ti→Al+TiN or AlN+Zr→Al+ZrN). The active braze can further comprise one or more passive components (e.g., Ni). The passive component(s) can, for example, reduce the melting point of the braze and/or improve the chemical stability of the braze. In some cases, the active metal braze beads up on the ceramic and/or does not wet the ceramic.

The seal can hermetically seal the electrochemical cell. In some cases, the seal is inert to an atmosphere in contact with the electrochemical cell. The atmosphere in contact with the electrochemical cell can comprise oxygen ($O_2$), nitrogen ($N_2$), water ($H_2O$), or a combination thereof. In some cases, the ceramic material and/or the braze material are coated to provide resistance to the atmosphere in contact with the electrochemical cell. For example, the coating can comprise silicon dioxide ($SiO_2$), yttrium oxide ($Y_2O_3$), aluminum oxide ($Al_2O_3$), or any combination thereof.

The seal can be at least partially inert to metal vapors and molten salts. In some cases, the metal vapors comprise lithium, sodium, potassium, magnesium, calcium, or any combination thereof. The ceramic material and/or the braze material can be coated to provide resistance to the metal vapors and metal salts. For example, the coating can be yttrium oxide ($Y_2O_3$), erbium oxide ($Er_2O_3$), boron nitride (BN), aluminum nitride (AlN), silicon nitride ($Si_3N_4$), silicon carbide (SiC), or any combination thereof.

In some cases, the coefficients of thermal expansion of the ceramic material and the braze material match the coefficients of thermal expansion of the electrically conductive housing and/or the conductor (e.g., to within about 1%, to within about 5%, to within about 10%, to within about 15%, to within about 20%, or to within about 30%). In some cases, a hermetic joint can be formed if the braze is not of a similar CTE compared with the CTE of the ceramic and/or other components or sub-assembly of the seal (e.g., a metal sleeve).

The seal can be welded or brazed to the electrically conductive housing, cell (housing) lid, and/or the conductor. In some cases, the electrically conductive housing and/or the conductor comprises 400-series stainless steel, 300-series stainless steel, nickel, or any combination thereof.

Figure 7:
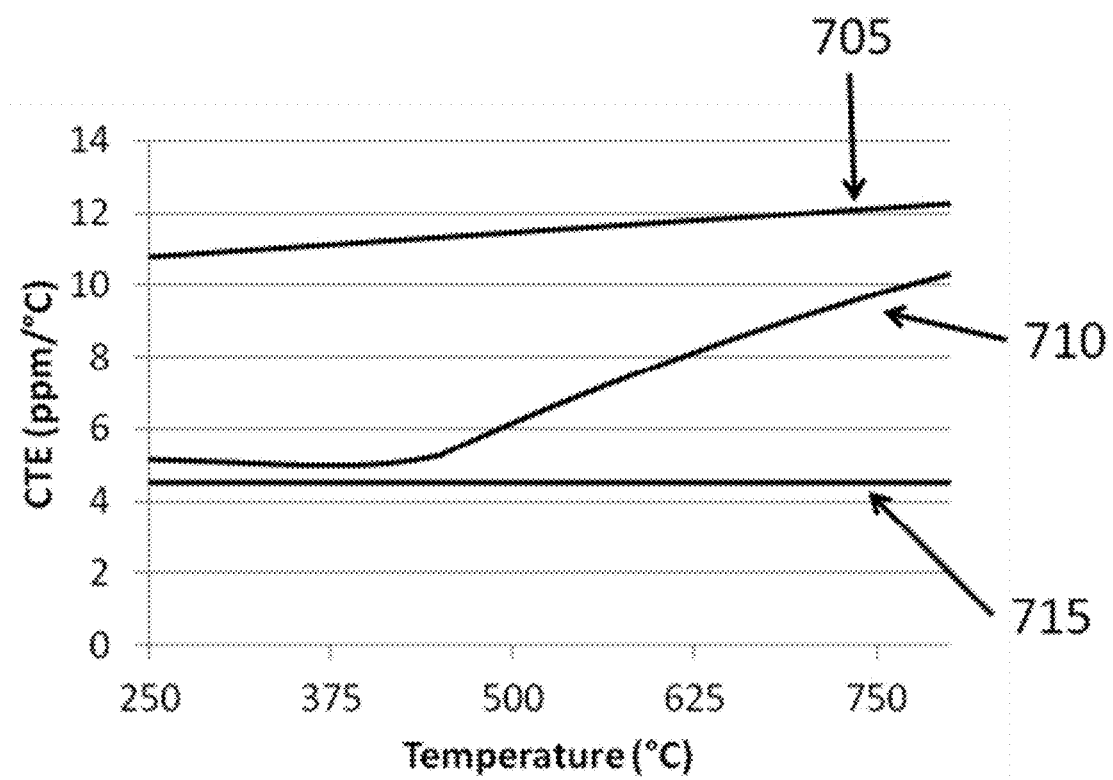
FIG. 7 shows coefficients of thermal expansion in units of parts per million (ppm) per ° C. for various types of steel and an insulating ceramic.

FIG. 7 shows the CTE in units of parts per million (ppm) per ° C. for various types of steel and an insulating ceramic. The CTE for 430 stainless steel 705 can range approximately linearly from about 10 ppm/° C. to about 12 ppm/° C. between 250° C. and 800° C. The CTE for nickel-cobalt ferrous alloy 710 can range non-linearly from about 5 ppm/° C. to about 10 ppm/° C. between 250° C. and 800° C. The CTE for aluminum nitride ceramic 715 can be relatively constant at about 4.5 ppm/° C. between 250° C. and 800° C.

Figure 8:
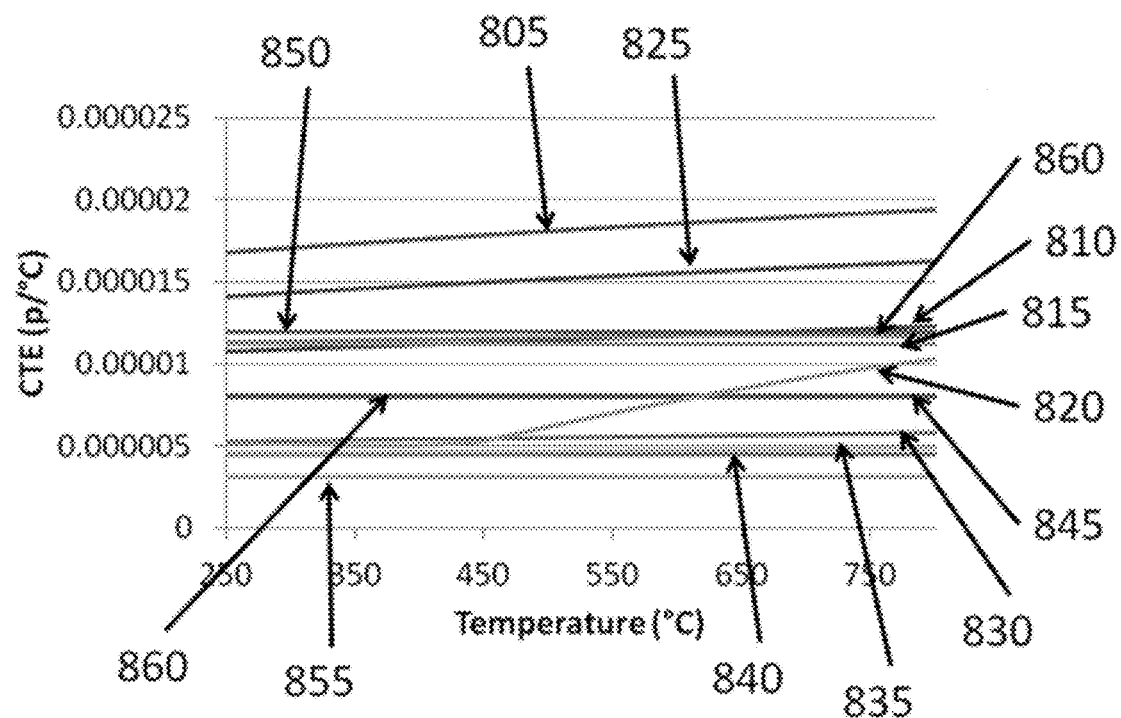
FIG. 8 shows the coefficient of thermal expansion in units of parts (p) per ° C. for various types of sleeve or collar materials, braze materials and insulating ceramics.

FIG. 8 shows the CTE in units of parts (p) per ° C. for various types of sleeve or collar materials (e.g., steel), braze materials and insulating ceramics. The sleeve or collar materials can include, for example, 304 stainless steel 805, 430 stainless steel 810, 410 stainless steel 815, and nickel-cobalt ferrous alloy 820. The braze materials can include, for example, nickel-100 825, molybdenum (Mo) 830 and tungsten (W) 835. The ceramic materials can include, for example, aluminum nitride (AlN) 840, aluminum oxide ($Al_2O_3$) 845, boron nitride (BN) in the direction parallel to the grain orientation 850, boron nitride (BN) in the direction perpendicular to the grain orientation 855, yttrium oxide ($Y_2O_3$) 860 and yttria partially stabilized zirconia (YPSZ) 865.

The CTE of the seal can match the CTE of the housing and/or conductor to any suitable tolerance. In some cases, the seal electrically isolates the conductor from the electrically conductive housing, where the CTE of the seal is at least about 1%, at least about 5%, at least about 10%, at least about 15%, at least about 20%, at least about 30%, at least about 50%, at least about 60%, at least about 70%, or at least about 80% different and/or less than the CTE of the electrically conductive housing and/or the conductor. In some instances, the seal electrically isolates the conductor from the electrically conductive housing, where the CTE of the seal is less than about 1%, less than about 5%, less than about 10%, or less than about 15%, or less than about 20%, or less than about 30%, less than about 50%, less than about 60%, less than about 70%, or less than about 80% different and/or less than the CTE of the electrically conductive housing and/or the conductor.

The CTE of the seal can be matched to the conductive housing or the conductor at the operating temperature and/or during start-up of the cell (e.g., starting from non-molten metal electrodes). In some cases, the CTE of the seal is less than about 5%, less than about 10%, less than about 15%, or less than about 20% different than the CTE of the electrically conductive housing and/or the conductor at the temperature at which the electrochemical cell is operated. In some instances, the CTE of the seal is less than about 5%, less than about 10%, less than about 15%, or less than about 20% different than the CTE of the electrically conductive housing and/or the conductor at all temperatures between about −10° C. and the operating temperature.

The materials comprising the seal (e.g., ceramic insulator, braze alloy, and sleeve/collar) can be chosen to be chemically compatible with (e.g., stable in contact with) the interior and/or exterior environments of the cell.

Figure 9:
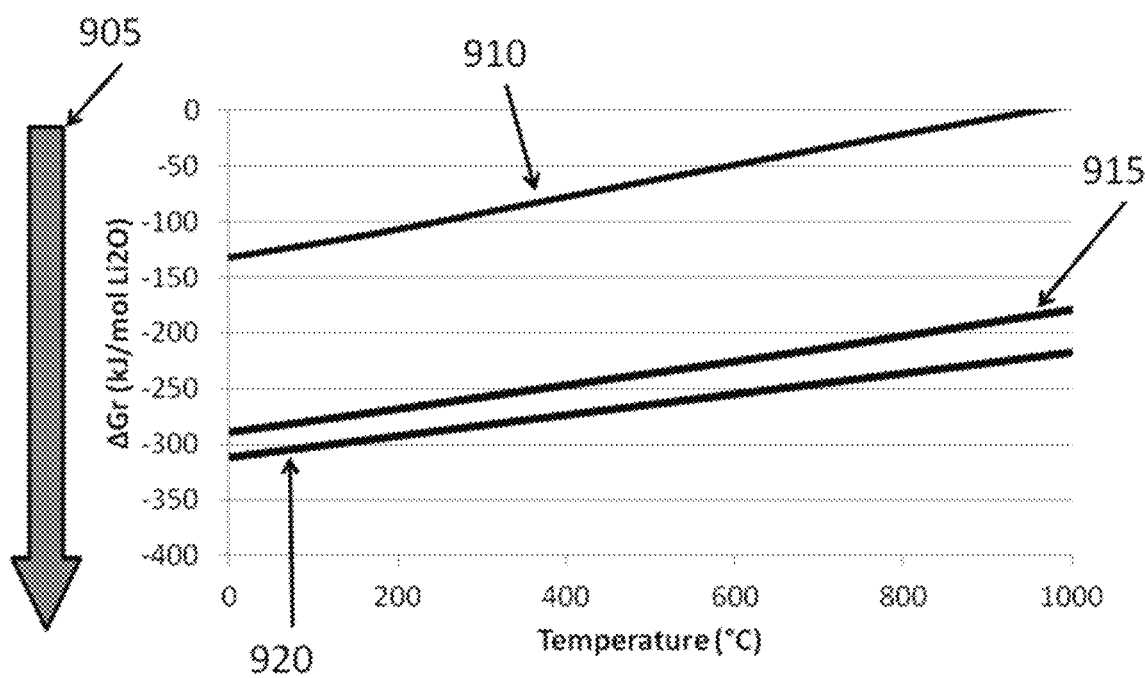
FIG. 9 shows the Gibbs free energy of formation (AGr) for various materials at a range of temperatures with negative numbers being more thermodynamically stable.

FIG. 9 shows the Gibbs free energy of formation ($\Delta G_r$) for various materials at a range of temperatures with negative numbers being more thermodynamically stable 905. Examples include $\Delta G_r$ curves for lithium nitride ($Li_3N$) 910, aluminum nitride (AlN) 915 and titanium nitride (TiN) 920. A thermodynamic evaluation of different insulating ceramic materials can indicate that aluminum nitride (an electrically insulating ceramic) can be stable in the presence of lithium (e.g., since the $\Delta G_r$ per mole of N of AlN is more negative than $Li_3N$). Also, the $\Delta G_r$ per mole of N of TiN is more negative than $Li_3N$ and also more negative than AlN. Thus, a titanium-alloy braze can chemically reduce AlN and form TiN (e.g., by the reaction AlN+Ti→TiN+Al), which, in turn, can bond well with the titanium-alloy braze. The reactive material (e.g., reactive metal), ceramic and braze materials can be selected such that the stability (e.g., normalized Gibbs free energy of formation ($\Delta G_{r,n}$), such as, for example, Gibbs free energy of formation of the nitride compounds normalized by the number of nitride atoms in each compound formula) of the reactive metal-, ceramic- and braze-nitride compounds exist in rank order. In an example where nitride compounds are rank-ordered, $\Delta G_{r,n}$ of the reactive metal nitride (e.g., $Li_3N$) is less negative (i.e., more positive) than the $\Delta G_{r,n}$ of the ceramic nitride (e.g., AlN) which is less negative than the $\Delta G_{r,n}$ of the braze nitride (e.g., TiN). Rank-ordering the materials in this manner may reduce or eliminate a driving force for the rank-ordered compounds to degrade. In some cases, the braze material also comprises materials that show low mutual solubility in the reactive material (e.g., reactive metal or molten salt) and/or do not react with the reactive material (e.g., do not form intermetallic compounds with the reactive metal). Such a selection of materials can ensure thermodynamic stability of the reactive material (e.g., reactive metal), ceramic, and braze material. Additional materials can in some cases be added based on such rank-ordering. For example, a component (e.g., ceramic) can be replaced by two or more components with more suitable rank-ordering characteristics.

Nickel-cobalt ferrous alloy, titanium (Ti), nickel (Ni), zirconium (Zr), and 430 stainless steel (430SS) can be stable in the presence of molten lithium (Li), as indicated, for example, by phase diagrams that show that lithium and the metal components of nickel-cobalt ferrous alloy and 430SS (e.g., Fe, Ni, Cr, Co) do not form intermetallic compounds with Li and that their respective solubility into (or with) Li is relatively low (e.g., less than about 1 mol-%). Titanium-alloy braze can bond to ferrous alloys, such as, for example, nickel-cobalt ferrous alloy and/or 430 SS. In some cases, AlN, titanium-alloys, and nickel-cobalt ferrous alloy/430SS are all stable in the presence of air at elevated temperatures. Thus, in one example, the method for choosing seal materials described herein shows that a seal comprising an insulating ceramic that comprises AlN, a braze that comprises Ti-alloy, and a sleeve or collar that comprises one or more of a nickel-cobalt ferrous alloy, 430 SS and zirconium forms a suitable seal material set.

Figure 32:
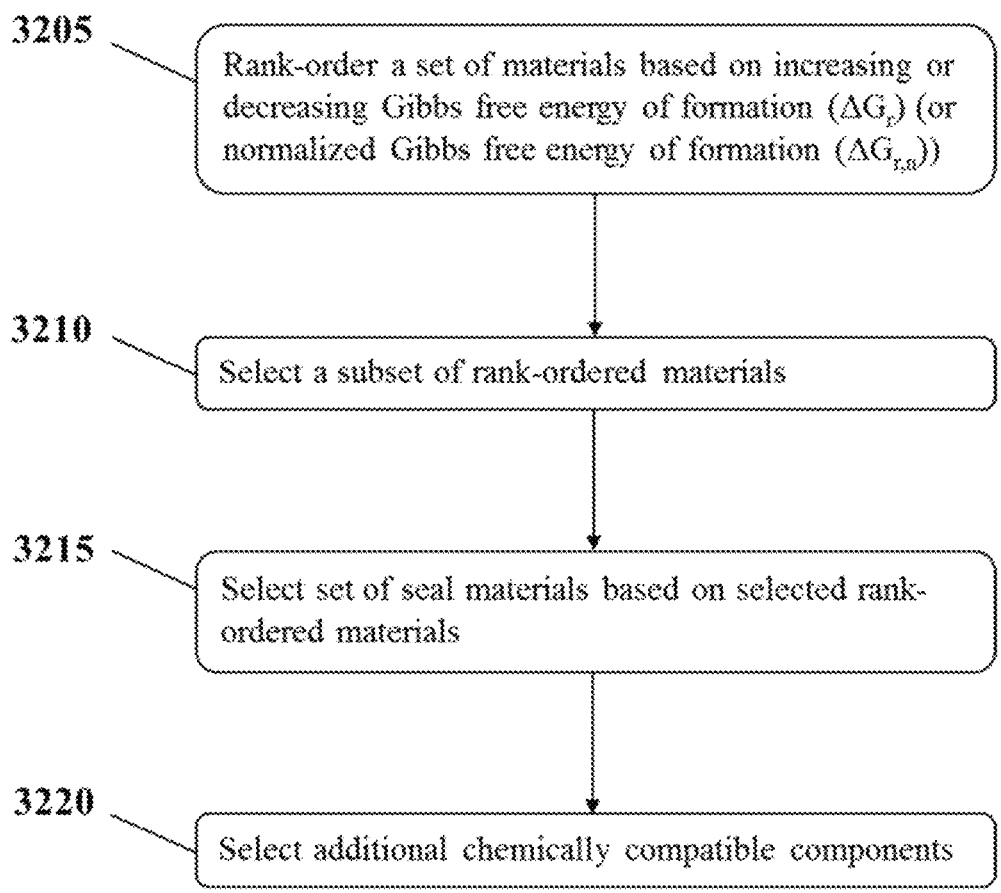
FIG. 32 in an example of a method for selecting materials to form a seal based on a rank-ordered free energy of formation selection process.

FIG. 32 is an example of a method 3200 for selecting materials to form a seal for a high-temperature device. The device can comprise a reactive material. The method can comprise a rank-ordered free energy of formation selection process. Such a selection process can provide a path toward a seal that has long-term stability. Such a seal can comprise thermodynamically stable materials (e.g., stable ceramic, stable (active) braze material, braze that can reduce the ceramic). The method can include rank-ordering a set of materials based on increasing or decreasing Gibbs free energy of formation ($\Delta G_r$) of each of the materials (3205). In some cases, the materials that are compared in the Gibbs free energy comparison (i.e., the set of materials) comprise compounds associated with one or more seal materials (e.g., compounds associated with the set of seal materials, e.g., compounds associated with a ceramic material and a braze material, such as, for example, an active braze material) and/or compounds associated with the reactive material that is to be contained. The associated compounds may be ranked in accordance with their $\Delta G_r$ (e.g., $Li_3N$ as the compound associated with the reactive material Li, TiN as the compound associated with the active braze material Ti). In some cases, the compounds comprise a common element (e.g., nitrogen in $Li_3N$, AlN and TiN). In such cases, the rank-ordering can be based on increasing or decreasing normalized Gibbs free energy of formation where $\Delta G_{r,n}$ is equal to $\Delta G_r$ divided by the stoichiometric number of atoms in the common elements in the formula of the compound, such as, for example, $\Delta G_r = \Delta G_{r,n}/1$ for $Li_3N$ and $\Delta G_r = \Delta G_{r,n}/2$ for $Ca_3N_2$ where nitrogen is considered the common element) of each of the materials (e.g., the associated compounds). The common element can be capable of forming a compound with the reactive material (e.g., $Li_3N$). The common element can be, for example, nitrogen, oxygen or sulfur (e.g., the compounds are nitrides, oxides or sulfides). As previously described, reaction(s) involving the common element may aid in bonding between the selected rank-ordered materials (e.g., AlN+Ti→TiN+Al).

The method can further include selecting a subset of the rank-ordered materials (3210) (e.g., such that the selected materials remain rank-ordered). Next, in a step 3215, the method can include selecting a set of seal materials (e.g., a ceramic material and an active braze material) based on the selected rank-ordered materials. This may eliminate a driving force for the selected rank-ordered materials to degrade when provided in the seal and/or exposed to the reactive material (e.g., Li). The selected set of seal materials can comprise a ceramic material and an active braze material. Selecting the set of seal materials can comprises selecting one or more seal materials (e.g., first a ceramic and then a braze) with associated compounds that have a $\Delta G_{r,n}$ that is more negative than a compound associated with the reactive material. The selection (e.g., a first step of the selection) may include selection of a ceramic material (e.g., AlN) that is electrically insulating and that has a $\Delta G_{r,n}$ that is more negative than a compound associated with the reactive material (e.g., $Li_3N$). The selection (e.g., a second step of the selection) may include selection of an active braze material (e.g., Ti-alloy) with an associated compound (e.g., TiN) that has a $\Delta G_{r,n}$ that is equal to or more negative than the ceramic material. In an example, the reactive material contained in the high-temperature device comprises lithium (Li). In this example, the selected rank-ordered materials can be, in order, lithium nitride ($Li_3N$), aluminum nitride (AlN) and titanium nitride (TiN); the selected ceramic material can comprise aluminum nitride (AlN) and the selected active braze material can comprise titanium (Ti). In some cases, the active braze material is also selected based on its stability with the reactive metal (e.g., a stable active braze material may have low (e.g., <1%, <0.1%) mutual solubility with the reactive material and/or the active braze material and the reactive material may be stable in the presence of each other and/or not form intermetallic compounds). In some cases, the selected AlN ceramic and Ti active braze material are thermodynamically stable with Li. In some examples, the seal may comprise a ceramic material that is thermodynamically stable in the presence of the reactive material, an active braze material that is chemically stable with the reactive material, and where the active braze material chemically reacts with the ceramic material (e.g., Ti+AlN→TiN+Al) and the compound product of that reaction (e.g., TiN) is stable in the presence of the reactive material.

The method 3200 can further include selecting a sleeve or collar to join to the seal (3220) and/or selecting a container of the device to join to the sleeve or collar (3220). As described in greater detail elsewhere herein, the sleeve or collar can comprise a material that is chemically compatible with the seal and/or with one or more other materials of the device, and the container can comprise a material that is chemically compatible with the sleeve or collar and/or with one or more other materials of the device or seal. In some cases, one or more pairs of the selected rank-ordered materials can be CTE-matched. The steps of method 3200 may be performed in a different order, or one or more steps may be omitted. Further, the method 3200 may in some cases include additional or different step(s).

Structural Features that can Compensate for CTE Mismatch

The coefficient of thermal expansion (CTE) may be considered when designing a seal. A coefficient of thermal expansion mismatch (CTE mismatch) between various materials may not be a major concern during initial fabrication heat-up and brazing process of the high temperature seal (e.g., since the components may not be bonded, which allows for sliding interfaces). In some instances, during cool-down (e.g., after the braze has melted, bonded and solidified), the materials can contract at different rates (e.g., the insulator and metal sleeves can be exposed to large stresses). Therefore, one or more transition pieces may be added. The transition pieces may have CTE values intermediate to that of the insulator and the cell top and/or can have spring-like design features (e.g., a nickel-cobalt ferrous alloy or 430 SS or zirconium sleeve). In some cases, the transition pieces are thin relative to the insulator (e.g., the transition piece can have a thickness that is less than about 50% or less than about 10% the thickness of the insulator). In some cases, the braze material is separated (e.g., kept away) from intended welding joints. In some cases, the seal includes a chemically stable material set (e.g., aluminum nitride ceramic, titanium-alloy braze, and nickel-cobalt ferrous alloy or 430 stainless steel sleeve), and can be CTE-matched or have a design that can accommodate differences in CTE.

In some cases, the seal does not comprise materials that are exactly matched in CTE and/or matched to the CTE of the housing and/or conductor. A mismatch in CTE can be compensated for by structural features and/or geometries such that the seal remains hermetically sealed and/or forms a suitable electrical insulation (e.g., at the operating temperature of the battery) and/or following one or more start-ups of the battery (e.g., melting of the liquid metal electrodes).

In some implementations, an electrochemical cell comprises an electrically conductive housing comprising a liquid metal that is liquid at an operating temperature of at least about 200° C. In some cases, the operating temperature is at least about 350° C. In some instances, the electrochemical cell is capable of storing at least about 50 Watt-hours of energy. The liquid metal can be configured to store/release charge during charge/discharge of the electrochemical cell. The electrochemical cell can comprise a conductor in electrical contact with the liquid metal, where the conductor protrudes through the electrically conductive housing through an aperture in the electrically conductive housing. The electrochemical cell can comprise a seal that seals the conductor to the electrically conductive housing. In some cases, the seal electrically isolates the conductor from the electrically conductive housing, where CTE of the material comprising the seal is not the same as the electrically conductive housing and/or the conductor. The seal can have a shape (i.e., suitable geometry) such that the electrochemical cell is hermetically sealed.

The materials of the seal, the conductive housing and/or the conductor can have any amount of CTE mismatch. In some cases, the CTE of the seal material (or a portion thereof) is about 1%, about 5%, about 10%, about 15%, about 20%, about 25%, about 30%, about 40%, about 50%, about 60%, about 70%, about 80%, about 90%, about 100%, about 125%, about 150%, about 300%, about 400%, about 500%, about 600%, or about 700% different than the CTE of the electrically conductive housing and/or the conductor. In some cases, the CTE of the seal (or a portion thereof) is at least about 1%, at least about 5%, at least about 10%, at least about 15%, at least about 20%, at least about 25%, at least about 30%, at least about 40%, at least about 50%, at least about 60%, at least about 70%, at least about 80%, at least about 90%, at least about 100%, at least about 125%, at least about 150%, at least about 300%, at least about 400%, at least about 500%, at least about 600%, or at least about 700% different than the CTE of the electrically conductive housing and/or the conductor. In some cases, the CTE of a first seal material (e.g., metal collar) is less than about 1%, less than about 5%, less than about 10%, less than about 15%, less than about 20%, less than about 25%, less than about 30%, less than about 40%, less than about 50%, less than about 60%, less than about 70%, less than about 80%, less than about 90%, less than about 100%, less than about 125%, less than about 150%, less than about 300%, less than about 400%, less than about 500%, less than about 600%, or less than about 700% different than the CTE of a second seal material (e.g., electrically isolating ceramic). In some cases, the CTE of a first seal material (e.g., metal collar) is at least about 1%, at least about 5%, at least about 10%, at least about 15%, at least about 20%, at least about 25%, at least about 30%, at least about 40%, at least about 50%, at least about 60%, at least about 70%, at least about 80%, at least about 90%, at least about 100%, at least about 125%, at least about 150%, at least about 300%, at least about 400%, at least about 500%, at least about 600%, or at least about 700% different than the CTE of a second seal material (e.g., electrically isolating ceramic).

The CTE of the seal can be mismatched (e.g., intentionally or purposely mismatched) to the CTE of the conductive housing and/or the conductor at the operating temperature and/or during start-up of the cell (e.g., starting from non-molten metal electrodes). In some cases, the CTE of the seal is at least about 10% different than the CTE of the electrically conductive housing and/or the conductor at the temperature at which the electrochemical cell is operated. In some instances, the CTE of the seal is at least about 1%, 5%, 10%, 15%, 20%, 25%, 30%, 40%, 50%, 75%, 100%, 125%, 150%, or 300% different than the CTE of the electrically conductive housing and/or the conductor at any or all temperatures between about −10° C. and the operating temperature (e.g., at least about 200° C., 250° C., 300° C., 350° C., 400° C., 450° C., or 500° C.).

In some cases, the geometry of the seal comprises a ceramic material bonded to a flexible metal component. The flexible metal component can be joined (e.g., welded or brazed) to the electrically conductive housing and/or the conductor.

Figure 10:
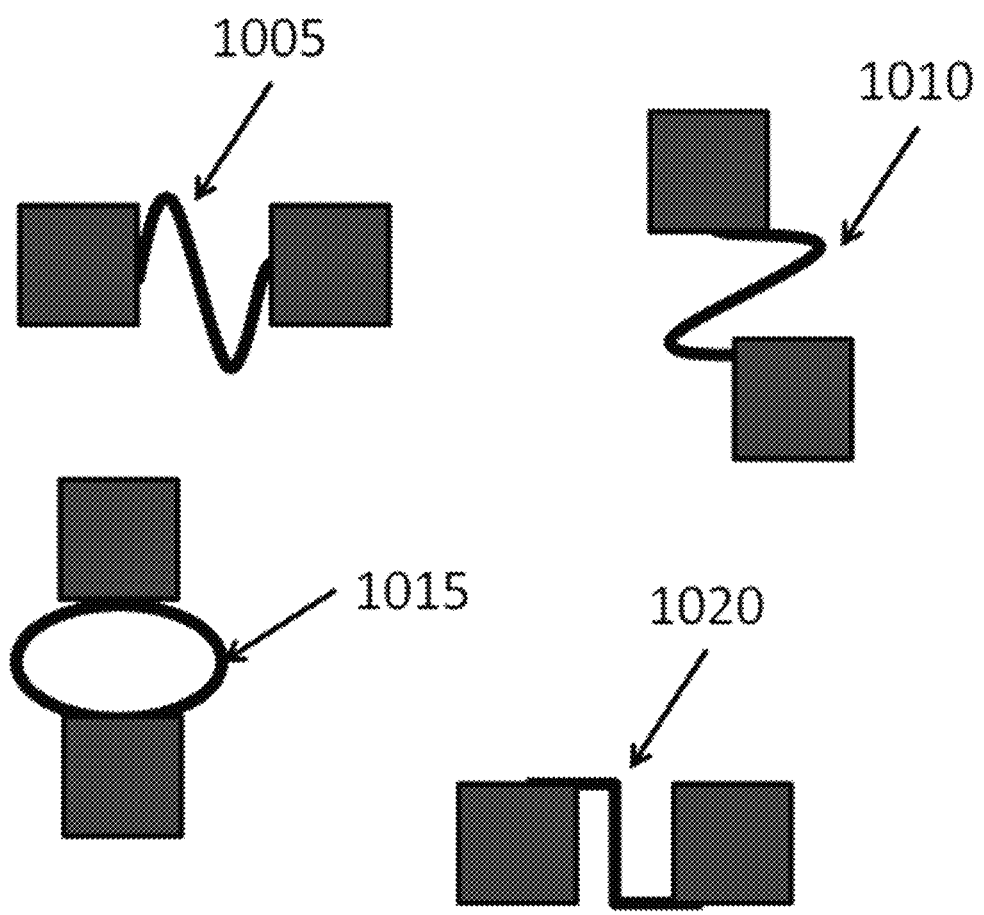
FIG. 10 shows examples of features that can compensate for a coefficient of thermal expansion mismatch.

FIG. 10 shows examples of features that can compensate for a CTE mismatch. Examples include fins, cuts or bends in any configuration that can accommodate CTE mismatch (e.g., by spatial compliance). For example, a bend can be sinusoidal (either horizontally 1005 or vertically 1010), oval or tubular 1015, a sharp bend 1020, etc. The feature can be attached at a point above, below or in line with the top of the cell and/or current collector. The feature can be joined to, part of, or cut away from the cell housing and/or conductive feed-through. The feature can be coated (e.g., to improve chemical stability to the internal or external environments of the cell). The orientation, thickness and/or shape can be optimized to increase stability and resistance to failure from vibration and mechanical forces.

Material Selection for Low CTE Mismatch

In some cases, one or more of the electrically conductive components of the seal comprise an electrically conductive ceramic (e.g., tungsten carbide) with a CTE that matches or is within about 1%, 2%, 5%, 10% or 20% of the electrically insulating ceramic. The electrically conductive (CTE-matched) ceramic can be joined to both the insulating ceramic component and a metal collar. The joining process may involve brazing, diffusion bonding, and/or welding. The conductive ceramic may comprise, for example, tungsten carbide (WC), titanium carbide (TiC), and/or other carbides. The conductive ceramic may be sintered with some fraction (e.g., about 2%-10%, a least about 2%, at least about 3%, at least about 4%, at least about 5%, at least about 6%, at least about 7%, at least about 8%, at least about 9% or at least about 10% in terms of weight, atomic, molar or volumetric composition) of metal (e.g., Co or Ni) which can allow for direct wetting of braze to the conductive ceramic.

In some cases, the electrically conductive components of the seal comprise a metal with low CTE (e.g., less than about 1 ppm/° C., less than about 2 ppm/° C., less than about 3 ppm/° C., less than about 4 ppm/° C., less than about 5 ppm/° C., less than about 6 ppm/° C., less than about 7 ppm/° C., less than about 8 ppm/° C., less than about 9 ppm/° C., less than about 10 ppm/° C., or less than about 15 ppm/° C.), low Young's Modulus (e.g., less than about 0.1 GPa, less than about 0.5 GPa, less than about 1 GPa, less than about 10 GPa, less than about 50 GPa, less than about 100 GPa, less than about 150 GPa, less than about 200 GPa, or less than about 500 GPa), high ductility (e.g., an ultimate strength greater than about 100%, greater than about 200%, greater than about 300%, greater than about 400%, or greater than about 500% that of the yield strength), or any combination thereof. In some cases, the ultimate strength can be greater than about 50% that of the yield strength, greater than about 100% that of the yield strength, or greater than about 200% that of the yield strength of the material for it to have sufficient ductility. In some cases, the electrically conductive components do not comprise an electrically conductive ceramic. Low CTE, low Young's Modulus and/or high ductility component characteristics can lead to low stress concentrations in the ceramic and reduce likelihood of failure. Metals that meet these specifications (in addition to corrosion resistance to the internal and external cell environment) can include, for example, zirconium (Zr), high-zirconium content alloys, tungsten (W), titanium (Ti), or molybdenum (Mo).

In some implementations, the seal comprises a ceramic, one or more braze materials and one or more metal collars. For example, two metal collars may be joined to the ceramic, one to each side of the ceramic. Each such metal collar may be further joined to additional metal collar(s). Thus, a compound metal collar may be created that comprises two or more metal collars. In some examples, the compound metal collar comprises at least two metal collars, of which at least one metal collar comprises a material that is suitably joined (e.g., using one type of braze) to the ceramic and at least one metal collar comprises a material that is suitably joined to another component of the seal or of the cell (e.g., using another type of braze). The two metal collars may also be joined (e.g., using yet another type of braze). In some instances, at least a portion (e.g., all) of the brazes used to join the metal collars of the seal to each other and/or to other parts of the cell may be of the same type. In other instances, all of the brazes may be of different types. Further, one or more of the metal collars may be welded rather than brazed, or welded and brazed. The seal may comprise one or more compound metal collars. In some examples, the seal comprises at least about 1, 2, 3, 4, 5, 6, 7, 8, 9, 10, 12, 14, 16, 18, 20, 25, 30, 40 or more individual metal collars. In an example, the seal comprises 4 individual metal collars forming two compound metal collars. In some examples, at least a portion of the individual metal collars may comprise the same material. For example, metal collars comprising the same material may be used for joining metal collars to similar materials (e.g., similar cell housing or conductors materials).

In some cases, the seal comprises a ceramic, a braze material, a first (e.g., thin) metal collar, and/or a second metal collar. The first metal collar may be brazed to the ceramic, and the second metal collar may be brazed to the first metal collar. In some cases, the first metal collar is a low CTE material such as zirconium (Zr) or tungsten (W) and the second metal collar is a ferrous alloy, such as steel, stainless steel or 400 series stainless steel (e.g., 430 stainless steel). In some examples, the first metal collar is less than about 10 micro-meters (μm, or microns) thick, less than about 20 μm thick, less than about 50 μm thick, less than about 100 μm thick, less than about 150 μm thick, less than about 250 μm thick, less than about 500 μm thick, less than about μm 1,000 thick, less than about μm 1,500 thick, or less than about 2,000 μm thick.

In some cases, the seal comprises a ceramic, a braze, a first metal collar, a second metal collar, and a third metal collar. The first metal collar may be joined to one part of the ceramic, and the second metal collar may be joined to the first metal collar. The third metal collar may be joined to a different part of the ceramic such that the first metal collar and the third metal collar are separated by an electronically insulating ceramic material. Joints between the first metal collar and the ceramic and between the third metal collar and the ceramic may both be hermetic. In some cases, the seal further comprises a fourth metal collar that is joined to the third metal collar (e.g., the first metal collar is joined to one part of the ceramic, the second metal collar is joined to the first metal collar, the third metal collar is joined to another part of the ceramic and the fourth metal collar is joined to the third metal collar). The braze material used to join the first metal collar to the second metal collar may comprise or be similar to any of the braze compositions described herein. The first metal collar or the second metal collar may be joined (e.g., using a braze composition similar to any of the braze compositions described herein, or welded) to the cell lid. The third metal collar may be joined to the fourth metal collar or directly to a negative current lead (e.g., brazed using any of the braze compositions of the disclosure).

Figure 23:
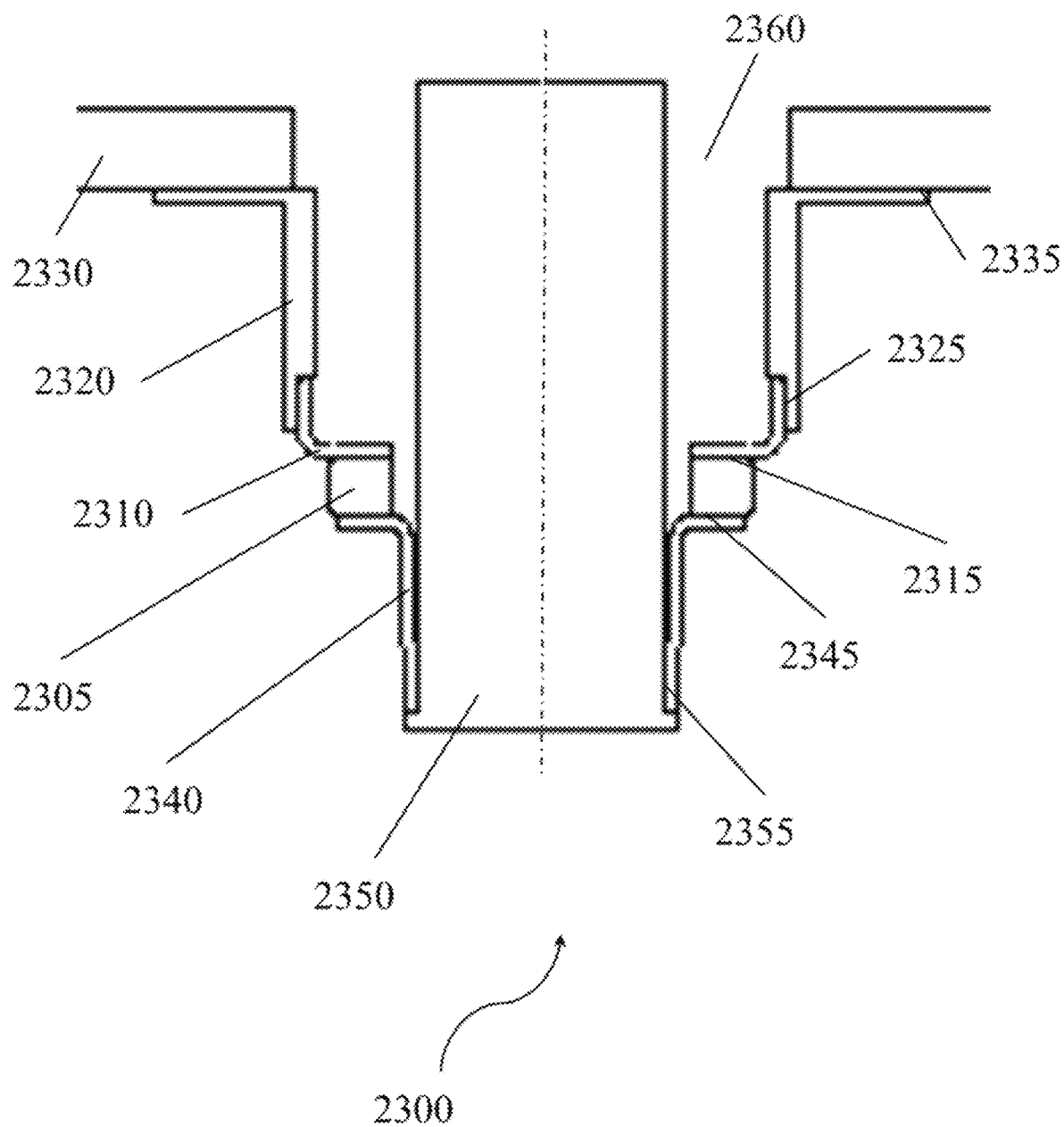
FIG. 23 shows a seal design having a single ceramic insulator disposed between one or more metal sleeves.

FIG. 23 is an example of a seal 2300 that comprises one ceramic component (e.g., AlN) 2305. The ceramic component may be a washer. The ceramic component may be electrically insulating. The ceramic component 2305 is joined with a first metal collar (e.g., Zr) 2310 via a first metal-to-ceramic joint (e.g., braze) 2315. The first metal collar 2310 is joined with a second metal collar (e.g., 430 SS) 2320 via a first metal-to-metal joint (e.g., weld, braze) 2325. The second metal collar 2320 is joined to a cell lid (e.g., 430 SS) 2330 via a second metal-to-metal joint (e.g., weld, braze) 2335. The seal further comprises a third metal collar (e.g., Zr) 2340 joined to the ceramic component 2305 via a second metal-to-ceramic joint (e.g., braze) 2345. The third metal collar 2340 is joined with a conductor (e.g., negative current lead) 2350 via a third metal-to-metal joint (e.g., weld, braze) 2355. The seal 2300 may comprise one or more gaps (e.g., air gaps) 2360.

In some cases, the first, second, third, and/or the fourth metal collar comprise structural features to relieve mismatches in the CTE of the joined materials, described in greater detail elsewhere herein. Such configurations may enable mechanically robust joining of the ceramic to one or more metal collars (e.g., the first metal collar, or the third metal collar), and the joining of on one or more metal collars (e.g., the second metal collar, or the third or fourth metal collar) to the cell lid or a current conducting rod (also "conductor" herein) by simple welding (e.g., TIG welding, or laser welding) or brazing.

Brazed Ceramic Seals

Figure 11:
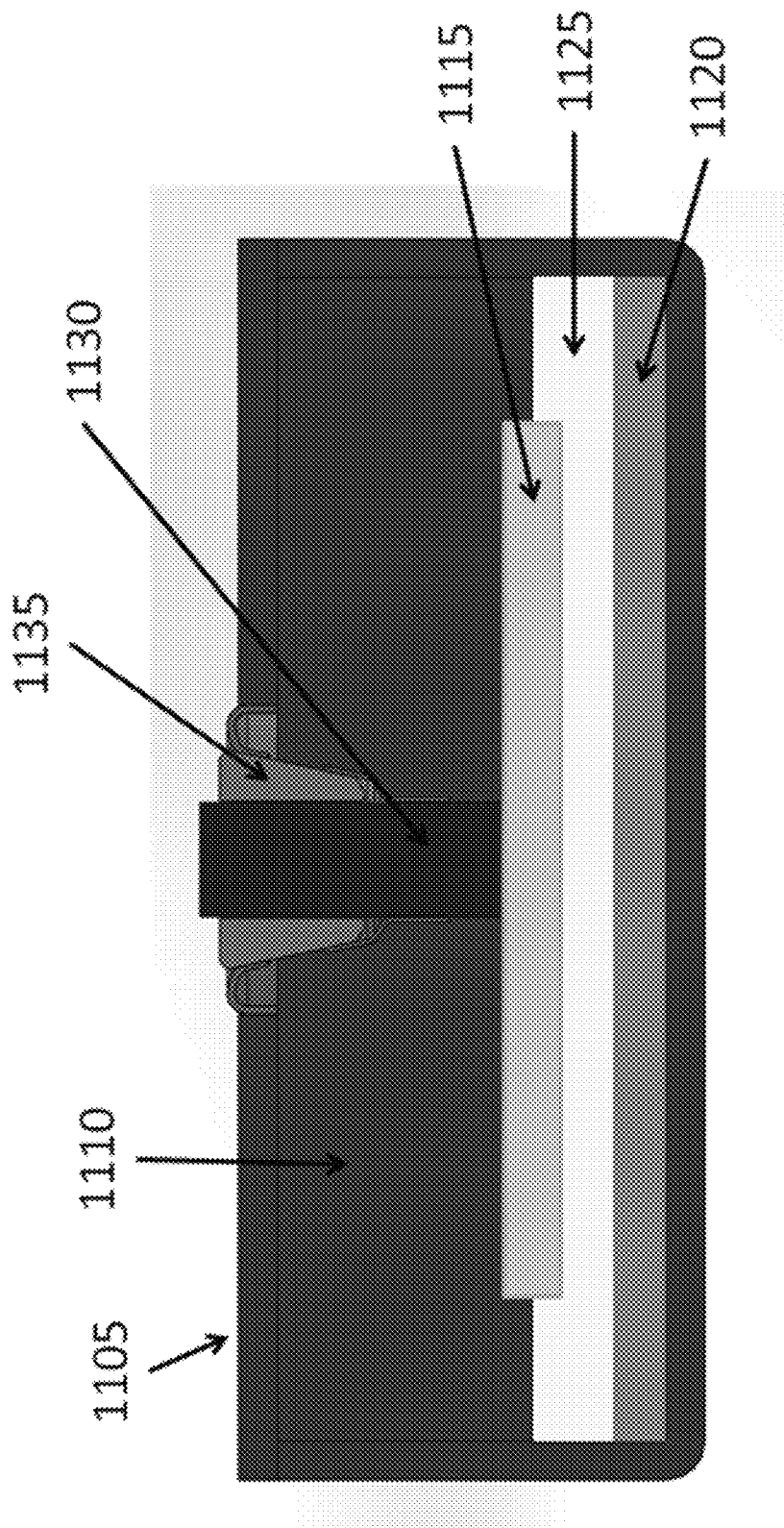
FIG. 11 shows an electrochemical cell having a brazed ceramic seal.

A brazed ceramic seal may be used to hermetically and/or electrically seal a system or vessel comprising a reactive material (e.g., an electrochemical cell having liquid metals). FIG. 11 shows an electrochemical cell having a brazed ceramic seal. A cell housing 1105 can have an empty head space 1110, a molten negative electrode (e.g., anode during discharge) 1115, a molten positive electrode (e.g., cathode during discharge) 1120 and a molten electrolyte 1125 disposed therebetween. The liquid metal anode can be in contact with a conductive feed-through 1130 that passes through the housing and serves as a negative terminal. The conductive feed-through can be electrically isolated from the housing by the seal 1135. The liquid metal cathode can be in contact with the housing, which can serve as a positive terminal.

In some cases, a brazed ceramic seal comprises a sub-assembly. The sub-assembly can comprise the insulating ceramic bonded to one or more (e.g., two) flexible, spring-like components, referred to herein as metal sleeves. After the sub-assembly is fabricated, the sleeves can be brazed or welded to other cell components such as the cell lid and/or the negative current lead. Alternatively, all of the joints can be created on the complete cap assembly by brazing (e.g., if tolerance limits are sufficiently tight). The chemical compatibility between the braze materials and the atmospheres the materials will be exposed to, and the thermal robustness during high temperature operation and thermal cycling can be evaluated during design of the sub-assembly. In some instances, the ceramic material is aluminum nitride (AlN) or silicon nitride ($Si_3N_4$), and the braze is a titanium alloy, titanium doped nickel alloy, a zirconium alloy or a zirconium doped nickel alloy.

Figure 12:
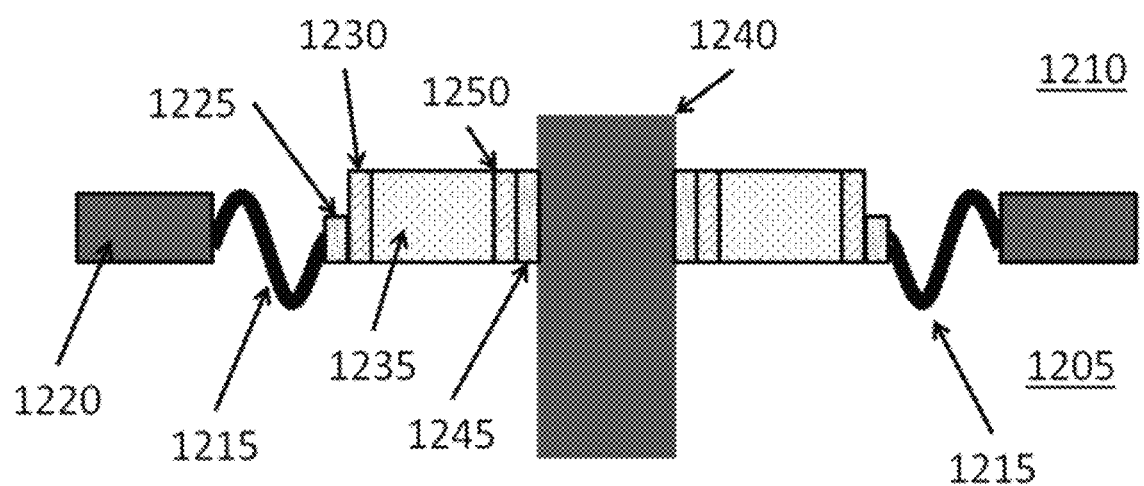
FIG. 12 shows a schematic drawing of a brazed ceramic seal where the materials are thermodynamically stable with respect to the internal and external environments of the cell.

FIG. 12 shows a schematic drawing of a brazed ceramic seal with materials that are thermodynamically stable with respect to internal 1205 and/or external 1210 environments of a cell. Such materials may not require a coating. The various materials can have mismatched CTEs that can be accommodated for with one or more geometric or structural features 1215 (e.g., a flexible metal bend, fin, or fold). The CTE-accommodating feature 1215 can be welded to a cell housing 1220 (e.g., 400-series stainless steel) on one end and brazed 1225 to a first metalized surface 1230 of a ceramic material 1235 on the other end. The ceramic material 1235 can be, for example, aluminum nitride (AlN), boron nitride (BN) or yttrium oxide ($Y_2O_3$) as described herein. The ceramic material can be brazed to a current collector (conductive feed-through) 1240 by a braze 1245. The braze 1245 can comprise, for example, iron (Fe), nickel (Ni), titanium (Ti) or zirconium (Zr). The braze 1245 can be in contact with a second metalized surface of the ceramic 1250 (e.g., titanium or titanium nitride). Several layers of materials placed adjacent to each other can result in a CTE gradient that can mitigate mismatch.

Figure 13:
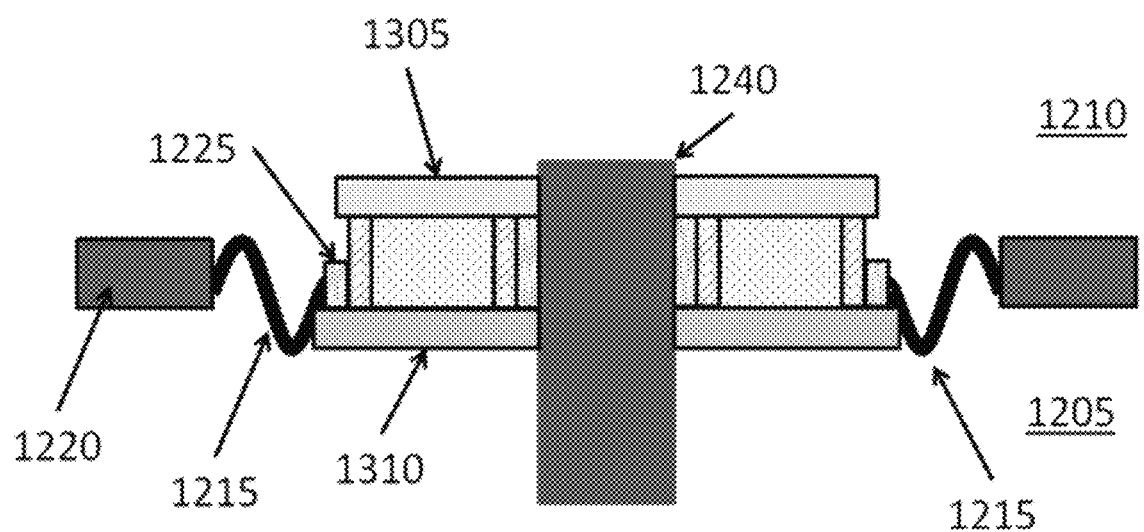
FIG. 13 shows a seal where the ceramic and/or braze materials are not thermodynamically stable with respect to the internal and external environments.

FIG. 13 shows a seal where the ceramic and/or braze materials are not thermodynamically stable with respect to the internal 1205 and external 1210 environments. In some instances, a coating can be applied to an outside 1305 and/or an inside 1310 of the seal or enclosure components.

Figure 14:
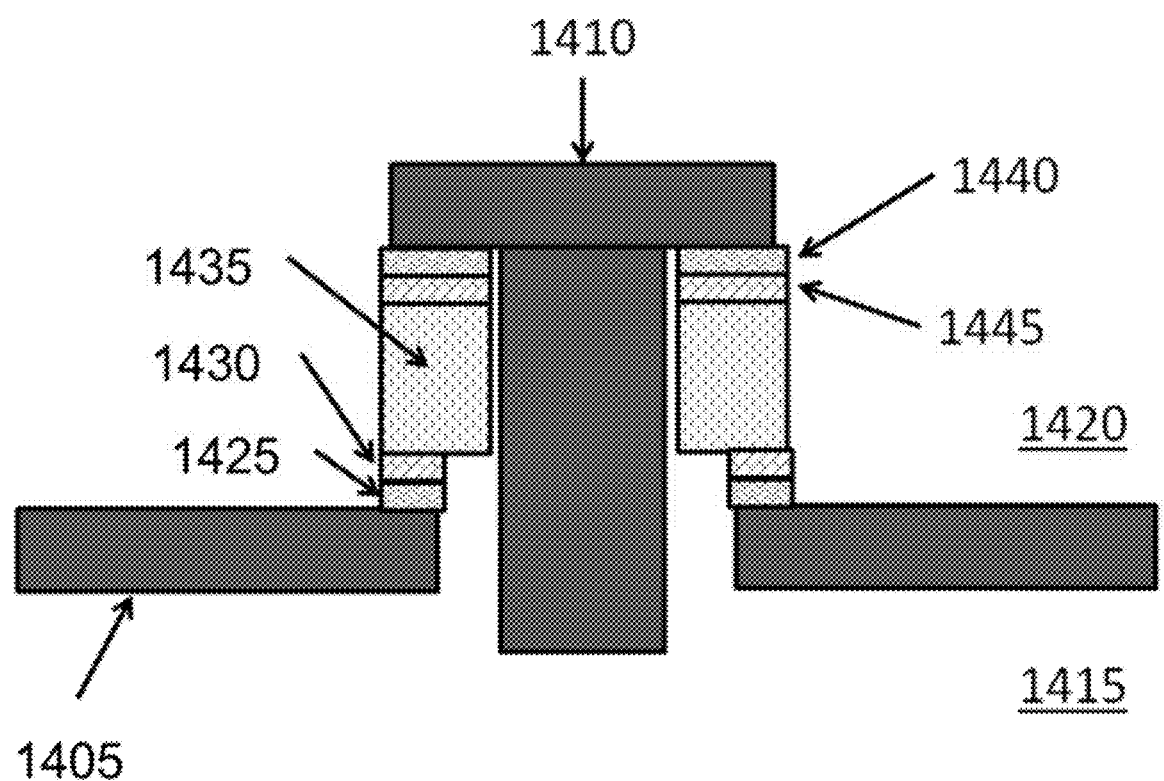
FIG. 14 shows an example of a brazed ceramic seal.

FIG. 14, FIG. 15, FIG. 16 and FIG. 17 show more examples of brazed ceramic seals. In some cases, the seals extend above the housing by a greater distance. FIG. 14 shows an example of a seal on a cell which may advantageously not need a coating, not need a CTE mismatch accommodation feature, and/or provide increased structural stability against vibration and mechanical forces during operation, manufacturing or transportation. In this example, a housing 1405 can be sealed from a current collector 1410. This arrangement can hermetically seal an inside 1415 of the cell from an outside 1420 of the cell. The components of the seal can be arranged vertically and can include a first braze 1425, a ceramic 1435, a first metalized surface 1430 of the ceramic, a second braze 1440, and a second metalized surface 1445 of the ceramic.

Figure 15:
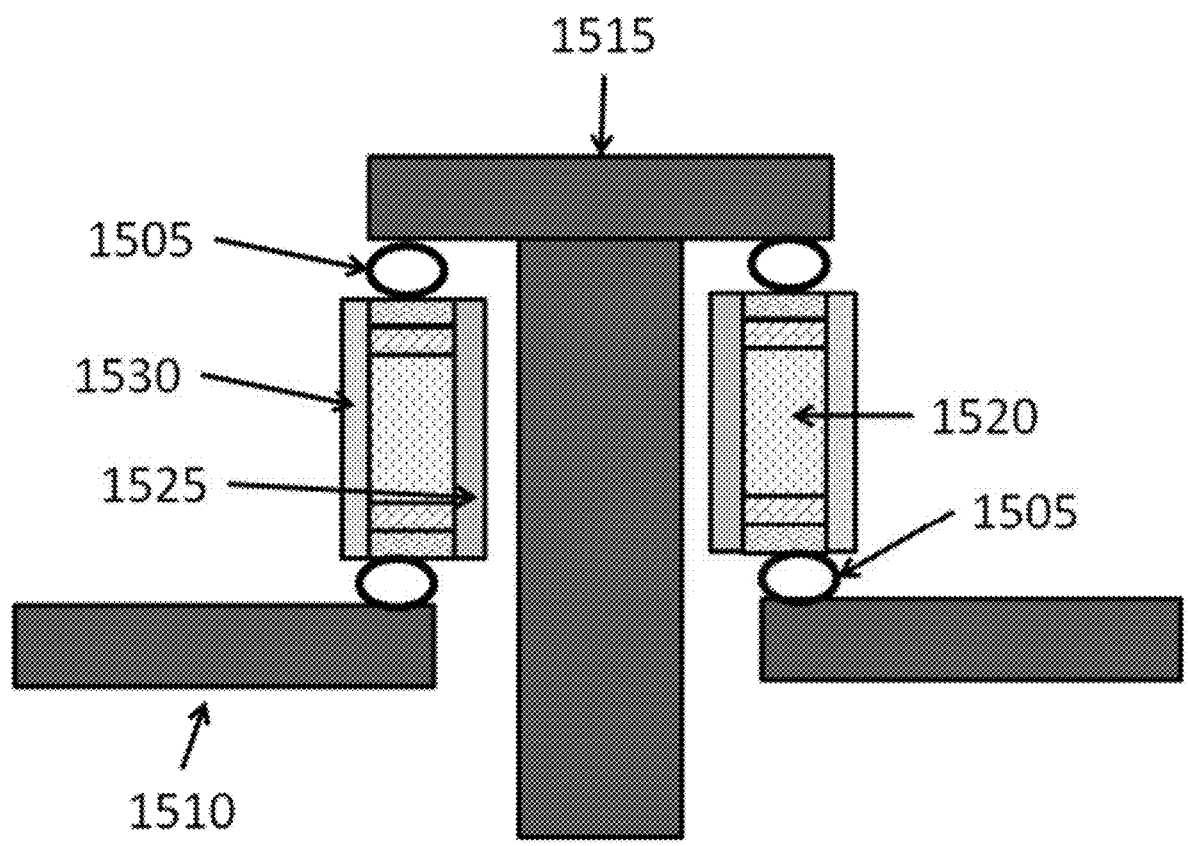
FIG. 15 shows an example of a brazed ceramic seal.

FIG. 15 shows a seal 1520 that can provide structural stability against vibration and mechanical forces during operation, manufacturing and transportation. In this example, CTE accommodating features 1505 are disposed between a housing 1510 and a current collector 1515. The seal 1520 can comprise a ceramic and two brazes in contact with metalized surfaces of the ceramic. In some cases, the seal is coated on an inside 1525 and/or an outside 1530. In some cases, the coating(s) can comprise yttrium oxide ($Y_2O_3$).

Figure 16:
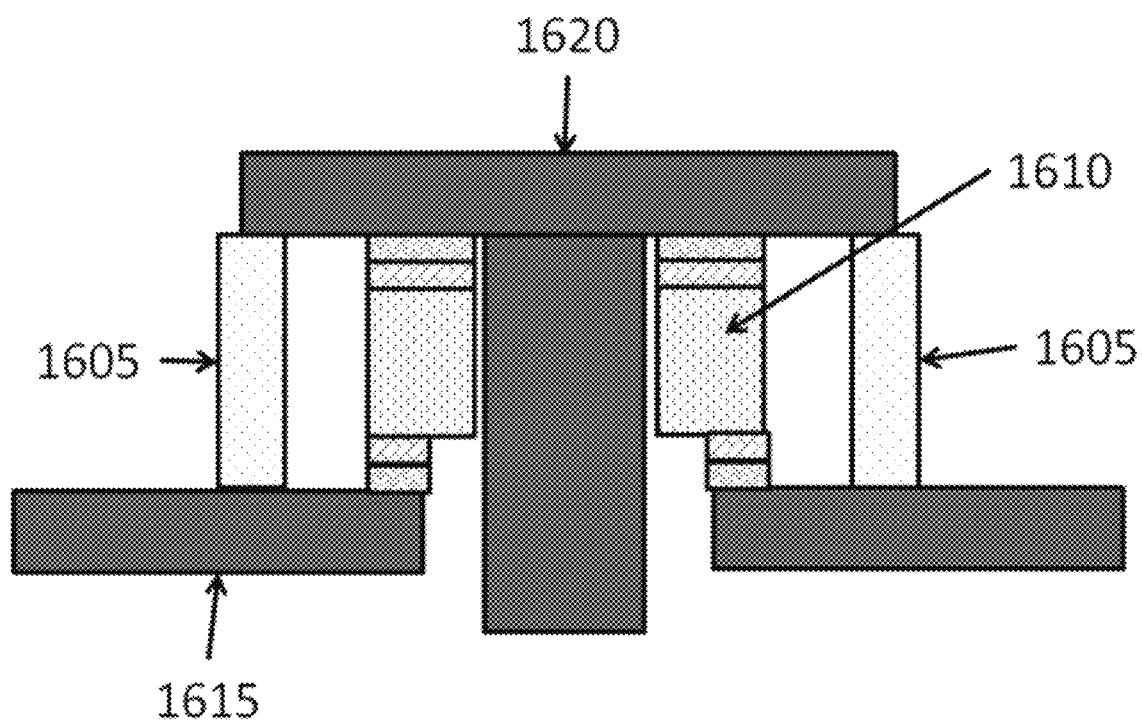
FIG. 16 shows an example of a brazed ceramic seal.

FIG. 16 shows a seal 1610 with secondary mechanical load bearing components 1605. The load bearing components are electrically insulating in some cases. In some instances, the load bearing components do not form a hermetic seal. The seal 1610 (e.g., including a ceramic, two brazes in contact with metalized surfaces of the ceramic, etc.) can hermetically seal a cell housing 1615 from a current collector 1620.

Figure 17:
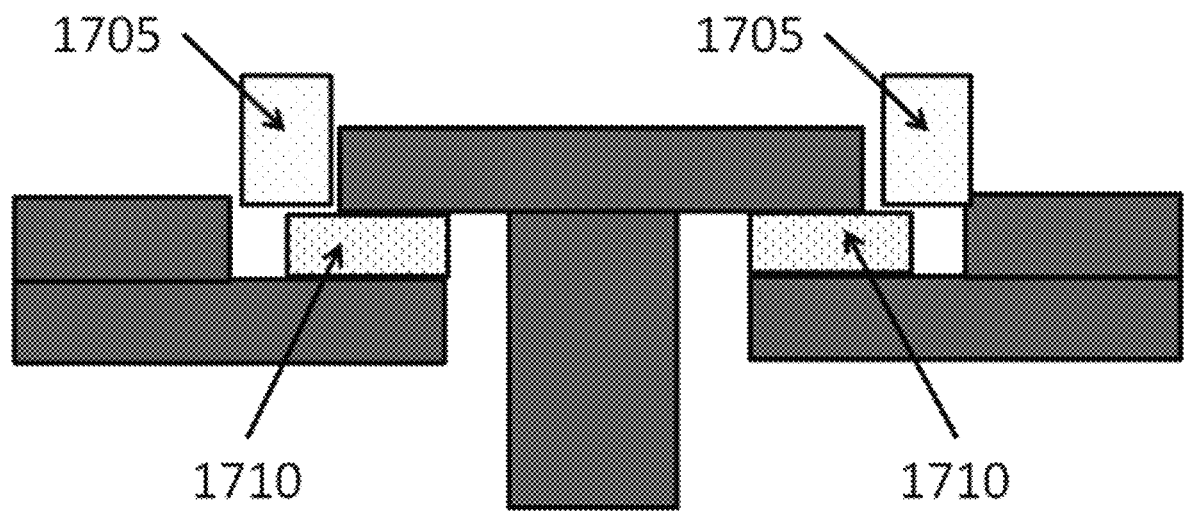
FIG. 17 shows an example of a brazed ceramic seal.

FIG. 17 shows an example of a secondary back-up seal 1705 (e.g., in case of failure of a primary seal 1710). The secondary seal can fall onto and/or bond over the primary seal in the case of failure of the primary seal. In some cases, the secondary seal comprises glass that melts and becomes flowable in the case of the primary seal failing. The melted secondary seal can pour down onto the failed primary seal and block leaks. In some cases, the seal 1705 and/or the seal 1710 can be axisymmetric (e.g., doughnut-shaped around a vertical axis through the aperture in the cell lid).

Figure 18:
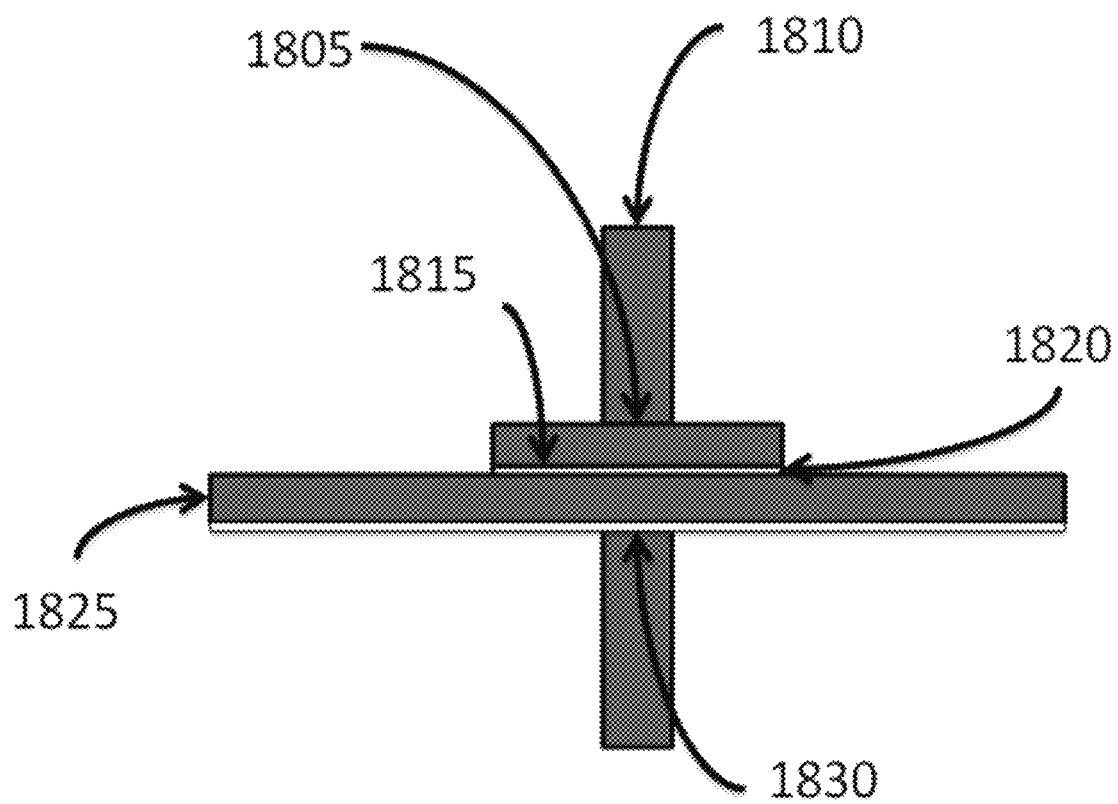
FIG. 18 shows an example of a seal having an alumina or zirconia seal with yttrium oxide ($Y_2O_3$) coating and iron-based braze.

FIG. 18 shows another example of a seal configuration or sub-assembly (e.g., an alumina or zirconia seal with yttrium oxide ($Y_2O_3$) coating and iron- or titanium-based braze). The seal can include a collar 1805. The collar can provide mechanical support. The collar can comprise ferritic stainless steel welded to a rod. The seal configuration can include a conductor 1810. The conductor can be made of ferritic stainless steel (e.g., having a CTE of about 12). The conductor can be tolerant of one or more reactive materials (e.g., tolerant of liquid lithium). The conductor can be unlikely to change mechanical properties or form due to a phase transition. The conductor can have about 40% higher electrical conductivity than 304 stainless steel. The seal can include a braze 1815. The braze can be disposed above and below a ceramic washer 1820. The braze can be iron-based. The braze can have a CTE of about 12 and withstand high temperatures (e.g., 850° C. or greater). The ceramic washer 1820 can be made of alumina (e.g., with a CTE of about 7), or zirconia (e.g., tetragonal with CTE of about 11). The low CTE mismatch of a zirconia washer can allow higher brazing temperature without cracking. A cell housing 1825 can be made from ferritic steel and provide mechanical support through the ceramic (e.g., the ceramic washer) to the collar. The seal configuration can comprise a coating (e.g., spray coating) 1830 (e.g., comprising yttrium oxide ($Y_2O_3$)). The coating can be provided on the cell housing (e.g., lid). The coating can be capable of being resistant to reactive materials (e.g., lithium (Li) vapor), inexpensive and/or mitigate ceramic compatibility.

The length (e.g., horizontal extent) of the braze interface can be about three to six times the thickness of the thinnest component being brazed. If the ratio of thickness to braze interface length is too low (e.g., less than about three), the sealing area may be mechanically too weak to hold the brazed joint together. If the ratio is too high (e.g., greater than about six), the stresses on the sleeve due to CTE mismatch may cause the sleeve to fracture or pull away from the ceramic. In some cases, the braze interface absorbs the stresses induced by the mismatch of the CTEs of the sleeve, braze and ceramic induced by forming the joint at high temperature and cooling down to room temperature after fabrication.

Figure 19:
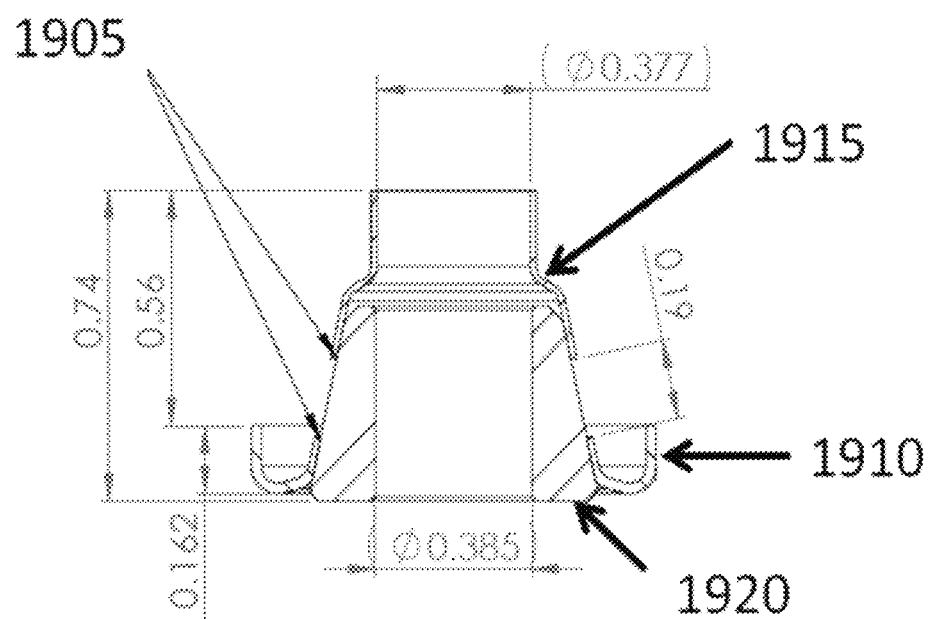
FIG. 19 shows an example of a sub-assembly.

FIG. 19 shows an example of a sub-assembly with braze length equal to about 3 to 6 times the thickness of a metal sleeve. The metal sleeve (e.g., nickel-cobalt ferrous alloy, zirconium alloy) can have a thickness of about 0.01 inches, about 0.0080 inches, about 0.0060 inches, about 0.0030 inches, or about 0.0015 inches. The sub-assembly can comprise a braze 1905, one or more (e.g., nickel-cobalt ferrous alloy or stainless steel) sleeves (e.g., 1910 and 1915) and an insulator 1920.

Figure 20:
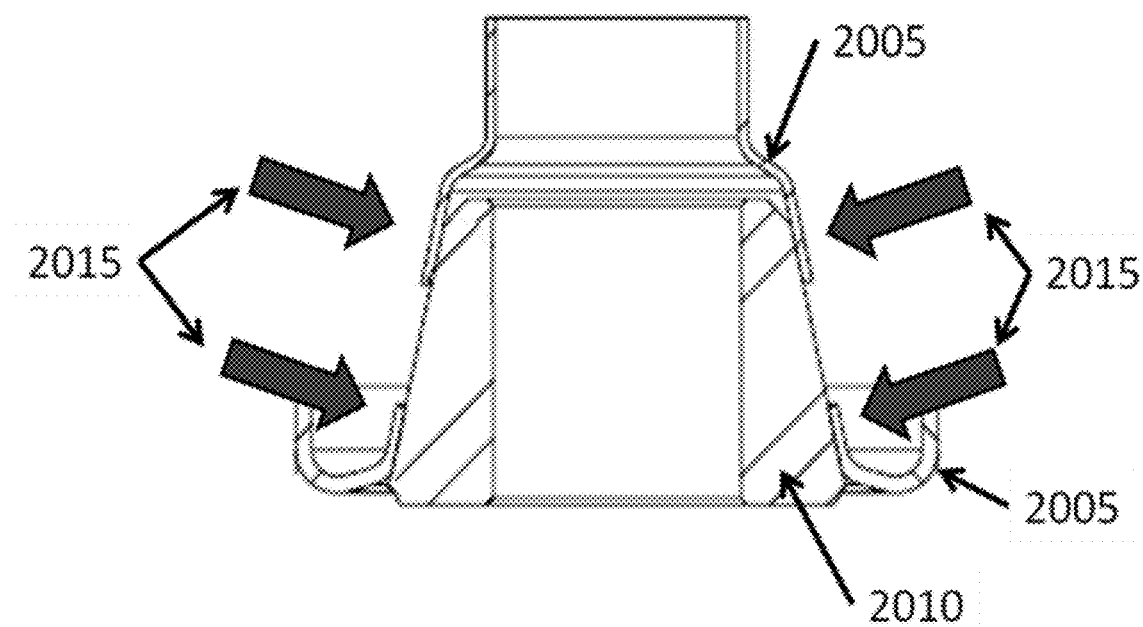
FIG. 20 shows how the shape of a sub-assembly can accommodate coefficient of thermal expansion mismatch.

FIG. 20 shows an example of a shape of a sub-assembly that can accommodate CTE mismatch. The sub-assembly (i.e., seal) can have a sleeve (e.g., a nickel-cobalt ferrous alloy sleeve) 2005 and an insulator (e.g., a ceramic) 2010. Compressive forces can act in the direction of indicated arrows 2015. Ceramic materials may be capable of withstanding a high level of compression. In some cases, seal designs can utilize this characteristic of ceramics to provide a reliable seal. In order to produce a compressive seal, outer material of the seal can have a higher CTE value than inner material of the seal. During processing and fabrication, the sub-assembly can be heated, causing the materials to expand. After reaching the braze melting temperature, the braze joint can be formed, and upon cooling, the higher CTE material can contract at a higher rate than the inner material to create a compressive seal. Due to the high temperature brazing operation and subsequent cool-down, the sleeves (e.g., nickel-cobalt ferrous alloy or stainless steel sleeves) can apply a compressive force to the sealed bonding interface (e.g., nickel-cobalt ferrous alloy or stainless steel/insulator interface) due to the insulator in the center contracting less. The example in FIG. 20 utilizes a Ti-alloy braze to form the sealing joint, and the compressive forces 2015 formed during the cool-down to press the sleeve 2005 (e.g., nickel-cobalt ferrous alloy sleeve) onto the insulator (e.g., ceramic) 2010, thus providing a stable and robust seal. The seal in FIG. 20 is an example of a circumferential seal.

Figure 21:
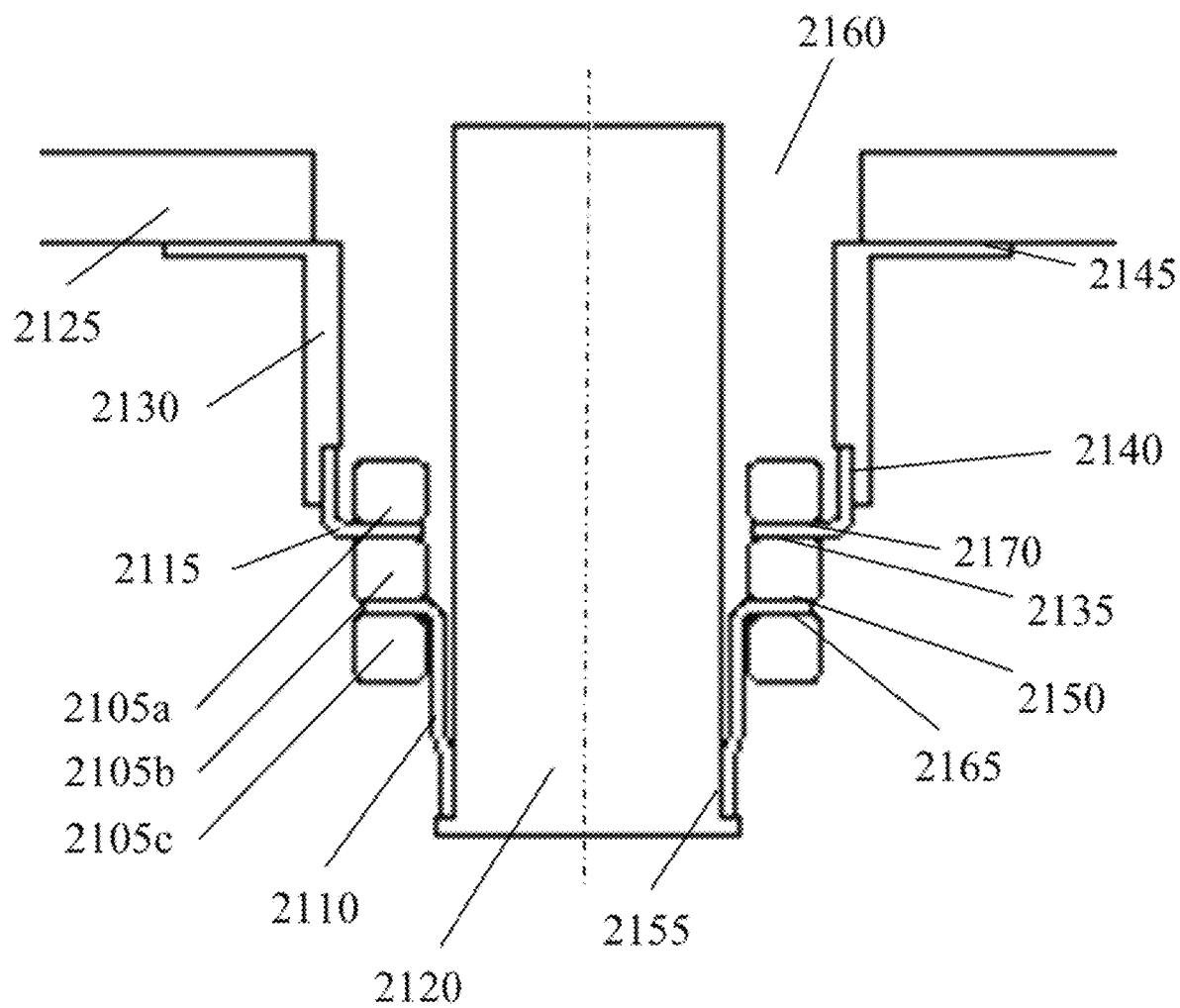
FIG. 21 shows a seal design having multiple ceramic insulators disposed between one or more metal sleeves.

FIG. 21 is an example of a seal 2100 that comprises multiple ceramic components. The ceramic components may washers. The ceramic components may be electrically insulating. The seal can electrically isolate a conductor (e.g., negative current lead) 2120 from a cell housing (e.g., cell lid) 2125 (e.g., by a hermetic seal). The seal in FIG. 21 is an example of a stacked seal design. In this seal design, three separate ceramic components (e.g., AlN) 2105*a*, 2105*b* and 2105*c* are positioned vertically on top one another. The ceramic components (e.g., insulators) are disposed between one or more metal sleeves or collars 2110, 2115 and 2130 (e.g., zirconium metal, zirconium alloy, or nickel-cobalt ferrous alloy forming a flexible joint). In some cases, the collar 2130 may not be used and the collar 2115 may be joined directly to the cell housing 2125. The ceramic 2105*b* may provide sealing. The ceramic components 2105*a* and 2105*c* may provide stress and/or support for the seal. The ceramic components 2105*a* and 2105*c* may or may not provide sealing. In some situations, the ceramic components 2105*a* and 2105*c* may break (e.g., break and fall off). In such situations, the sealing provided by the central (in this case middle) ceramic component may not be affected.

The ceramic component 2105*b* is joined with a first metal collar (e.g., Zr) 2115 via a first metal-to-ceramic joint (e.g., braze) 2135. The first metal collar 2115 may further be joined to the ceramic component 2105*a* via a fourth metal-to-ceramic joint 2170. In some cases, the first metal-to-ceramic joint 2135 and the fourth metal-to-ceramic joint 2170 are the same type of joint (e.g., comprise the same braze material). The first metal collar 2115 is joined with a second metal collar (e.g., 430 SS) 2130 via a first metal-to-metal joint (e.g., weld, braze) 2140. The second metal collar 2130 is joined to a cell lid (e.g., 430 SS) 2125 via a second metal-to-metal joint (e.g., weld, braze) 2145. The seal further comprises a third metal collar (e.g., Zr) 2110 joined to the ceramic component 2105*b* via a second metal-to-ceramic joint (e.g., braze) 2150. The third metal collar 2110 may further be joined to the ceramic component 2105*c* via a third metal-to-ceramic joint (e.g., braze) 2165. In some cases, the second metal-to-ceramic joint (e.g., braze) 2150 and the third metal-to-ceramic joint 2165 are the same type of joint (e.g., comprise the same braze material). The third metal collar 2110 is joined with a conductor (e.g., negative current lead) 2120 via a third metal-to-metal joint (e.g., weld, braze) 2155. The seal 2100 may comprise one or more gaps (e.g., air gaps) 2160.

In some cases, the sealing is provided by a central ceramic (e.g., the middle ceramic 2105*b* in FIG. 21) that is joined to metal collars (e.g., metal collar 2110 and 2115 in FIG. 21) on opposite sides of parallel faces of the ceramic (e.g., along interfaces/joints 2150 and 2135 in FIG. 21) in a stacked fashion. Two additional ceramic components (e.g., the top ceramic 2105*a* and the bottom ceramic 2105*c* in FIG. 21) are included in the design and joined on the face of each metal collar that is opposite to the face that is bonded to the central ceramic (e.g., along brazing interfaces/joints 2170 and 2165 in FIG. 21). A stacked configuration with three ceramic components may create symmetric braze lengths on either side of the metal collars. Braze joints comprising symmetric braze lengths on either side of a metal collar may create symmetric forces on the metal collar. This may enhance the overall strength of the braze joint (e.g., by minimizing stress concentrations and placing the metal under tension and the ceramic components under compression). In some cases, a joint comprising a flat ceramic surface that is bonded to a flat metal surface is considered to be a face seal.

Different applications may benefit from different seal designs. A circumferential (e.g., conical) seal design (e.g., see FIG. 20) may provide a robust seal design with a single ceramic component. The angled circumferential surface on the ceramic may enable easier assembly (e.g., the parts may fall into the proper configuration without the need for fixtures with tight tolerances or without the need for careful assembly prior to brazing). The circumferential design may in some cases be able to withstand greater CTE-mismatches between the metal collars and the ceramic since the primary force exerted by the metal onto the ceramic after cooling down from the brazing temperature may be a radially symmetric compressive force (e.g., due to ceramics generally being stronger in compression than in tension). A stacked seal design (e.g., see FIG. 21, or FIG. 23 which may be considered a special case of the stacked design with just one ceramic) may allow for lower cost components based on simpler machining of flat parallel surfaces on the top and bottom of the ceramic instead of machining the outer diameter and or machining the side of the ceramic to a specific conical angle (e.g., a conical angle of about, less than about, or at least about 5, 10, 15, 20, 25, 30, 35, 40, 50, or 75 degrees relative to a vertical orientation) as may be required by a circumferential seal. The stacked design may also enable designs with lower seal height (e.g., since the sealing interfaces are perpendicular to the height of the design). The seals of the disclosure (e.g., the seals in FIG. 20, FIG. 21 and FIG. 23) may be axially symmetric to aid in balancing forces on the seal. In some configurations, the stacked configuration may include 1, 2, 3, 4, 5, 6, 7, 8, 9, 10, 12, 14, 16, 18, 20 or more ceramic components. The number of ceramic components may be configured to balance the forces in a given seal configuration. In some cases, the ceramic components may be symmetrically distributed on two sides of a central (e.g., middle) ceramic component. In some cases, the ceramic components may be non-symmetrically distributed on two sides of a central (e.g., middle) ceramic component. In some cases, the ceramic components may be distributed in any configuration around (e.g., on two sides of) one or more ceramic components that provide sealing. Further, thickness of the ceramic components and/or of the metal collars may be selected to balance the forces in a given seal configuration. For example, metal collars joined or bonded to the ceramic (e.g., the first metal collar or the third metal collar) may have a first thickness, metal collars joined or bonded only to other metal collars (e.g., in compound metal collars) may have a second thickness, and metal collars joined or bonded to a conductor, cell housing lid and/or other part of the housing may have a third thickness (e.g., the third thickness may be equal to the first thickness if the metal collar is also directly joined to the ceramic).

Brazing can be provided on either side of the sleeve or flexible joint (e.g., a balanced seal as shown in FIG. 21) or on just one side of the joint (e.g., an unbalanced seal as shown in FIG. 23). Brazing on either side of each metal sleeve can balance the forces experienced by the sealing interfaces. An advantage of the balanced seal design may be that there can be limited force applied to the ceramic and minimal torque present during the cooling of the system. Such configurations can place the sleeves (e.g., nickel-cobalt ferrous alloy sleeves) in tension and the ceramics in compression. In an example, balancing of the seal may enable stress (e.g., stress generated during a post-fabrication cooling process) to be less than the tensile strength of the ceramic. In another example, balancing of the seal may enable strain (e.g., strain generated during a post-fabrication cooling process) to be less than the strain strength (e.g., maximum strain that the ceramic can withstand prior to breaking) of the ceramic. The ceramic may have a given strength. In some examples, a strength value (e.g., tensile strength, ultimate strength, yield strength) of a ceramic material, such as, for example, AlN, BN, $Al_2O_3$, $La_2O_3$, $Y_2O_3$, MgO, SiC, TiC or $Si_3N_4$, can be greater than about 10 mega-Pascals (MPa), 50 MPa, 100 MPa, 150 MPa, 200 MPa, 250 MPa, 300 MPa, 350 MPa, 400 MPa, 450 MPa, 500 MPa, 550 MPa, 600 MPa, 650 MPa, 700 MPa, 750 MPa, 800 MPa, 900 MPa, 1,000 MPa, 1,500 MPa, 2,000 MPa, 3,000 MPa, or 5,000 MPa.

Figure 22:
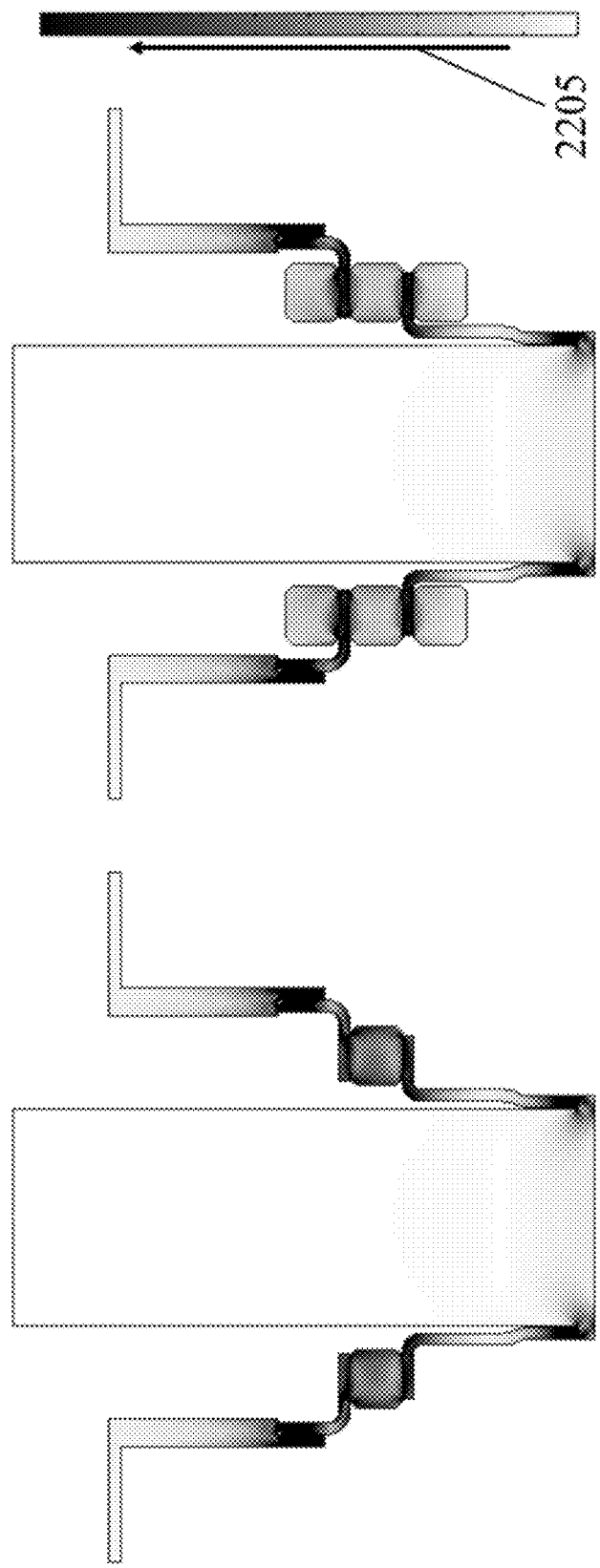
FIG. 22 shows an example of the forces on a seal.

FIG. 22 shows examples of forces on seals by providing images of results from computational models that predict stress and strain generated during a post-fabrication cooling process for a seal due to CTE mismatch (without incorporating plastic deformation). The models show the von Mises stress distribution (e.g., a calculated stress distribution based on forces applied in three spatial dimensions that provides insight into the likelihood of a stress-induced mechanical failure, e.g., if the calculated von Mises stress exceeds the strength of the material, the material is predicted to fail) generated using a linear elastic model for a process involving joining ceramic and metal components together at contacting interfaces at 850° C. and cooling the system to 25° C. In the example image on the left in FIG. 22, the seal comprises only one ceramic insulator (e.g., as shown in FIG. 23). In the example image on the right in FIG. 22, the seal comprises three ceramic insulators (e.g., as shown in FIG. 21). As shown in these examples, the single ceramic seal on the left in FIG. 22 can be subject to larger von Mises stresses and/or strain than the three ceramic seal on the right in FIG. 22. The shades in FIG. 22 represent different levels of the von Mises stress, with white being zero stress and black being the maximum stress on the scale, as indicated by an arrow in the direction of increasing stress 2205.

While the sub-assembly is cooled, stresses may build up, leading to immediate failure or failure when the seal is joined with the rest of the components of the cell top assembly. Since nickel-cobalt ferrous alloy can experience a phase transition at around 425° C. (e.g., as noted by the sudden change in CTE as a function of temperature in FIG. 7 and FIG. 8), it can maintain a higher stress level unless annealed below that temperature. In some cases, annealing of nickel-cobalt ferrous alloy is completed by a 30 minute soak at 850° C., which can ultimately yield high stresses in the sub-assembly. Higher temperature braze materials may use 430 stainless steel sleeves, since they do not experience grain growth after a phase transition leading to a change in shape or properties that may occur at prolonged periods of time at the device's (e.g., liquid metal battery's) operating temperature.

Figure 24:
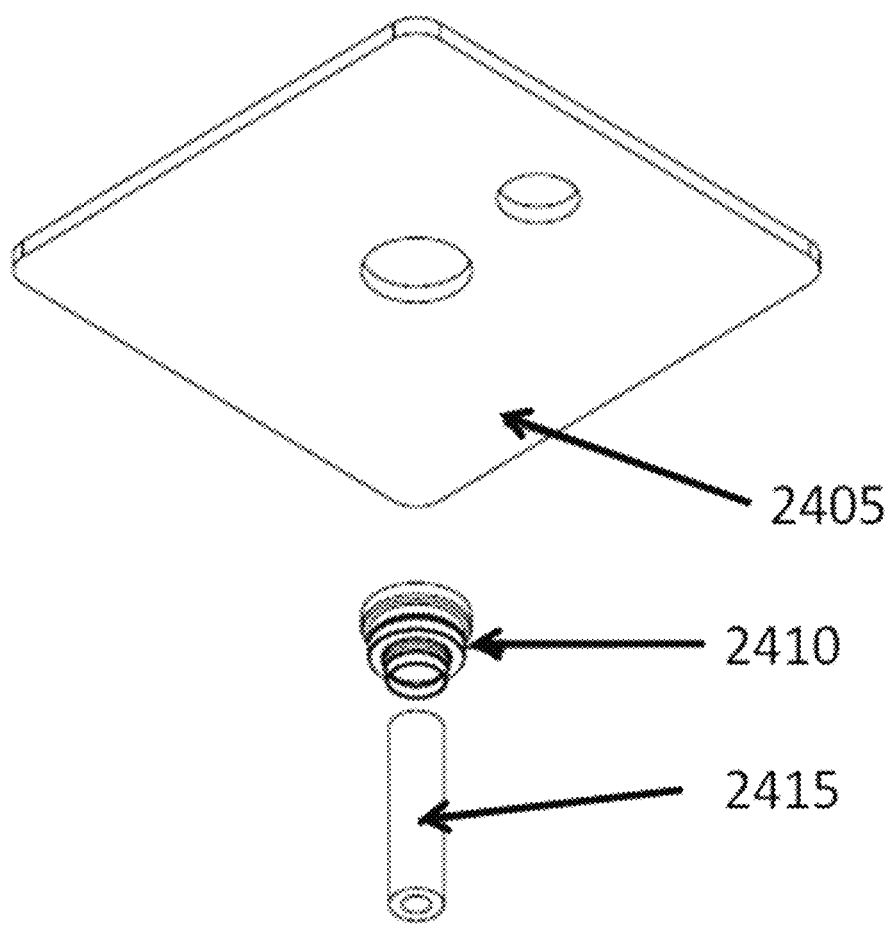
FIG. 24 shows a cell cap assembly.

FIG. 24 shows an exploded view of a cell cap assembly having a cell top 2405, a sub-assembly 2410 and a conductor 2415. The cell top can have any suitable geometry (e.g., as long as it interfaces with the cell body and allows for features such as, for example, gas management (if necessary), and a hole for the sub-assembly to be welded to). For example, the cell top can comprise a first aperture for the conductor/sub-assembly and a second aperture for a gas management connection. Each aperture may be sealed with a seal of the disclosure. In some cases, the conductor has a low CTE (e.g., so that the part does not short or crack the ceramic or fail).

Figure 25:
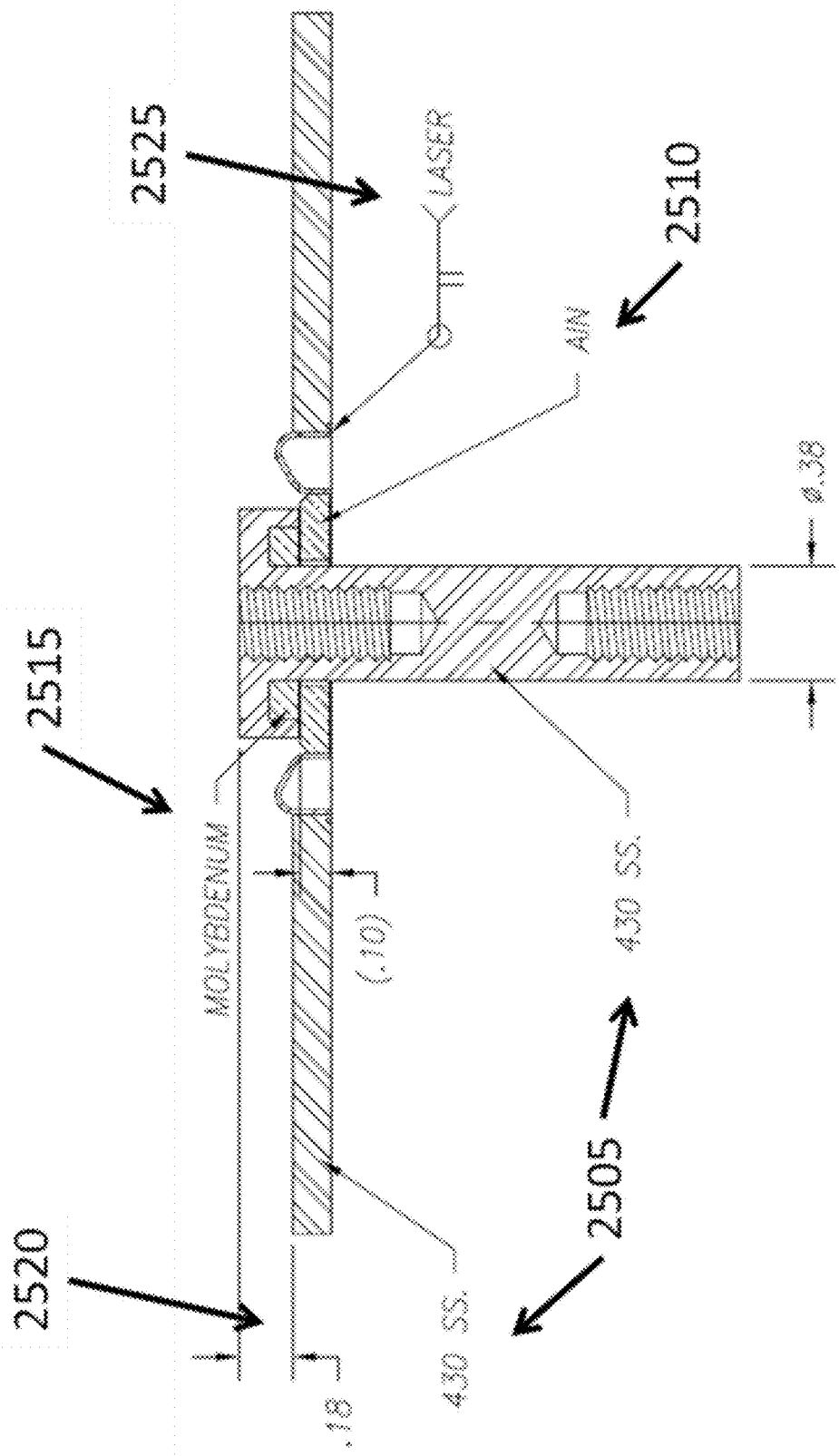
FIG. 25 shows examples and features of seals.
Figure 26:
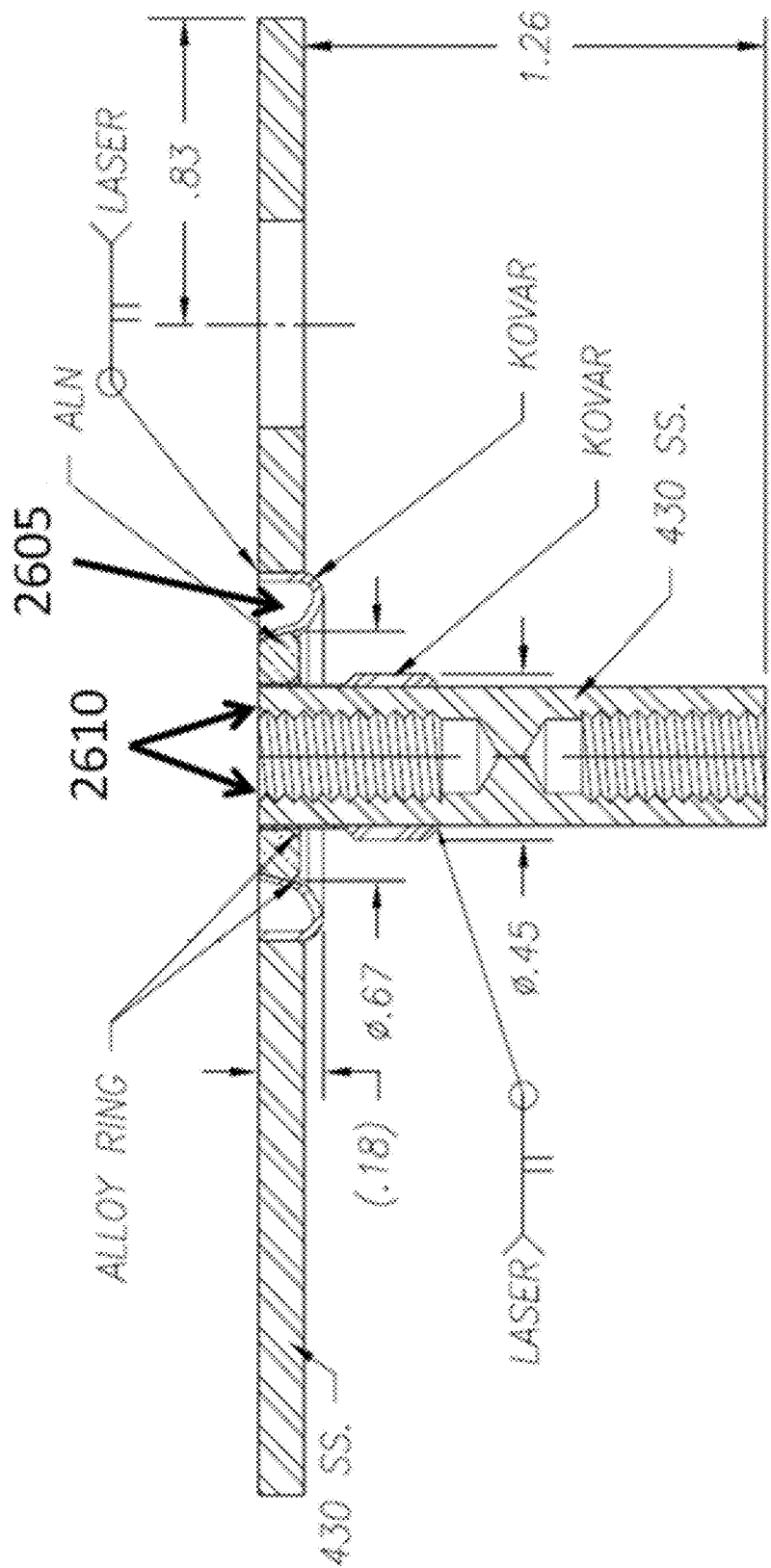
FIG. 26 shows examples and features of seals.
Figure 27:
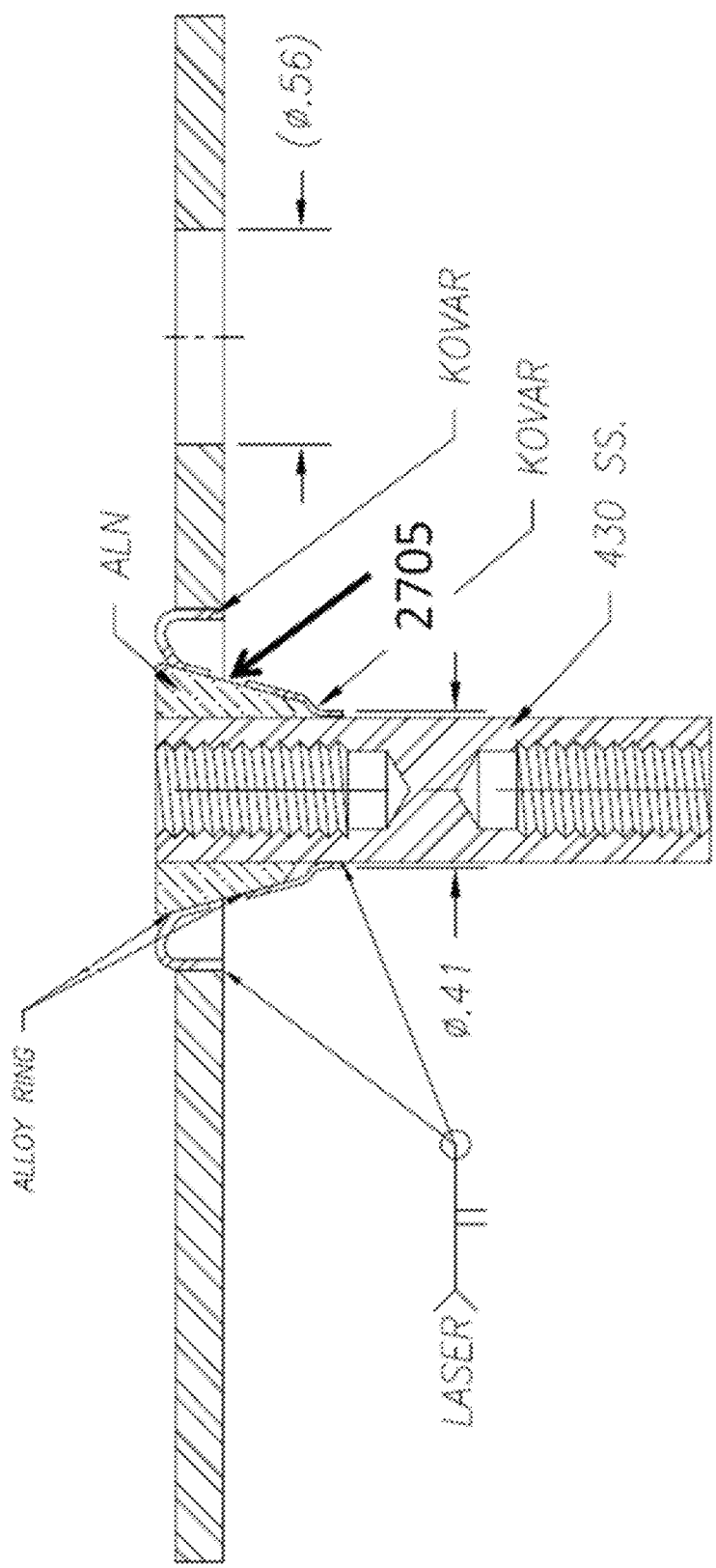
FIG. 27 shows examples and features of seals.

FIG. 25, FIG. 26 and FIG. 27 show examples of various features of seals. The seal in FIG. 25 utilizes corrosion-resistant metals such as molybdenum, tungsten, 630 SS or 430 SS 2505 (e.g., having a low CTE of less than about 4 ppm/° C., or less than about 10 ppm/° C.) and ceramics 2510 (e.g., aluminum nitride (AlN)). The seal comprises a CTE-matching component 2515 (e.g., at about 5.5 ppm/° C.) to allow for reduced or minimal stress build-up (e.g., between the metal 2505 and the ceramic 2510). The CTE-matching component 2515 can comprise, for example, molybdenum, or an alloy of tungsten and/or molybdenum. Examples of such materials are provided in Example 1. The seal has a robust design for mechanical loading and is resistant to electrical bridging shorts. The seal has a low profile design 2520 (e.g., about 0.25 inches), and can be welded or brazed in a commercially scalable way 2525 (e.g., by laser or during sub-assembly brazing).

In FIG. 26, parts of the seal are submerged into the cell such that the seal does not extend up beyond the surface of the cell lid. The seal can include a gas management port and nickel-cobalt ferrous alloy in place of molybdenum. A flipped metal collar 2605 can reduce or eliminate the catching of debris. In some cases, an inner diameter braze (e.g., between nickel-cobalt ferrous alloy and aluminum nitride (AlN)) 2610 can result in undesirable amounts of stress.

The cell shown in FIG. 27 can be sealed by a vacuum brazing process. The seal can enter about ⅜ inch below the cell top, with about 0.05 inch extension above the cell top. The cell can have increased structural capability when compared to the cell in FIG. 26. The design can allow for addition of a central pin after brazing, allowing for more control and flexibility during assembly. In some cases, the smaller gap between the metal pieces can lead to a short by wetting of the ceramic 2705.

In some implementations, seals, sub-assemblies, conductors and/or housings may comprise structural features (e.g., mating features) or be combined with structural members such as, for example, flanges, hooks, ledges, interlock features, weldable tabs, brazable tabs, snap fits, screw fits, screws, nuts, bolts and/or other structural members to facilitate a secure connection of the sealing arrangements herein. In some cases, such mating features may be used in concert with welding, brazing, coating, metalized surfaces, structural features for CTE mismatch, etc. Further, seals, sub-assemblies, conductors and/or housings may comprise structural features to facilitate interconnection between cells and groups of cells. In some cases, such features may be directed at reducing or minimizing stress and forces acting on seals as a result of interconnection. Further, the seals herein may be configured for use in concert with various interconnections features (e.g., current transfer plates). Configuration of the seals may in such cases include, for example, material considerations (e.g., material compatibility of seals and interconnections), desired system resistance (e.g., affecting choice of seal with a given resistance), space and operating condition considerations (e.g., affecting choice of a seal that is compatible with space constraints imposed by a given interconnection arrangement and/or operating conditions), and so on.

Interconnections

Wired or wire-less (e.g., direct metal-to-metal) interconnections may be formed between individual electrochemical cells and/or between groups of electrochemical cells (e.g., modules, packs, cores, CEs, systems, or any other group comprising one or more electrochemical cells). In some cases, groups of cells may be joined via one or more cell-to-cell interconnections. In some cases, groups of cells may be joined via a group-level interconnection. The group-level interconnection may further comprise one or more interconnections with one or more individual cells of the group. The interconnections may be structural and/or electrical. Cells and/or groups of cells may be assembled (or stacked) horizontally or vertically. Such assembled cells and/or groups of cells may be arranged in series or parallel configurations. Further, groups of cells may be supported by various frames. The frames may provide structural support and/or participate or aid in forming the interconnections (e.g., frames on groups of cells may mate or be connected).

In some implementations, interconnections may be configured to decrease resistance (e.g., internal resistance) in a system (e.g., a battery). A battery with a low system resistance (e.g., such that the battery is capable of efficiently storing energy and delivering power) may be desirable in some cases. The system resistance can be determined by the combined effect of a plurality of resistances along the current flow path such as between electrochemical cells, within electrochemical cells, and between groups of electrochemical cells. In some cases, electrochemical cells or groups thereof are connected using interconnects. In some instances, an interconnect is a wire. However, the shortest possible electrical connection can generally lead to the lowest system resistance. Therefore, the present disclosure describes direct connection of cells to each other (e.g., by brazing), in some cases reducing or eliminating the use of wires to connect electrochemical cells.

In some implementations, a battery comprises a plurality of electrochemical cells connected in series, where the battery is capable of storing at least about 10 kWh of energy, the battery has an operating temperature of at least about 250° C., and each of the electrochemical cells has at least one liquid metal electrode. The battery can be any suitable size. In some cases, the battery is capable of storing at least about 10 kilo-Watt-hours of energy. In some cases, the battery is capable of storing at least about 30 kilo-Watt-hours of energy. In some cases, the battery is capable of storing at least about 100 kilo-Watt-hours of energy.

The internal resistance of the battery can be any suitably low resistance. In some cases, the internal resistance of the battery (e.g., at the operating temperature) is about $2.5*n*R$, where 'n' is the number of series connected modules of the battery and 'R' (also referred to herein as '$R_{Module}$') is the resistance of each of the individual modules or parallel connected modules. In some examples, the inverse of R is the sum of the inverses of the resistance of each electrochemical cell in a given module, as given by, for example, $1/R_{Module} = \Sigma_{i=1}^{m} 1/R_i$, where 'm' is the number of cells in one module. Each module can include a plurality of electrochemical cells in a parallel configuration. Electrochemical cells in adjacent modules can be arranged in a series configuration (e.g., individual cells in a module can be connected in series with corresponding individual cells in an adjacent module, such as, for example, in a configuration where individual cells of a first module are connected in series with individual cells of a second module located above the first module). In some cases, the internal resistance of the battery (e.g., at the operating temperature) is about $2*n*R$, about $1.5*n*R$, about $1.25*n*R$, or about $1.05*n*R$. In some cases, the internal resistance of the battery (e.g., at the operating temperature) is less than about $2.5*n*R$, less than about $2*n*R$, less than about $1.5*n*R$, less than about $1.25*n*R$, or less than about $1.05*n*R$. In some cases, the total system resistance (e.g., at the operating temperature) is greater than about $1.0*n*R$ due to the resistance contribution of interconnects, busbars, surface contact resistance at connection interfaces, etc. The battery can comprise electrochemical cells connected in series and in parallel. The number of electrochemical cell modules (or parallel connected modules) that are connected in series (i.e., n) can be any suitable number. In some examples, n is at least 3, at least 5, at least 6, at least 10, at least 12, at least 15, at least 16, at least 20, at least 32, at least 48, at least 54, at least 64, at least 108, at least 128, at least 216, or at least 256. In an example, n is 3 (e.g., for a battery comprising a pack), 6 (e.g., for a battery comprising a pack), or 216 (e.g., for a battery comprising a core).

A wired or wire-less (e.g., direct metal-to-metal) interconnection between individual electrochemical cells and/or between groups of electrochemical cells can have a given internal resistance. In some cases, electrochemical cells are not connected with wires. In some examples, series connections (e.g., wire-less cell-to-cell connections, or current transfer plate connections) are created with a connection that has an internal resistance of about 0.05 milli-ohm (mOhm), about 0.1 mOhm, 0.5 mOhm, about 1 mOhm, about 2 mOhm, about 5 mOhm, about 10 mOhm, about 50 mOhm, about 100 mOhm, or about 500 mOhm at an operating temperature greater than 250° C. In some examples, series connections are created with a connection that has an internal resistance of less than about 0.05 mOhm, less than about 0.1 mOhm, less than about 0.5 mOhm, less than about 1 mOhm, less than about 2 mOhm, less than about 5 mOhm, less than about 10 mOhm, less than about 50 mOhm, less than about 100 mOhm, or less than about 500 mOhm at an operating temperature greater than about 250° C. In some instances, the resistance is measured by a direct electrical connection between the conductor of a first electrochemical cell and the electrically conducting housing of a second cell. In some cases, one or more busbars and/or interconnects can be used to create a connection between any two groups of cells. In some examples, such a connection has an internal resistance of about 0.01 mOhm, about 0.05 mOhm, about 0.1 mOhm, about 0.2 mOhm, about 0.5 mOhm, about 1 mOhm, about 5 mOhm, about 10 mOhm, about 50 mOhm, or about 100 mOhm. In some examples, such a connection has an internal resistance of less than about 0.01 mOhm, less than about 0.05 mOhm, less than about 0.1 mOhm, less than about 0.2 mOhm, less than about 0.5 mOhm, less than about 1 mOhm, less than about 5 mOhm, less than about 10 mOhm, less than about 50 mOhm, or less than about 100 mOhm. In some instances, the resistance is measured by the voltage drop across a busbar (and/or interconnect) while current is flowing through the busbar (and/or interconnect) according to the following formula: $R_{busbar}=V/I$, where '$R_{busbar}$' is the resistance of the busbar (and/or interconnect), 'V' is the measured voltage drop across the busbar (and/or interconnect) and 'I' is the current flowing through the busbar (and/or interconnect). Any aspects of the disclosure described in relation to internal resistance of cell-to-cell connections may equally apply to connections between groups of cells at least in some configurations, and vice versa. Further, any aspects of the disclosure described in relation to internal resistance of series connections may equally apply to parallel connections at least in some configurations, and vice versa.

In some implementations, an electrochemical energy storage system comprises at least a first electrochemical cell adjacent to a second electrochemical cell. Each of the first and second electrochemical cells can comprise a negative current collector, negative electrode, electrolyte, positive electrode and a positive currently collector. At least one of the negative electrode, electrolyte and positive electrode can be in a liquid state at an operating temperature of the first or second electrochemical cell. A positive current collector of the first electrochemical cell can be direct metal-to-metal joined (e.g., brazed or welded) to the negative current collector of the second electrochemical cell. In some examples, the negative current collector comprises a negative current lead.

In some cases, the first and second electrochemical cells are not connected by wires. In some cases, the electrochemical energy storage system comprises one or fewer interconnects for every 2, 3, 4, 5, 6, 7, 8, 9, 10, 11, 12, 13, 14, 15, 16, 17, 18, 19, 20, 21, 22, 23, 24, 25, 26, 27, 28, 29, 30, or more electrochemical cells. In some cases, the electrochemical energy storage system (e.g., battery) comprises one interconnect for at least every 1, 2, 3, 4, 5, 6, 7, 8, 9, 10, 15, 20, 25, 30, 40, 50, 75, 100, 150, 200, or more electrochemical cells.

Figure 28:
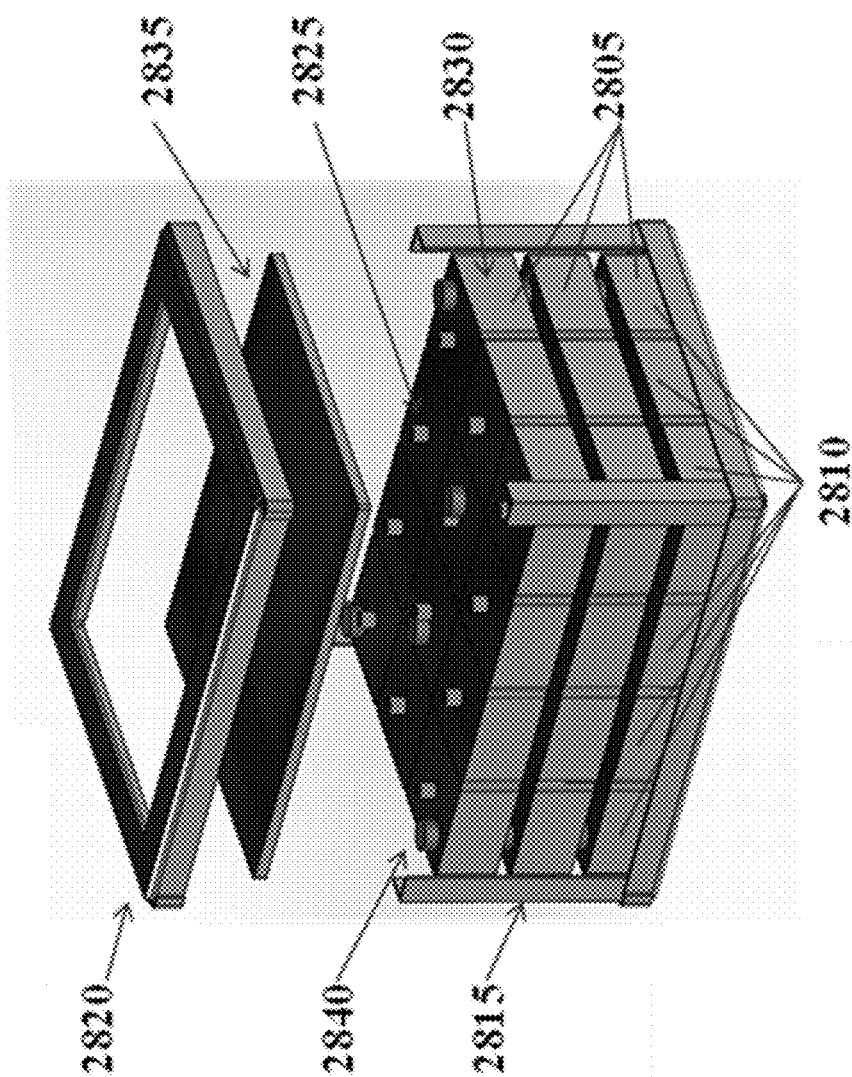
FIG. 28 shows an example of a cell pack.

FIG. 28 shows an example of a cell pack 2800 comprising 3 modules 2805. Each of the modules comprises 12 cells 2830 that are connected in parallel 2810. The modules are held in place with cell pack framing (also "frame" herein) 2815 that includes a top component of the frame 2820. The cells are stacked directly on top of each other with the negative current terminal of one cell 2825 contacted directly with the housing of another cell (e.g., the cell above it). The negative current terminals of the top layer of cells will have no housing of another cell directly above, so can instead be contacted (e.g., brazed to) a negative busbar 2835.

In some configurations, the parallel connections 2810 made in the module can be created using a single piece (or component) with multiple pockets for cell materials. This piece can be a stamped component that allows for direct electrical connection between cells. In some examples, the stamped pocketed electrically conductive housing does not create a barrier between the cells. In some cases, the pocketed electrically conductive housing seals the pockets from each other. This electrically conductive housing can be easier to manufacture and assemble than individual electrically conductive cell housings. In some configurations, the parallel connections 2810 made in the module can be created by direct contact of the housings of the cells in the module.

When stacked vertically, the electrochemical cells bear the weight of the cells stacked above. The cells can be constructed to support this weight. In some cases, cell-to-cell spacers 640 are placed between the layers of cells. These spacers can disperse the weight of the above cells and/or relieve some of the weight applied to the negative current terminals. In some cases, the negative current terminals are electrically isolated from the housing with a seal. This seal can be the weakest structural component of the electrochemical cell, so the spacers can reduce the amount of force applied to the seals.

In some implementations, a liquid metal battery comprises a plurality of electrochemical cells each comprising an electrically conductive housing and a conductor in electrical communication with a current collector. The electrically conductive housing can comprise a negative electrode, electrolyte and positive electrode that are in a liquid state at an operating temperature of the cell. The conductor can protrude through the electrically conductive housing through an aperture in the electrically conductive housing and can be electrically isolated from the electrically conductive housing with a seal. The plurality of electrochemical cells can be stacked in series with the conductor of a first cell in electrical contact with the electrically conductive housing of a second cell. The liquid metal battery can also comprise a plurality of non-gaseous spacers disposed between the electrochemical cells. In some cases, the electrochemical cells are stacked vertically. For example, at least 2, 3, 4, 5, 6, 7, 8, 9, 10, 15, 20, 25, 30, 36, 40, 48, 50, 60, 70, 80, 90, 100, 120, 140, 160, 180, 200, 216, 250, 256, 300, 350, 400, 450, 500, 750, 1000, 1500, 2000 or more electrochemical cells can be stacked in series. In some cases, the battery further comprises at least one additional electrochemical cell connected in parallel to each of the plurality of electrochemical cells that are stacked in series. For example, each vertically stacked cell can be connected in parallel with at least 1, 2, 3, 4, 5, 6, 7, 8, 9, 10, 15, 16, 20, 25, 30, 40, 50, 60, 70, 80, 90, 100, 120, 140, 160, 180, 200, 250, 300, 350, 400, 450, 500, 750, 1000, 1500, 2000 or more additional electrochemical cells. In some cases, the electrically conductive housings are part of a current conducting pathway.

The non-gaseous spacers (also "spacers" herein) can be a solid material. In some cases, the spacers comprise a ceramic material. Non-limiting examples of ceramic materials include aluminum nitride (AlN), boron nitride (BN), yttrium oxide ($Y_2O_3$), zirconium oxide ($ZrO_2$), yttria partially stabilized zirconia (YPSZ), aluminum oxide ($Al_2O_3$), chalcogenides, erbium oxide ($Er_2O_3$), silicon dioxide ($SiO_2$), quartz, glass, or any combination thereof. In some cases, the spacers are electrically insulating.

The spacers can have any suitable thickness. In some cases, the thickness of the spacer is approximately equal to the distance that the conductor protrudes out of the electrically conductive housing (e.g., the thickness of the spacer can be within about 0.005%, about 0.01%, about 0.05%, about 0.1% or about 0.5% of the distance that the conductor protrudes out of the electrically conductive housing).

The majority of the force (e.g., the weight of electrochemical cells stacked vertically above a cell) is generally born by the spacers and/or housing rather than the seals. The non-gaseous spacers and/or the electrically conductive housing can support any suitably high percentage of the applied force. In some cases, about 70%, about 80%, about 90%, about 95%, or about 95% of the force is applied to the non-gaseous spacers and/or the electrically conductive housing. In some cases, at least about 70%, at least about 80%, at least about 90%, at least about 95%, or at least about 95% of the force is applied to the non-gaseous spacers and/or the electrically conductive housing.

There can be any suitable amount of force applied to the electrically conductive housing and/or seal. In some instances, the force applied to the seal is no greater than the seal can support. In some cases, the force applied to the seal is about 10, about 15, about 20, about 25, about 30, about 35, about 40, about 45, about 50, about 60, about 70, about 80, about 100, about 120, about 150, or about 200 Newtons. In some cases, the force applied to the seal is less than about 10, less than about 15, less than about 20, less than about 25, less than about 30, less than about 35, less than about 40, less than about 45, less than about 50, less than about 60, less than about 70, less than about 80, less than about 100, less than about 120, less than about 150, or less than about 200 Newtons. In some cases, the force applied to the housing is about 100, about 500, about 1000, about 5000, or about 10000 Newtons. In some cases, the force applied to the housing is at least about 100, at least about 500, at least about 1000, at least about 5000, or at least about 10000 Newtons.

There can be any suitable amount of pressure applied to the electrically conductive housing and/or seal. In some instances, the pressure applied to the seal is no greater than the seal can support. In some cases, the pressure applied to the seal is about 1, about 10, about 50, about 100, about 200, about 300, or about 500 pounds per square inch (psi). In some cases, the pressure applied to the seal is less than about 1, less than about 10, less than about 50, less than about 100, less than about 200, less than about 300, or less than about 500 pounds per square inch (psi). In some cases, the pressure applied to the housing is about 500, about 1000, about 2000, about 2500, about 3000, about 5000, or about 10000 pounds per square inch (psi). In some cases, the pressure applied to the housing is at least about 500, at least about 1000, at least about 2000, at least about 2500, at least about 3000, at least about 5000, or at least about 10000 pounds per square inch (psi).

The cell to cell connections can be configured in a variety of ways based on tolerances and optimal conductive path. In one configuration, the top face of the negative current lead in one cell can be direct metal-to-metal joined (e.g., brazed, welded) to the bottom of the cell above it (see, for example, FIG. 29). Other configurations can include, for example, alternative direct metal-to-metal joined (e.g., alternative braze joined) configurations, such as an outer diameter braze enhanced by differences in the coefficient of thermal expansion (CTE) of the inner rod and the outer fixture (see, for example, FIG. 30). of thermal expansion (CTE) of the inner rod and the outer fixture (FIG. 30).

Figure 29:
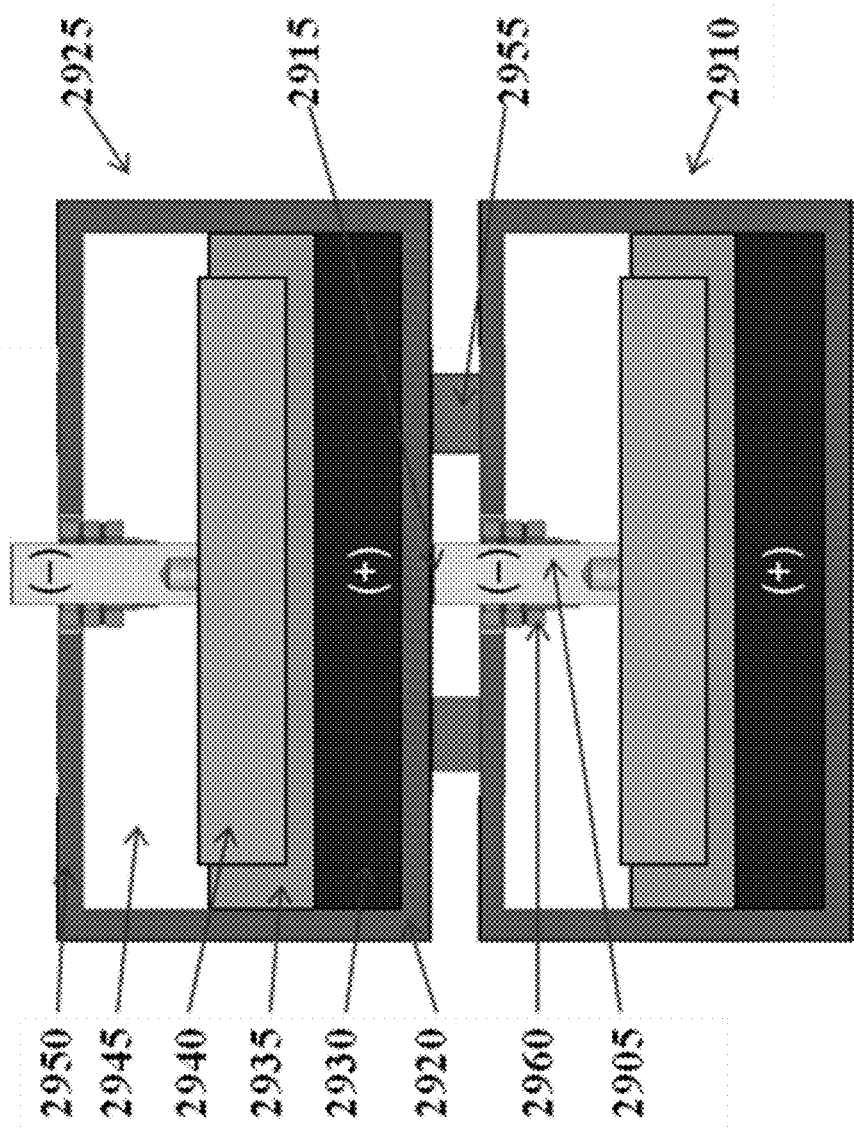
FIG. 29 shows an example of braze connection between the top of a conductive feed-through and the bottom of a cell.
Figure 30:
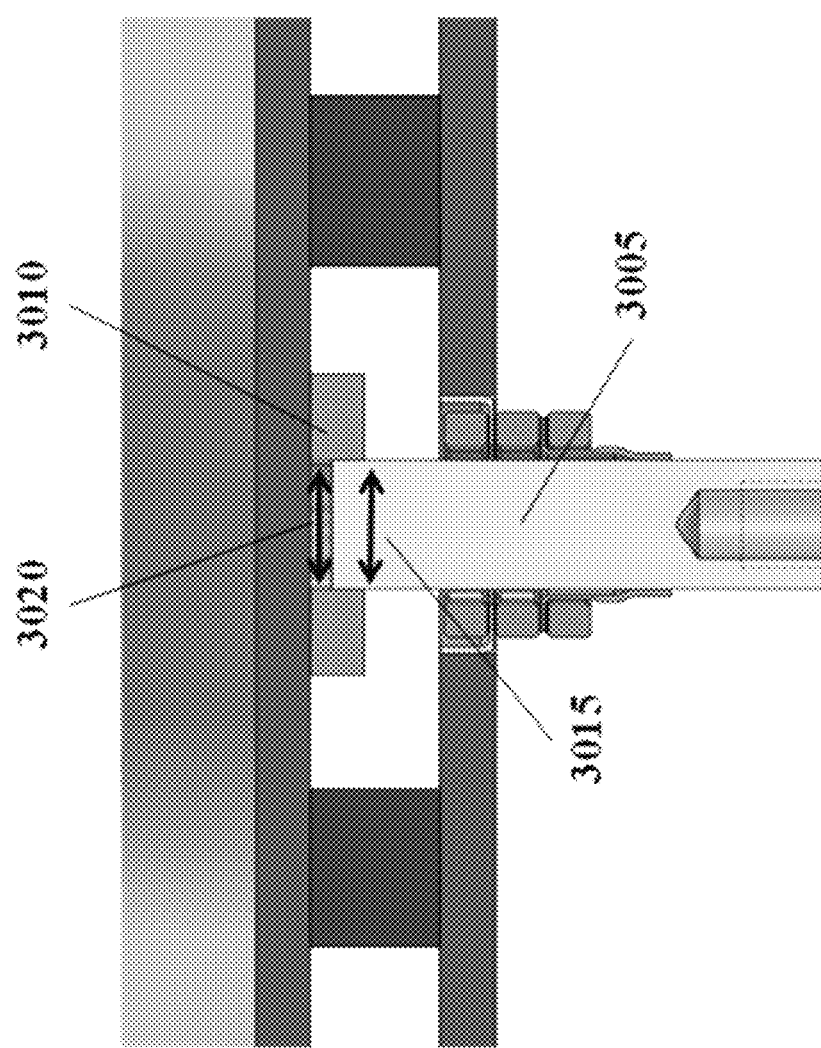
FIG. 30 shows an example of joining two cells using a compression connection between parts that forms at the operating temperature of the battery based on differences in the coefficient of thermal expansion.

In some cases, as shown in FIG. 29, the conductor 2905 of a first cell 2910 is brazed 2915 to the electrically conductive housing 2920 of the second cell 2925. The braze material can be any suitable material. Some non-limiting examples of braze materials include materials that comprise iron (Fe), nickel (Ni), titanium (Ti), chromium (Cr), zirconium (Zr), phosphorus (P), boron (B), carbon (C), silicon (Si), or any combination thereof. The cell can comprise a cathode 2930, an electrolyte 2935 and an anode 2940 connected to the current collector and conductor 2905. The conductor can feed through the cell lid 2950. In some cases, the cell has some empty head space 2945.

In some implementations, the conductor 2905 can feed through a seal 2960 in the cell lid 2950. The conductor (e.g., negative current lead) 2905 may rigid. The seal 2960 may not be rigid. As additional cells are added during assembly, an increasing weight can be exerted on the conductor 2905 of the bottom cell 2910 by the housing 2920 of the top cell 2925 (e.g., at the position 2915). In some instances, the vertical spacing between the cells 2910 and 2925 may decrease if the seal 2960 (with the conductor 2905 and the anode 2940) move downward into the cell 2910 as a result of the compression force. To ensure that modules are electrically isolated from each other, spacers (e.g., ceramics) 2955 can be placed across the surface of the cells to support the cells above them. In this configuration, the cell housing can be used as the main structural support for the system. The ceramic spacer 2955 can relieve the seal 2960 from having to support the weight of the top cell 2925 (and any additional cells added during assembly). In some configurations, there may initially be a gap between the top of the spacers 2955 and the bottom of the housing 2920 of the top cell 2925 (e.g., the thickness of the spacer can be slightly less than the distance that the conductor initially protrudes through the electrically conductive housing), and the spacers (e.g., ceramics) can be placed in compression during assembly as additional cell(s) are added (e.g., as the spacing between the top of the housing of the bottom cell 2910 and the bottom of the housing of the top cell 2925 decreases). As a result, the displacement (also "anode-cathode displacement" herein) between anodes and cathodes (e.g., final displacement after assembly between the anode 2940 and the cathode 2930 in cell 2910) can in some cases be determined by the non-gaseous spacers. In some configurations, the spacers can be placed in compression right away (e.g., if the thickness of the spacer is slightly greater than the distance that the conductor initially protrudes through the electrically conductive housing).

In some cases, differences in the coefficient of thermal expansion (CTE) can be used to connect two cells. As shown in FIG. 30, the conductor of the first cell 3005 sits in a recessed portion of the electrically conductive housing of the second cell 3010, and the coefficient of thermal expansion (CTE) of the conductor 3015 is greater than the CTE of the electrically conductive housing 3020.

The CTE of the conductor can be any amount greater than the CTE of the electrically conductive housing. In some cases, the CTE of the conductor is about 2%, about 5%, about 10%, about 15%, about 20%, about 30%, about 40%, about 50%, about 60%, about 70%, about 80%, about 90%, or about 100% greater than the CTE of the electrically conductive housing. In some cases, the CTE of the conductor is at least about 2%, at least about 5%, at least about 10%, at least about 15%, at least about 20%, at least about 30%, at least about 40%, at least about 50%, at least about 60%, at least about 70%, at least about 80%, at least about 90%, or at least about 100% greater than the CTE of the electrically conductive housing.

Cells stacked vertically in series can be attached through a direct or hard electrical connection such that the height from 2950 to 2940 and/or anode-cathode displacement (ACD) can be determined by the dimensional tolerance of 2955. In some examples, the height from 2950 to 2940 can be at least about 3 millimeters (mm), at least about 5 mm, at least about 7 mm, at least about 10 mm, at least about 15 mm, and the like. In some examples, the ACD can be about 3 mm, about 5 mm, about 7 mm, about 10 mm, about 15 mm, or greater. FIG. 29 is an example of how such connections may be configured.

Cells stacked vertically in series can be connected using a direct (e.g., metal-to-metal) electrical connection such that resistance per cell connection is reduced, for example, below about 100 mOhm (or another internal resistance value described elsewhere herein). FIG. 29 is an example of how such connections may be configured. FIG. 29 also provides an example of a CTE mismatched seal connection.

In some implementations, cells can be joined vertically by means of a current transfer plate that can be connected (e.g., welded) to the negative current lead or conductor on the bottom cell, and the cell body (e.g., electrically conductive housing) on the top cell. The negative current lead can protrude through a housing of the bottom cell through a seal. For example, multiple cells can be connected in parallel into a cell module or a partial cell module, and then connected in series with other cell modules or partial cell modules via vertical stacking. The vertical stacking can be implemented by connecting the current transfer plate from one cell to the cell body or a feature on the cell body on the cell above it (e.g., to form the basis of a cell pack). The current transfer plate can be formed from a conductive material, such as any conductive material described herein. The current can comprise one or more surfaces (e.g., a flat surface) that can be welded or otherwise direct metal-to-metal joined with another surface (e.g., a cell body or a feature on the cell body of an adjacent cell). The current transfer plate can extend from the negative current lead toward the periphery of the cell surface comprising the negative current lead. Such configurations can enable electrical connections to be more conveniently made in tight spaces between cells or in cell assemblies (e.g., more convenient access during vertical stacking of cells).

The current transfer plate may be combined with or comprise a strain relieving function to reduce stress on the seal (e.g., the seal around the negative current lead) that may be generated by the welding/joining process and/or thermal expansion differences during heat-up and/or cool-down, and/or stresses generated when cells and/or packs are vertically stacked on top one another. In some cases, the stresses on the seal may be reduced by including an electrically insulating non-gaseous (e.g., ceramic) spacer. The non-gaseous spacer can support the weight from the current transfer plate and/or cells stacked onto the current transfer plate and direct the weight onto the housing (e.g., the cell cap), thereby reducing the portion of the applied weight that is transmitted through the seal. In some cases, the strain relieving function may include a spiral pattern (e.g., a single spiral arm or multiple spiral arms) or other feature on the current transfer plate to give the current transfer plate compliance and may reduce stress experienced by the seal as the cells are stacked on top one another or during heat-up due to CTE mismatches. The spiral pattern may comprise one or more spiral arms. The spiral arms may be, for example, about 0.5 mm thick, about 1 mm thick, about 2 mm thick or about 4 mm thick. The spiral arms may create a spiral that has a circular or oval external shape that is about 1 cm, about 2 cm, about 3 cm or about 4 cm or larger in diameter. In some cases, the current transfer plate may be sufficiently compliant such that the strain relieving feature is not needed.

Figure 31:
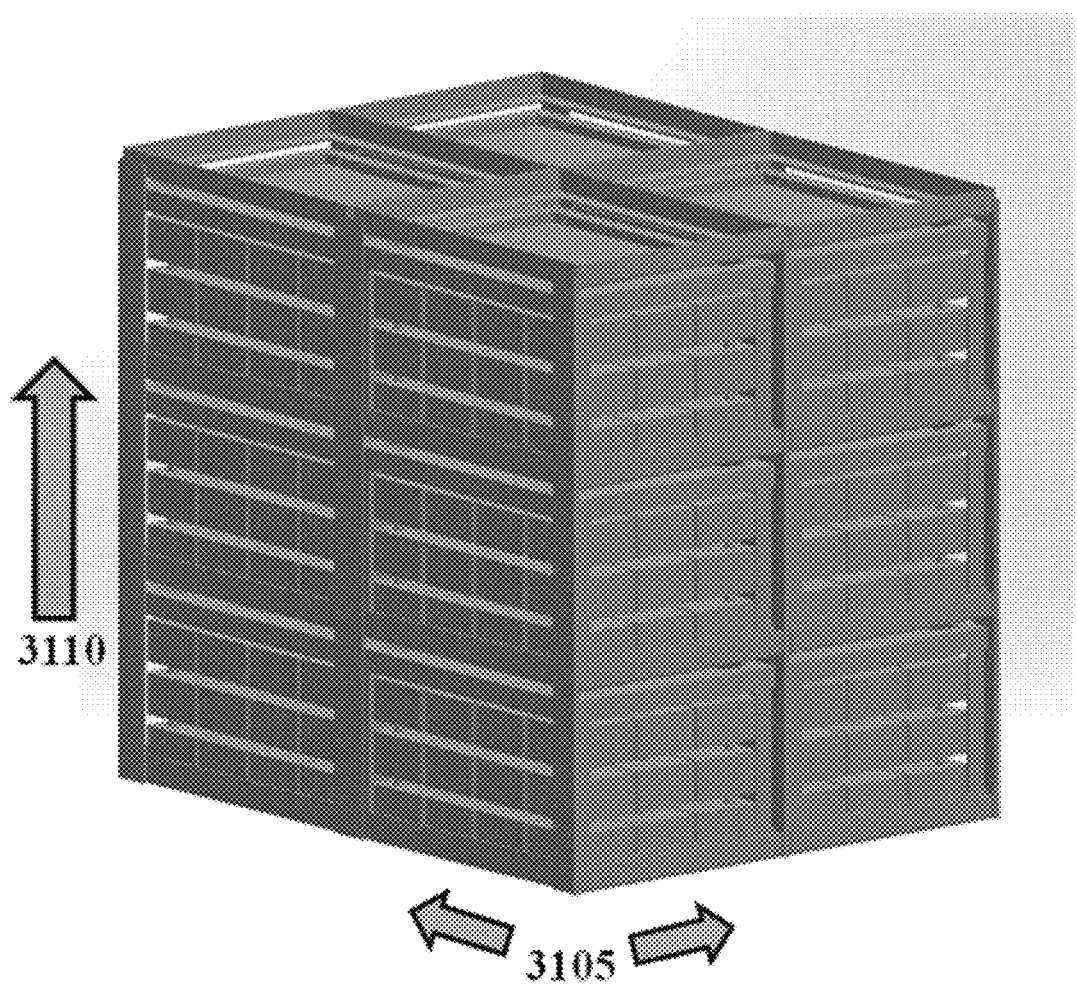
FIG. 31 shows an example of a stack of cell packs, also referred to as a core.

Cell packs can be attached in series and parallel in various configurations to produce cores, CEs, or systems. The number and arrangement of various groups of electrochemical cells can be chosen to create the desired system voltage and energy storage capacity. The packs, cores, CEs, or systems can then be enclosed together in high temperature insulation to create a system that can heat itself using the energy created from cells charging and discharging. For example, FIG. 31 is an example of how packs can be configured, indicating that the cell packs in a given plane are connected to one another in parallel 3105, while the packs connected directly atop one another are connected in series 3110.

The packs themselves can be connected vertically and horizontally to one another through busbars (e.g., unlike the cell-to-cell connections within a pack which can generally be direct connections such as brazes or welds). In some cases, the busbar is flexible or comprises a flexible section (e.g., to accommodate non-isothermal expansion of the system throughout heat up and operation).

A busbar can be used to make an electrical connection with cells in a parallel string (e.g., a parallel string of cells, a parallel string of packs, etc.). In some examples, a busbar can be used to configure a set of cells or cell modules into a parallel string configuration by being electrically connected with the same terminal on all of the cells or cell modules (e.g., the negative terminals of all of the cells or cell modules, or the positive terminals of all of the cell or cell modules). For example, a positive busbar and/or a negative busbar may be used. The positive busbar can be connected to the housing and may or may not need to be flexible. In some cases, the positive busbar may not be used. The negative busbar can be joined to features in (or on) one or more of the cell bodies (e.g., the cell bodies of individual cells in a pack) to provide a strong electrical connection. In some cases, the negative busbar can be attached to conductive feed-throughs (e.g., negative current leads), which may require some compliance for thermal expansion. For example, a flexible connection between a relatively rigid busbar core and the feed-through may be achieved using a compliance feature between the feed-through and the busbar. The compliance feature may involve a spiral pattern (e.g., a single spiral arm or multiple spiral arms) that may be created by cutting away and/or removing material from a flat busbar in the desired pattern. The spiral pattern may involve one or more spiral arms. The spiral arms may be, for example, about 0.5 mm thick, about 1 mm thick, about 2 mm thick or about 4 mm thick. The spiral arms may create a spiral that has a circular or oval external shape that is about 1 cm, about 2 cm, about 3 cm or about 4 cm or larger in diameter. In some cases, the busbar may be sufficiently compliant such that the compliance feature is not needed.

One or more interconnects can be used to connect the busbar of one pack to the busbar of another cell pack, thereby placing the cell packs in parallel or in series. In some cases, the negative busbar of one cell pack is connected to the positive busbar of another cell pack using a compliant interconnection component (also "interconnect" herein). In some cases, the interconnect may be braided metal or metal alloy. In some cases, the interconnect may be made from sheet metal and take the form of a bent sheet that is about $1/32$ inch thick, about $1/16$ inch thick, about $1/8$ inch thick, or about $1/4$ inch thick. In some cases, the interconnect may comprise the same conductive material as the busbar. In some cases, the positive busbar and the interconnect are the same component.

The busbar and/or interconnect components can comprise a conductive material. For example, the busbar and/or interconnect components can comprise (e.g., be made of) stainless steel, nickel, copper, aluminum-copper based alloy, or any combination thereof.

The pack may further comprise or form other interconnections (e.g., to allow the pack to be interconnected with additional packs), including, but not limited to, additional interconnects, additional busbars and/or additional connection interfaces. In some implementations, busbars may be used to provide pack-level electrical connections/interconnections (e.g., only busbars may be used for pack-level electrical connections/interconnections).

In configurations where cells are stacked vertically atop one another, the busbar at the top of the cell stack (e.g., cell pack stack) can comprise only the negative busbar (e.g., since the positive terminal of the stack can be on the bottom cell in the stack).

The thermal insulation and/or the frame may be designed to allow the core (and/or any system of the disclosure) to be cooled, the insulation to be removed, individual or sets of packs to be disconnected and removed from the core to allow for a single pack to be disconnected, removed and replaced, or any combination thereof. The core can then be reassembled and heated back up to operating temperature to allow for resumed operation.

Various interconnection configurations described herein in relation to individual cells or a given group of cells may equally apply to other groups of cells (or portions thereof) at least in some configurations. In one example, interconnections such as, for example, brazed positive and negative current collectors of cells, braze enhanced by differences in coefficients of thermal expansion, connecting (e.g., welding) cell bodies or features in cell bodies, etc., may apply to (or be adapted to) groups of cells such as, for example, modules, packs, etc. In another example, interconnections such as, for example, stamped pocketed electrically conductive housing in cells and/or modules, etc., may apply to (or be adapted to) groups of cells such as, for example, modules, packs, etc. In yet another example, interconnections such as, for example, busbars/interconnects between packs, etc., may in some cases apply to (or be adapted to) groups of cells such as, for example, cores, etc. Further, stress-relieving configurations (e.g., current transfer plates between cells, spacers, spiral relief or compliance features/structures/patterns, etc.) and electrical/structural features (e.g., end-caps, etc.) may in some cases be applied to (or be adapted to) any group of cells herein. The various interconnection configurations may be applied at group level or to individual cells. Thus, in an example, a spacer used between cells may be configured for use as a spacer between packs, a current transfer plate between cells may be configured for use between modules, an interconnection interface comprising a feature on a cell body for connecting cell bodies within a module may be configured for connecting cell bodies of outer cells on adjacent packs, and so on. Further, interconnections described in relation to forming a series connection may be in some cases be adapted to forming a parallel connection, and vice versa.

Pressure Relief Mechanism

Figure 33:
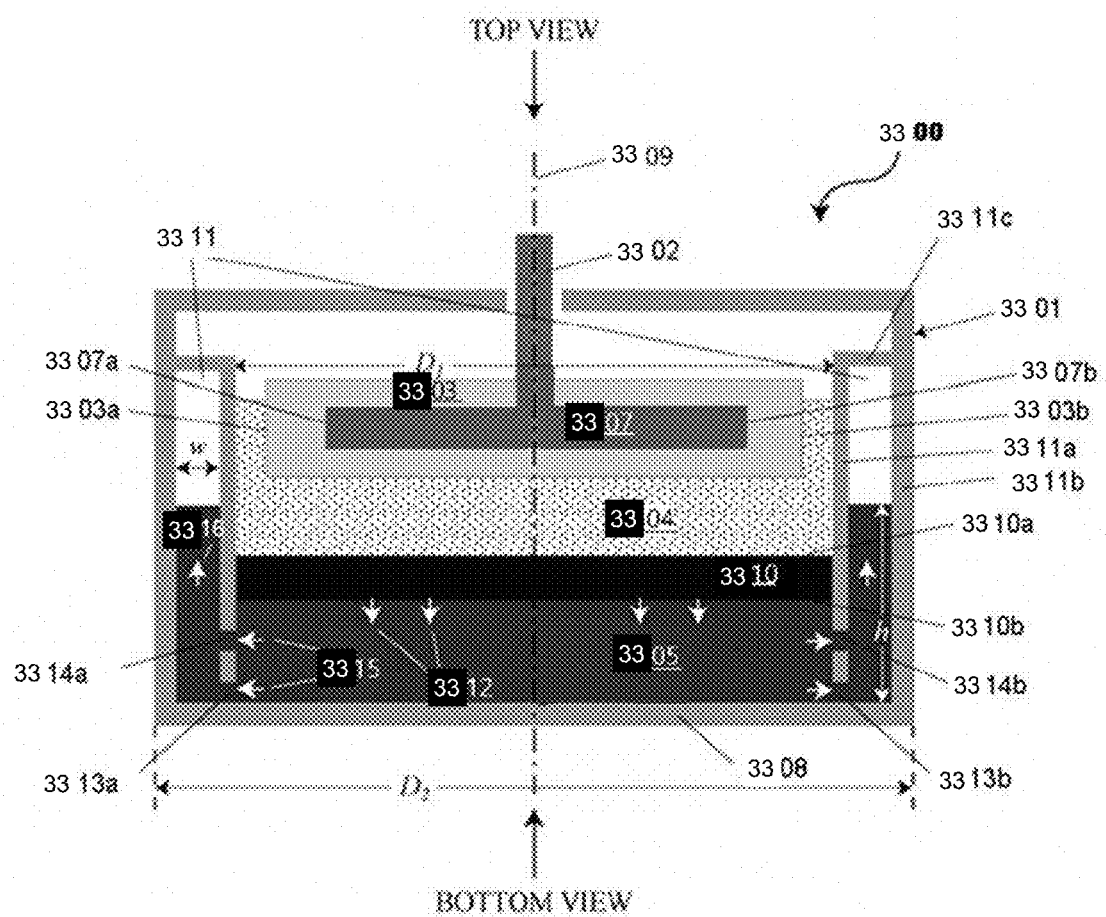
FIG. 33 is a cross-sectional side view of an electrochemical cell or battery with a pressure relief structure.

FIG. 33 is a cross-sectional side view of an electrochemical cell or battery 3300 with a pressure relief structure 3311. In an example, the battery cell 3300 can have an axially symmetric, circular cross-section when viewed from above ("top view" in FIG. 33). The housing 3301 can have concentric walls 3311a, 3311b. A first chamber or cavity can include a negative liquid metal electrode 3303, a negative current collector 3307, a liquid metal electrolyte 3304, a positive liquid metal electrode 3305 and a positive current collector 3308. During discharge, a solid intermetallic layer 3310 may form, as described elsewhere herein. The pressure relief structure 3311 forms a second chamber. The walls of the first and second chambers can form the concentric walls of the housing 3301 which may include a container, as described elsewhere herein. Thus, the pressure relief structure 3311 is provided in the annular chamber (also referred to as "riser pipe" herein) defined by the concentric walls. In some cases, the concentric walls of the housing may be integrally formed. Alternatively, the concentric walls may be formed separately and mechanically joined, e.g., by welding. The housing and/or the walls can be formed of any materials for housings/containers described herein.

During discharge, the negative liquid metal electrode 3303 can be an anode and the positive liquid metal electrode 3305 can be a cathode. The intermetallic layer 3310 includes an upper interface 3310a and a lower interface 3310b. As the lower interface 3310b of the intermetallic layer 3310 moves in a downward direction indicated by arrows 3312, the liquid material of the cathode 3305 is compressed. When pressure builds due to active electrochemistry in the first chamber space, the cathode material can rise between the walls 3311a, 3311b of the pressure relief structure 3311 via one or more openings 3313a, 3313b, 3314a, 3314b. The openings can be provided adjacent to the housing 3301 (e.g., openings 3313a, 3313b) such that the inner wall 3311a of the pressure relief structure is not in contact with the bottom wall of the housing 3301. In some examples, the bottom wall can be the positive current collector 3308. The openings can also be provided at some predetermined distance from the bottom wall of the housing 3301 (e.g., openings 3314a, 3314b). For example, the inner wall 3311a can be attached to the bottom wall of the housing and only have openings 3314a, 3314b.

The holes may be circular or of any other shape allowing the cathode material to flow through the holes. For example, circular holes may be preferred to minimize drag on the flowing cathode material. The cathode material may flow through the holes as indicated by arrows 3315, and upward in the pressure relief structure as indicated by arrows 3316.

Combinations and/or a plurality of openings 3313a, 3313b, 3314a, 3314b can be provided along the inner wall of the annular pressure relief chamber 3311. The holes may be provided at different axial distances from the bottom wall of the housing and may be of varying size. For example, the holes may be spaced to prevent the intermetallic layer 3310 from "bottoming out", i.e., from reaching the uppermost level of the holes (which may be near the bottom of the first chamber), and blocking the riser pipe inlet (the area around arrows 3315).

The pressure relief structure can have a top wall 3311c. The top wall 3311c can close the pressure relief structure to prevent material inside the riser pipe from spilling over the top of the riser pipe. In some cases, the wall 3311b may be formed separately from the housing. For example, the walls 3311a, 3311b, and 3311c can be integrally formed as an annular tube with a closed top and an open bottom (e.g., openings 3313a, 3313b), or as an annular tube with closed top and bottom but with perforations or holes near the bottom (e.g., openings 3314a, 3314b). In some examples, one or more parts or all of the pressure relief structure may be formed of one or more materials different than the housing 3301. One or more parts or all of the pressure relief structure may be formed of an electrically insulating material, such as the electrically insulating materials described elsewhere herein.

With continued reference to FIG. 33, the cathode material in the riser pipe is not in contact with to the electrolyte 3304. Further, the cathode material is electrically isolated from the electrolyte and the anode. When the cathode material is electrically conductive (e.g., a liquid metal cathode material), the cathode material in the riser pipe (second chamber) can be electrically connected with the cathode material in the first chamber. In some cases, such as, for example, when an unsheathed housing is employed as described elsewhere herein, only the wall 3311b may be electrically insulating; the walls 3311b and 3311c may be electrically conductive. The wall 3311c may only be electrically conductive if it is to not contact the electrolyte at any point.

The cathode material may rise in the pressure relief structure 3311 to a height h. The height h may vary around the circumference of the pressure relief structure. The height h can be related to the volume change of the cathode (i.e., the liquid and solid cathode materials 3305 and intermetallic layer 3310). For example, the cathode materials 3305 and 3310 can have a volume $V_1$ when charged, and a volume $V_2$ when discharged. The height h can be related to the volume difference $V_2-V_1$ and the cross-sectional area of the pressure relief structure. The annular pressure relief structure in FIG. 33 can have a width w, and an area related to w and the circumference of the annular structure. The dimensions of the pressure relief structure, e.g., w, may be such that the cathode material can easily enter and rise in the structure. For example, the pressure relief structure can be dimensioned to minimize capillary wicking effects, and to ensure that the cathode material experiences minimal drag forces. The pressure relief structure can be dimensioned to accommodate a predetermined amount of cathode material. For example, the pressure relief structure may be dimensioned to accommodate less than 10%, less than 25%, less than 50%, or less than 75% of maximum volume or mass of the cathode material or of the liquid cathode material.

In some cases, the addition of the riser pipe decreases the gap between a first negative electrode end 3303a and an adjacent wall (e.g., the wall 3311a in FIG. 33), which may contribute to enhanced side wall creep of the liquid cathode material. To prevent the cathode material from climbing the pressure relief structure 3311 along the wall facing the first chamber and shorting to the anode from the sides (i.e., climbing upward in FIG. 33, parallel and on the opposite side of the wall 3311a from the arrows 3316), the pressure relief structure(s) may be isolated from the anode by a sheath (e.g., carbon or metal nitride or other sheath materials described herein) or coating of material (e.g., PVD or CVD coating of a high temperature material), which is not readily wet by the cathode material. In some cases, the material may provide a surface texture or chemistry that interacts with the intermetallic material, e.g., the intermetallic may easily slide along the surface.

Conversely, one or more parts of the pressure relief structure, e.g., the surfaces defining the chamber of the riser pipe, may be formed of and/or coated with a material that is readily wet by the cathode to ensure smooth flow of the cathode material in the riser pipe. The material can be inert. In some cases, the material may have desired reactivity with the cathode material. In some cases, the inlet and/or the openings 3313a, 3313b, 3314a, 3314b can be coated with a material that prevents the intermetallic from sliding into the riser pipe. The inlet and/or the openings 3313a, 3313b, 3314a, 3314b may be covered with a mesh. The inlet and/or the openings 3313a, 3313b, 3314a, 3314b may comprise one or more valves or valve-like features. For example, the inlet and/or the openings can be configured to allow flow into the riser pipe above a certain hydraulic pressure value (e.g., during discharging), and to allow flow from the riser pipe into the first chamber (e.g., during charging) at a relatively lower pressure.

Alternative configurations of the pressure relief mechanism may include external pressure relief structures, such as, for example, a riser pipe mounted externally to the housing 3301 and in fluid communication with the first chamber via one or more the openings 3313a, 3313b, 3314a, 3314b, ducts or connectors.

Devices, systems and methods of the present disclosure may be combined with or modified by other devices, systems and/or methods, such as, for example, batteries and battery components described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), and U.S. Patent Publication No. 2014/0099522 ("LOW-TEMPERATURE LIQUID METAL BATTERIES FOR GRID-SCALED STORAGE"), each of which is entirely incorporated herein by reference.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

A person of skill in the art will recognize that the battery housing components may be constructed from materials other than the examples provided above. One or more of the electrically conductive battery housing components, for example, may be constructed from metals other than steel and/or from one or more electrically conductive composites. In another example, one or more of the electrically insulating components may be constructed from dielectrics other than the aforementioned glass, mica and vermiculite. The present invention therefore is not limited to any particular battery housing materials.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer or a gel. In a further example, at least one battery electrode can be a solid or a gel. Furthermore, in some examples, the electrodes and/or electrolyte may not include metal. Aspects of the disclosure are applicable to a variety of energy storage/transformation devices without being limited to liquid metal batteries.

EXAMPLES

Example 1: Materials of Construction

Alloys of tungsten (W) and molybdenum (Mo), such as, for example, those listed in TABLE 3, can be used in the seals of the disclosure. The alloys can be used as the component (e.g., W or Mo) that is brazed to the electrically insulating ceramic (e.g., aluminum nitride). In some cases, the tungsten and/or molybdenum alloy has a coefficient of thermal expansion (CTE) that is matched with the ceramic (e.g., within about 1%, within about 5%, or within about 10% of the CTE of the ceramic), is resistant to oxidation, and/or is resistant to attack, alloying and/or corrosion from the metal vapor of the negative electrode (e.g., lithium, sodium, potassium, magnesium or calcium vapor) or the molten salt.

TABLE 3

EXAMPLES OF TUNGSTEN AND MOLYBDENUM ALLOYS

| Material | Brand | Description | Composition |
|---|---|---|---|
| Mo | Mo | Molybdenum | 99.97% Mo |
| TZM | TZM | Titanium-Zirconium-Molybdenum | 0.5% Ti/ 0.08% Zr/ 0.01-0.04% C |
| MHC | MHC | Molybdenum-Hafnium-Carbon | 1.2% Hf/0.05-0.12% C |
| Mo-Lanthanoxid (ML) | ML | Molybdenum-Lanthanum Oxide | 0.3% $La_2O_3$- 0.7% $La_2O_3$ |
| Mo-Lanthanoxid (ML) | MLR (R = Re-crystallized) | Molybdenum-Lanthanum Oxide | 0.7% $La_2O_3$ |
| Mo-Lanthanoxid (ML) | MLS (S = Stress relieved) | Molybdenum-Lanthanum Oxide | 0.7% $La_2O_3$ |
| MoILQ | MoILQ (ILQ = Incandescent Lamp Quality) | Molybdenum-ILQ | 0.03% $La_2O_3$ |
| Mo-Yttriumoxid | MY | Molybdenum-Yttrium-Cerium Oxide | 0.47% $Y_2O_3$/ 0.08% $Ce_2O_3$ |
| MoRe | MoRe5 | Molybdenum-Rhenium | 5.0% Re |
| MoRe | MoRe41 | Molybdenum-Rhenium | 41.0% Re |
| MoW | MW20 | Molybdenum-Tungsten | 20.0% W |
| MoW | MW30 | Molybdenum-Tungsten | 30.0% W |
| MoW | MW50 | Molybdenum-Tungsten | 50.0% W |
| MoCu | MoCu30 | Molybdenum-Copper | 30.0% Cu |
| MoCu | MoCu15 | Molybdenum-Copper | 15.0% Cu |
| MoZrO2 | MZ17 | Molybdenum-Zirconium Oxide | 1.7% $ZrO_2$ |
| MoTa | MT11 | Molybdenum-Tantalum | 11.0% Ta |
| MoNb | MoNb | Molybdenum-Niobium | |
| W (pure) | W (pure) | Tungsten | >99.97 |
| W-NS | W-NS | Tungsten-Non Sag | 60-65 ppm K |
| WVM | WVM | Tungsten Vacuum Metallizing | 30-70 ppm K |
| WVMW | WVMW | WVM-Tungsten | 15-40 ppm K |
| S-WVMW | S-WVMW | S-WVM-Tungsten | 15-40 ppm K |
| WC | WC20 | Tungsten Cerium Oxide | 2.0% $CeO_2$ |
| WL | WL10 | Tungten-Lanthanum Oxide | 1.0% $La_2O_3$ |
| WL | WL15 | Tungten-Lanthanum Oxide | 1.5% $La_2O_3$ |
| WL | WL20 | Tungten-Lanthanum Oxide | 2.0% $La_2O_3$ |
| WL-S | WL-S | Tungsten-Lanthanum Oxide-Stem | 1.0% $La_2O_3$ |
| WLZ | WLZ | Tungsten-Lanthanum Oxide-Zirconium Oxide | 2.5% $La_2O_3$/ 0.07% $ZrO_2$ |
| WT | WT20 | Tungsten-Thorium Oxide | 2.0% $ThO_2$ |
| WT | WVMT10 | Tungsten-Thorium Oxide | 30-70 ppm K/ 1.0% $ThO_2$ |
| WT | WVMWT | Tungsten-Thorium Oxide | 5-30 ppm K/ 2.0% ThO2 |
| WRe | WRe5 | Tungsten-Rhenium | 5.0% Re |
| WRe | WRe26 | Tungsten-Rhenium | 26.0% Re |
| WCu | WCu | Tungsten-Copper | 10-40% Cu |
| W-High-density tungsten-heavy metal alloys | DENSIMET ® | DENSIMET ® | 1.5%-10% Ni, Fe, Mo |
| W-High-density tungsten-heavy metal alloys | INERMET ® | INERMET ® | 5%-9.8% Ni, Cu |
| W-High-density tungsten-heavy metal alloys | DENAL ® | DENAL ® | 2.5%-10% Ni, Fe, Co |

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An electrochemical energy storage device, comprising:
a container including a reactive material and an electrolyte comprising a molten salt, wherein said container has a surface area-to-volume ratio of less than or equal to about 100 m$^{-1}$, and wherein said molten salt is a liquid or a vapor at an operating temperature of at least 100° C.; and
a sealing unit configured to seal said container from an environment external to said container, wherein said seal comprises:
a ceramic material exposed to said reactive material or said molten salt, wherein said ceramic material is chemically resistant to said reactive material and said molten salt at said operating temperature, and wherein said ceramic material comprises an element capable of forming a first compound with said reactive material, and wherein said ceramic material has a normalized Gibbs free energy of formation ($\Delta G_{r,n}$) that is more negative than a $\Delta G_{r,n}$ of said first compound of said reactive material;

a metal collar disposed adjacent to said ceramic material; and a metal braze disposed between said ceramic material and at least one of said metal collar and said container, wherein said metal braze comprises at least one metal that chemically reduces said ceramic material.

2. The electrochemical energy storage device of claim 1, wherein said reactive material comprises a positive electrode and a negative electrode, and wherein said electrolyte is disposed between said positive electrode and said negative electrode.

3. The electrochemical energy storage device of claim 1, wherein said reactive material comprises calcium, lithium, or a combination of calcium and lithium.

4. The electrochemical energy storage device of claim 1, wherein said seal is chemically resistant to lithium vapor at a temperature of at least 350° C.

5. The electrochemical energy storage device of claim 1, wherein said seal is chemically resistant to calcium vapor at a temperature of at least 350° C.

6. The electrochemical energy storage device of claim 1, wherein said ceramic material is electrically isolating.

7. The electrochemical energy storage device of claim 1, wherein said metal braze comprises silver, aluminum, or a mixture of silver and aluminum.

8. The electrochemical energy storage device of claim 1, wherein said metal braze comprises titanium or zirconium.

9. The electrochemical energy storage device of claim 1, wherein said ceramic material comprises aluminum nitride.

10. The electrochemical energy storage device of claim 1, wherein said metal collar comprises a bend configured to relieve strain due to coefficient of thermal expansion mismatch between said container and said ceramic material.

11. The electrochemical energy storage device of claim 1, wherein said metal collar is formed from stainless steel or zirconium.

12. The electrochemical energy storage device of claim 1, further comprising a conductor adjacent to said seal, wherein said seal electrically isolates said conductor from said container.

13. The electrochemical energy storage device of claim 12, wherein a coefficient of thermal expansion of said seal is less than 10% different than a coefficient of thermal expansion of said container or said conductor.

14. The electrochemical energy storage device of claim 1, wherein said metal braze is capable of forming a second compound including a element, and wherein a $\Delta G_{r,n}$ of said second compound of said metal braze is more negative than said $\Delta G_{r,n}$ of said ceramic material.

15. The electrochemical energy storage device of claim 1, wherein said element is nitrogen, oxygen, or sulfur.

16. The electrochemical energy storage device of claim 1, wherein said seal comprises a first metal collar and a second metal collar.

17. The electrochemical energy storage device of claim 16, wherein said first metal collar is joined to said ceramic material and said second metal collar is joined to said container.

18. The electrochemical energy storage device of claim 16, wherein said seal further comprises a third metal collar joined to said ceramic material and an electrically conductive feed-through extending into said container, and wherein said third metal collar electrically isolates said electrically conductive feed-through from said container.

* * * * *